US012507703B2

(12) United States Patent
Silpe et al.

(10) Patent No.: US 12,507,703 B2
(45) Date of Patent: Dec. 30, 2025

(54) METHODS, DEVICES AND COMPOSITIONS FOR PRESERVING HUMAN MILK

(71) Applicant: The Trustees of Princeton University, Princeton, NJ (US)

(72) Inventors: Justin E. Silpe, Lawrenceville, NJ (US); Bonnie L. Bassler, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 19/031,243

(22) Filed: Jan. 17, 2025

(65) Prior Publication Data

US 2025/0169516 A1    May 29, 2025

Related U.S. Application Data

(62) Division of application No. 18/442,060, filed on Feb. 14, 2024, now Pat. No. 12,239,142.

(60) Provisional application No. 63/507,325, filed on Jun. 9, 2023, provisional application No. 63/445,776, filed on Feb. 15, 2023.

(51) Int. Cl.
*A23L 2/66* (2006.01)
*A23B 11/18* (2025.01)
*A23C 9/20* (2006.01)

(52) U.S. Cl.
CPC .............. *A23B 11/18* (2025.01); *A23C 9/206* (2013.01)

(58) Field of Classification Search
CPC .................................. A23B 11/18; A23C 9/206
USPC ........................................................... 426/657
See application file for complete search history.

(56) References Cited

U.S. PATENT DOCUMENTS

| | | | |
|---|---|---|---|
| 6,039,985 | A | 3/2000 | Kamarei |
| 8,697,115 | B2 | 4/2014 | Barrett-Reis et al. |
| 2014/0057014 | A1* | 2/2014 | Berseth ............ A23L 33/40 |
| | | | 426/601 |
| 2019/0343144 | A1 | 11/2019 | Yiannios |
| 2020/0196651 | A1 | 6/2020 | Burbidge et al. |
| 2020/0323225 | A1 | 10/2020 | Wiest et al. |

FOREIGN PATENT DOCUMENTS

| | | |
|---|---|---|
| CA | 2459924 C | 2/2003 |
| KR | 10-2013-0052251 | 9/2013 |
| WO | WO-2004/041257 | 5/2004 |
| WO | WO-2004/105517 | 12/2004 |
| WO | WO-2017/168348 | 10/2017 |

(Continued)

OTHER PUBLICATIONS

Nadal et al., Effect of cold storage on vitamins C and E and fatty acids in human milk; Food Chemistry; pp. 65-70 (Year: 2007).*

(Continued)

*Primary Examiner* — Brent T O'Hern
(74) *Attorney, Agent, or Firm* — Foley & Lardner LLP; Kiri Lee Sharon

(57) ABSTRACT

Described herein, are compositions and methods for preserving human milk, preventing rancidity of human milk, extending shelf life of human milk, and maintaining the nutritional properties of human milk. Specifically, the present disclosure provides, among other things, devices for storing preserved human milk and methods and compositions for preserving the same.

13 Claims, 11 Drawing Sheets

(56) References Cited

FOREIGN PATENT DOCUMENTS

Figure 1:
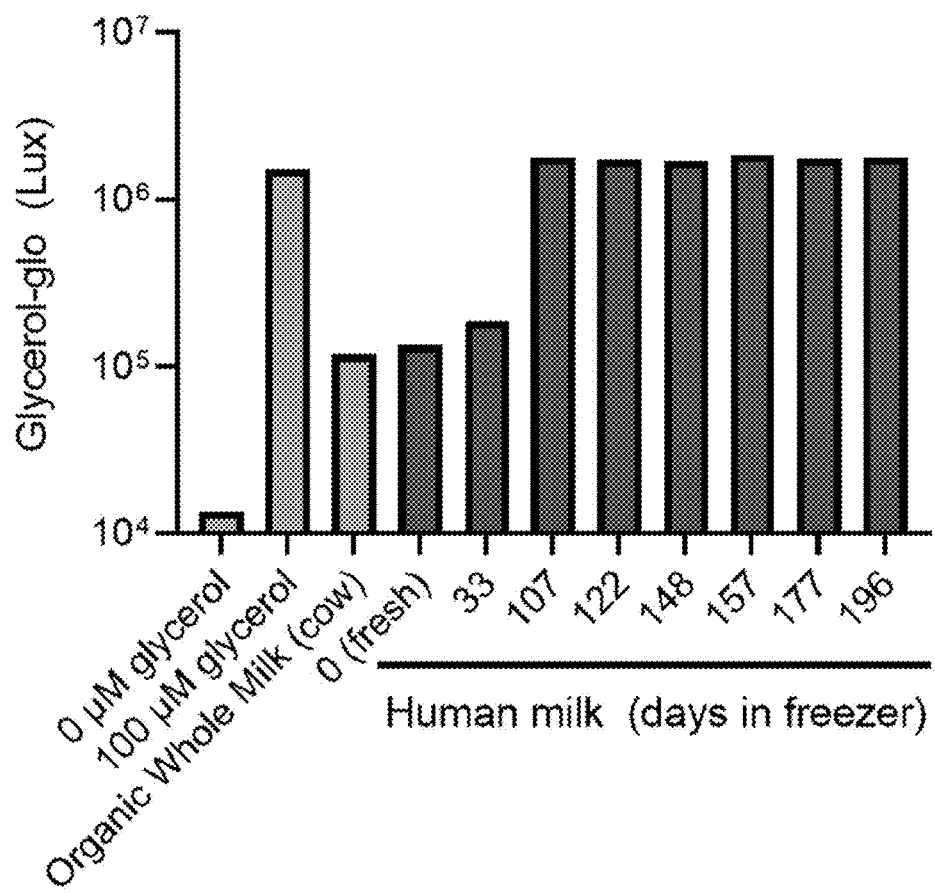

| | | |
|---|---|---|
| WO | WO-2019/126308 | 6/2019 |
| WO | WO-2021/050759 | 3/2021 |
| WO | WO-2022/016038 | 1/2022 |

OTHER PUBLICATIONS

Aguilera-Angel, E., et al.(2018). "Pectic polysaccharides with different structural characteristics as inhibitors of pancreatic lipase". Food Hydrocolloids, 83, 229-238. https://doi.org/10.1016/j.foodhyd.2018.05.009 (10 pages).
Edashige, Y., et al. (2008). "Inhibitory Effect of Pectin from the Segment Membrane of Citrus Fruits on Lipase Activity." Journal of Nutritional Science and Vitaminology, 54(5), 409-415. https://doi.org/10.3177/jnsv.54.409 (7 pages).
International Search Report and Written Opinion dated Aug. 9, 2024 from PCT/US2024/015879, 27 pages.
Mead Johnson Nutrition, Pediatric Products Handbook, Jan. 2012, pp. 1-268.
Reiter et al., The Biological Significance and Exploitation of the Non-Immunoglobulin Protective Proteins in Milk: Lysozyme, Lactoferrin, Lactoperoxidase, Xanthineoxidase, Bulletin Federation Internationale De Laiterie, Bruzzel, No. 191, Jan. 1985, pp. 2-35.
Tsujita, T., et al. (2003). "Inhibition of lipase activities by citrus pectin." Journal of Nutritional Science and Vitaminology, 49(5), 340-345. https://doi.org/10.3177/jnsv.49.340 (6 pages).

\* cited by examiner

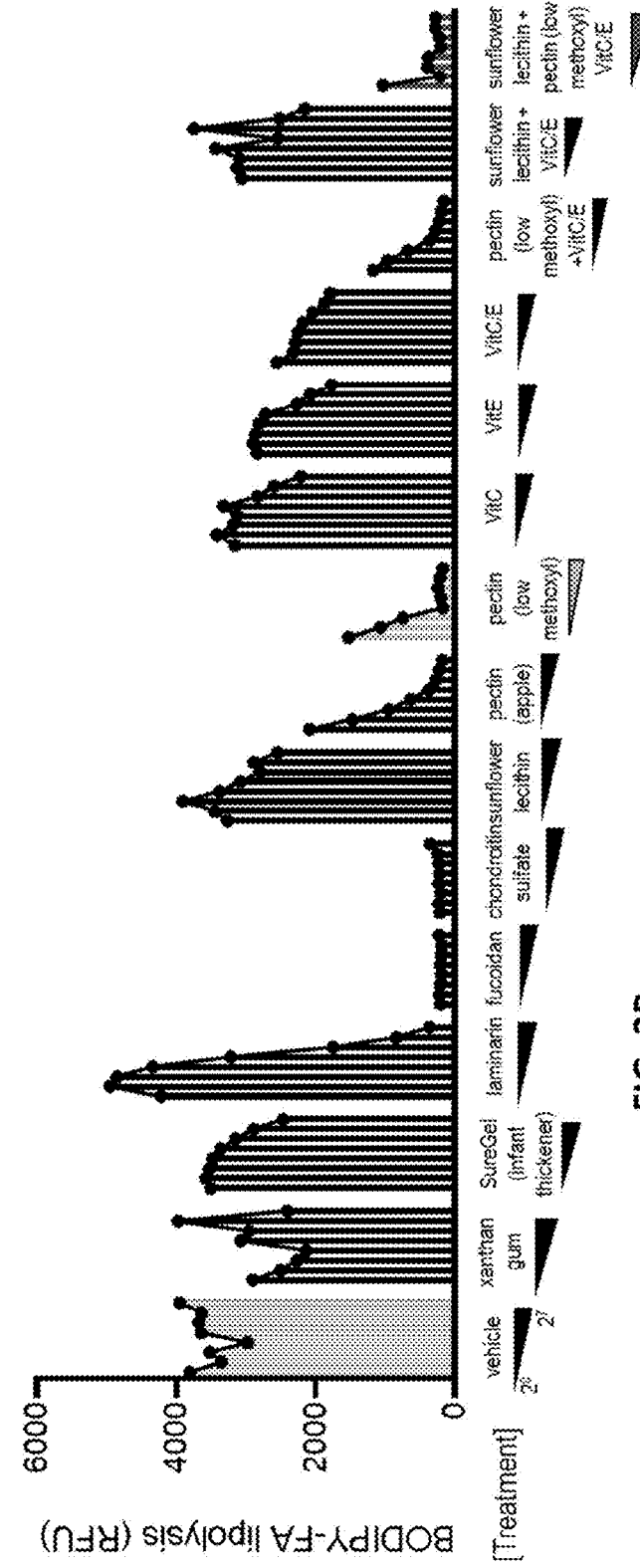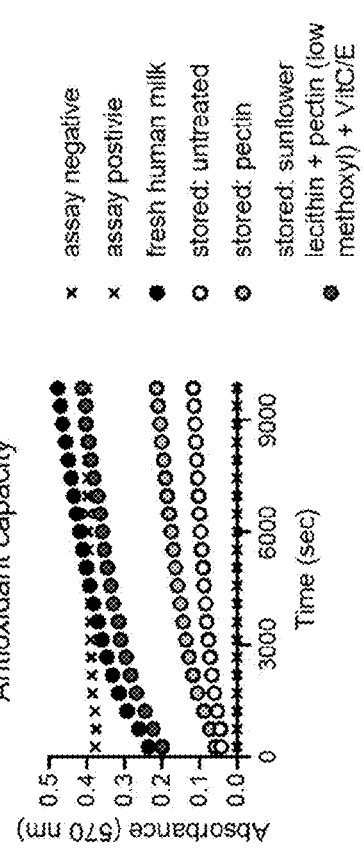
FIG. 3A
FIG. 3B Antioxidant capacity

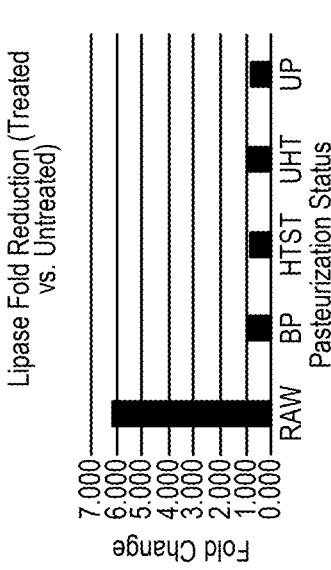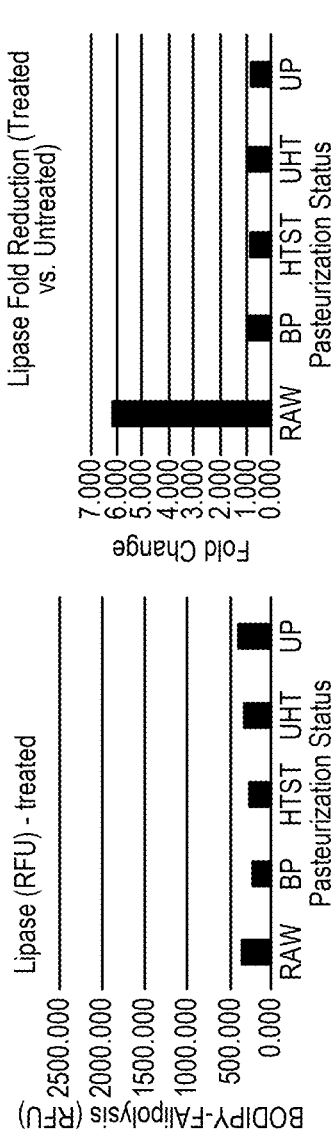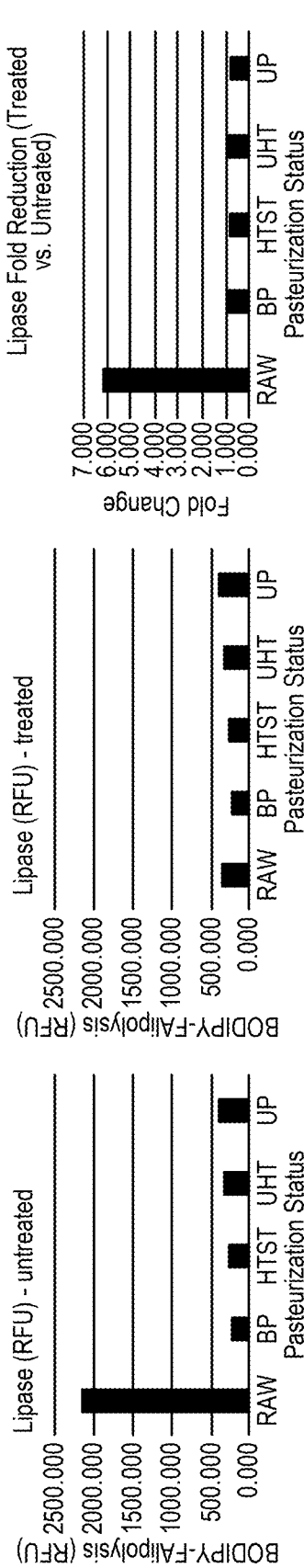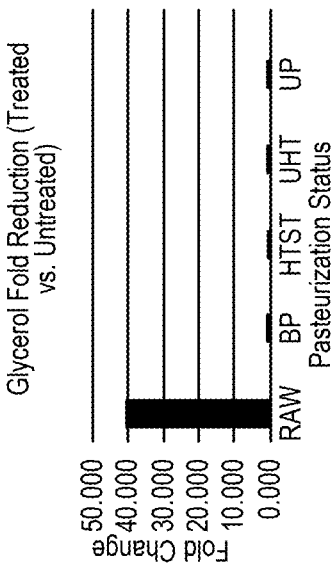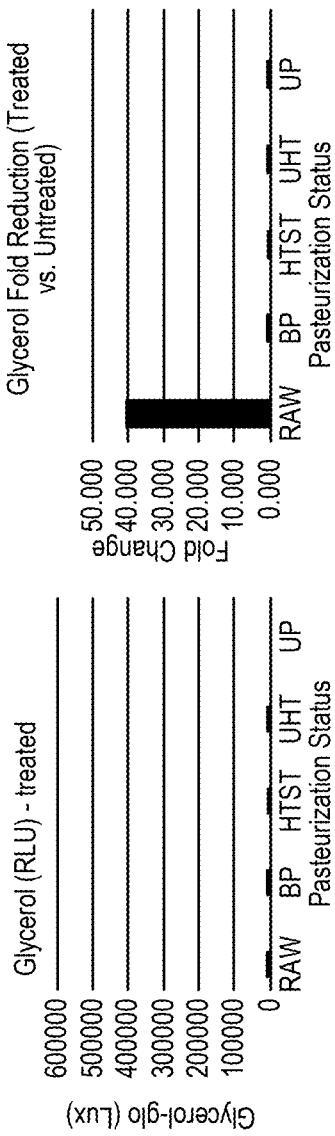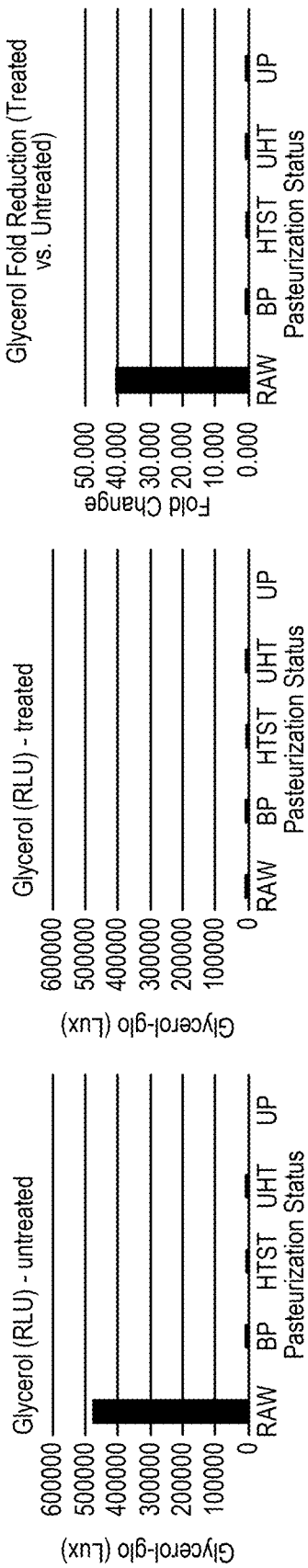

METHODS, DEVICES AND COMPOSITIONS FOR PRESERVING HUMAN MILK

CROSS-REFERENCE TO RELATED APPLICATION

This application is a Divisional of U.S. application Ser. No. 18/442,060, filed Feb. 14, 2024, which claims priority to U.S. Provisional Application No. 63/445,776, filed Feb. 15, 2023, and U.S. Provisional Application No. 63/507,325, filed Jun. 9, 2023, the entire contents of each of which are incorporated herein by reference.

TECHNICAL FIELD

Described herein are compositions and methods for preserving human milk, preventing rancidity of human milk, extending shelf life of human milk, and maintaining the nutritional properties of human milk. Specifically, the present disclosure provides, among other things, devices for storing preserved human milk and methods and compositions for preserving the same.

BACKGROUND

The following description of the background of the present technology is provided simply as an aid in understanding the present technology and is not admitted to describe or constitute prior art to the present technology.

Established guidelines for infant nutrition assert that infants be provided nothing other than human milk for the first 6 months of age. That is, no other food source or water should be given to infants in that time window. This guidance makes human milk the sole recommended calorie source over this critical window of life. Human milk can be augmented with or replaced by infant formula, when desired.

Nursing parents pump, store, and freeze excess human milk as a practical matter. The milk is later thawed and used. However, human milk often becomes rancid following storage making it unpalatable to infants. Additionally, freeze-thawed human milk is vulnerable to degradation and rancidity. Degradation can occur because freezers generally do not preserve the complex emulsified structure of human milk, resulting in fat breakdown and the generation of rancid flavor compounds. The rancid milk has an undesirable odor/flavor, leading to avoidance and rejection by the newborn/infant and discontinuation of breastfeeding.

This issue is a major cause of concern for parents and providers as it forces suboptimal or unwanted feeding regimes (i.e., resorting to commercial formulas despite knowing them to be inferior substitutes for expressed human milk in terms of nutritional value). It is known that the oxidation of lipids, which results in production of free fatty acids in expressed human milk increases during storage, which subsequently results in a rancid flavor, reduced shelf life, and, ultimately, infant undernutrition. Oxidizing agents and lipolytic proteins (lipases) are substances present in expressed human milk that break down lipids and convert them into free fatty acids. The exact chemical composition of expressed human milk, including the abundance and/or activity of oxidizing agents and lipases, is person-specific and, within a single individual, and varies over time, making it difficult to predict in a home setting when stored expressed human milk will become rancid. Moreover, there is currently no method to reverse the rancidity of human milk after it spoils, and there is no proven solution to prevent rancidity from occurring prior to storage that can be performed without advanced equipment/know-how (ultrapasteurization).

The approach disclosed herein provides parents/providers a solution to the above-described problem using a formulation that is safe, effective, and easy to use anywhere. The formulation, which is exposed to expressed human milk during or after collection, eliminates or inhibits the processes that cause rancidity, and in so doing, extends the shelf life and maintains the nutritional value of the milk during storage. Furthermore, the formulations and methods disclosed herein prevent fat degradation and rancidification by retaining the structural integrity of breastmilk during freeze-thaw.

Embodiments of the disclosed approach are hereafter disclosed. An exemplary process comprises adding existing, food-safe components to expressed human milk that prevents rancidity, extends shelf life, and maintains the nutritional properties of expressed human milk upon storage; an exemplary composition of matter comprises a mixture of components, which is exposed to expressed human milk; and an exemplary device comprises a vented device that acts as an embedded material, a filter or a capsule, that contains the rancidity-reducing agent(s) which comes into contact with expressed human milk during collection and/or in the storage vessel.

Inter alia, the disclosed approach can be used to extend the shelf life, flavor, and nutritional value of expressed human milk without the need for ultra-pasteurization.

More particularly, approximately 50% of all infants in the U.S. are exclusively breastfed through 3 months, half of which (25% total) remain exclusively breastfed through 6 months (per WHO and UNICEF recommendations). Given that human milk is the only matter many infants ingest for months, ensuring they consume proper amounts of high nutrient value human milk is essential to their ability to meet the most critical of early milestones in life. Human milk oligosaccharides (HMOs) are key nutrients present exclusively in expressed human milk that cannot be sourced from other mammals, nor can they be synthesized, making human milk the gold standard for infant nutrition. In today's work-life system, nursing mothers return to work while their infants still require human milk. Thus, nursing mothers use breast pumps to enable the acquisition of expressed milk which can be stored in disposable freezer bags to thaw for use at later dates. Current commercially available freezers in most homes (cooling to −20° C.) do not adequately preserve the complex emulsified structure of human milk, and as a result, thawed human milk is frequently rancid, leading to it being rejected by some infants. Currently, the only method to prevent rancidity in expressed human milk is by ultra-pasteurization, which alters the milk's nutritional content and functional properties and is impractical for users to perform at home.

Accordingly, there is an urgent and widespread need to prevent/delay/slow rancidity in expressed human milk while not reducing safety and retaining nutritional value. The disclosed approach solves this problem by providing a method to slow or stop rancidity, extend shelf life, and maintain nutritional properties of the milk. The method can be performed without the need for pasteurization.

Methods of inhibiting rancidity are set forth in U.S. Published Patent Application 2020/0323225 A1, entitled: "Lipase inhibitors to prevent rancidity in expressed human milk during storage," published Oct. 15, 2020 and U.S. Provisional Application No. 63/445,776, entitled "Method of inhibiting rancidity, extending shelf life, and maintaining nutritional value of expressed human milk upon storage," and filed Feb. 15, 2023, both of which are incorporated by reference in their entireties as if fully set forth herein, including for the methods and compositions therein.

SUMMARY

In one aspect, the present disclosure provides, a composition comprising at least one active ingredient selected from: at least one emulsifying agent; at least one antioxidant; at least one ice-structuring protein; at least one lipoprotein lipase (LPL) inhibitory protein; at least one small molecule lipase inhibitor; at least one milk-stabilizing protein; at least one glycosaminoglycan; at least one flavonoid; or a combination thereof.

In any embodiments, the emulsifying agent is a surfactant, protein, and/or nanoparticle that acts as an emulsifier.

In any embodiments, the surfactant is a polysorbate, a citric acid ester of mono- and diglycerides, and/or a naturally derived emulsifier.

In any embodiments, the naturally derived emulsifier is lecithin and/or saponin-rich quillaia extract.

In any embodiments, the lecithin is from sunflower or soy.

In any embodiments, the emulsifying agent is a pectin.

In any embodiments, the pectin is poly-D-galacturonic acid methyl ester.

In any embodiments, the pectin is apple pectin, citrus pectin, beet pectin, okra pectin, or kiwifruit pectin.

In any embodiments, the pectin is apple pectin.

In any embodiments, the pectin is low methoxyl pectin or high methoxyl pectin.

In any embodiments, the pectin is a pectin subunit selected from galacturonic acid, di-galacturonic acid, or tri-galacturonic acid.

In any embodiments, the pectin is selected from GENU® Pectin Beta, GENU® Pectin LM-106 AS-YA, GENU® Pectin YM-100-L, Pacific RSND Pectin, Pacific LM-104 Pectin, or Pacific LM-12 Pectin.

In any embodiments, the pectin is Pacific LM-12 Pectin.

In any embodiments, the amount of pectin is between about 0.03 mg/mL and about 20 mg/mL.

In any embodiments, the amount of pectin is between about 0.034 mg to about 9000 mg.

In any embodiments, the surfactant is a nonionic surfactant.

In any embodiments, the antioxidant is selected from vitamin C or a derivative thereof, vitamin E or a derivative thereof, a vitamin C-vitamin E blend, Ethylenediaminetetraacetic acid (EDTA) or a derivative thereof, a phospholipid, egg yolk, or a lambda-carrageenan.

In any embodiments, the at least one antioxidant is vitamin C, vitamin E, or vitamin A.

In any embodiments, the amount of vitamin C is between about 20.6 µg/mL and about 350 µg/mL.

In any embodiments, the amount of vitamin C is between about 0.6 µg to about 101 mg.

In any embodiments, the amount of vitamin E is between about 0.01 µg/mL and about 150 µg/mL.

In any embodiments, the wherein the vitamin E is synthetic vitamin E between about 0.01 µg to about 1.8 mg or natural vitamin E between about 0.01 µg to about 2.682 mg.

In any embodiments, the Lipoprotein Lipase (LPL) inhibitory protein is Angiopoietin-like proteins (ANGPTL) 3, 4, and/or 8.

In any embodiments, the milk-stabilizing protein is lactoperoxidase.

In any embodiments, the glycosaminoglycan is selected from glucosamine sulfate, chondroitin sulfate, hyaluronic acid, heparan sulfate, or Fucoidan.

In any embodiments, the flavonoids are selected from ginkgetin, iso-ginkgetin, myricetin, luteolin, or epigallocatechin gallate.

In any embodiments, the at least one active ingredient is not an antibody or protein that binds to lipoprotein lipase (LPL).

In any embodiments, the at least one active ingredient is not a lipase inhibitor selected from GSK264220A, Orlistat, RHC 80267, and Xen 445.

In any embodiments, one or more of the active ingredients do not naturally occur in human milk.

In any embodiments, the composition preserves human milk.

In another aspect, the present disclosure provides a composition for preserving human milk comprising: (a) pectin; (b) vitamin C; and (c) vitamin E.

In any embodiments, the composition as disclosed herein further comprising: (a) between about 0.003% w/v to about 0.9% w/v of the pectin; (b) between about 0.034 mg to about 9 mg of the pectin; (c) between about 5 mg to about 1333 mg of the pectin; or (d) between about 34 mg to about 9000 mg of the pectin.

In any embodiments, the pectin is selected from beta pectin, GENU® Pectin Beta, GENU® Pectin LM-106 AS-YA, GENU® Pectin YM-100-L, Pacific RSND Pectin, Pacific LM-104 Pectin, or Pacific LM-12 Pectin.

In any embodiments, the pectin is Pacific LM-12 Pectin.

In any embodiments, the composition as disclosed herein further comprising (a) between about 0.676 µg to about 101 µg of the vitamin C; (b) between about 0.1 mg to about 15 mg of the vitamin C; or (c) between about 0.676 mg to about 101 mg of the vitamin C.

In any embodiments, the composition as disclosed herein further comprising: (a) between about 0.0122 µg to about 1.8 µg of the vitamin E; (b) between about 1.8 µg to about 270 µg of the vitamin E; or (c) between about 0.01 mg to about 1.8 mg of the vitamin E, wherein the vitamin E is synthetic vitamin E.

In any embodiments, the composition as disclosed herein further comprising: (a) between about 0.0000271 IU to about 0.004 IU of the vitamin E; (b) between about 0.004 IU to about 0.27 IU of the vitamin E; or (c) between about 0.01 IU to about 2.68 IU of the vitamin E.

In any embodiments, the composition as disclosed herein further comprises lecithin.

In any embodiments, the composition as disclosed herein further comprises one or more of a disintegrant, an absorbent, a colorant, a flavorant, a sweetener, or a dispersing agent.

In any embodiments, the composition as disclosed herein further comprises a binder.

In any embodiments, the composition as disclosed herein is formulated as one of a concentrated liquid, a tablet, a powder, or a single use sachet.

In any embodiments, the composition as disclosed herein decreases lipase activity and maintains antioxidation capacity of human milk.

In any embodiments, the composition as disclosed herein for the use in preventing rancidity of human milk, extending shelf life of human milk, and/or maintaining the nutritional properties of human milk upon storage.

In another aspect, the present disclosure provides a method for preserving human milk comprising, contacting human milk with the composition as disclosed herein and storing the human milk.

In any embodiments, the method as disclosed herein comprises: (a) contacting human milk with a composition comprising: (i) between about 0.034 mg/mL to about 9 mg/mL of pectin; (ii) between about 0.676 µg/mL to about 101 µg/mL of vitamin C; and (iii) between about 0.0182 µg/mL to about 2.68 µg/mL of natural vitamin E or between about 0.0122 µg/mL to about 1.8 µg/mL of synthetic vitamin E; and (b) storing the human milk.

In any embodiments, the storing comprises freezing the human milk at about −20° C.

In any embodiments, the storing is at about 4° C.

In any embodiments, the storing is for between about 1 day to about 5 years.

In any embodiments, where the human milk is between about 1 mL to about 1000 mL.

In any embodiments, where the human milk is about 1 mL.

In any embodiments, where the human milk is about 5 ounces.

In any embodiments, where the human milk is about 150 mL.

In any embodiment, where the human milk is about 1000 mL.

In any embodiments, where the human milk is expressed human milk or synthetic human milk.

In one aspect, the present disclosure provides a device, comprising: a housing defining an internal volume of space, the housing having at least one opening configured to allow a material within the internal volume of space to exit the housing and contact human milk, or to come into contact with human milk within the internal volume of space, the material within the internal volume of space comprising the composition as disclosed herein.

In any embodiments, the device is configured to be placed in a milk collection container or storage container.

In any embodiments, the milk collection container or the storage container is a bag.

In any embodiments, wherein the device is configured to have an inlet and an outlet, and the device is configured to be situated between a breast pump and a milk storage vessel, such that all the human milk must pass through the inlet and outlet before entering the milk storage vessel.

In another aspect, the present disclosure provides a milk storage container comprising the composition as disclosed herein immobilized to an inner surface of the container.

In any embodiment, the container comprises plastic.

In any embodiment, the bag is configured to be stored between about −80° C. to about 4° C. or room temperature.

In any embodiment, the bag is configured to be stored for about 1 day to about 5 years.

In one aspect, the present disclosure provides a kit comprising the composition as disclosed herein and optionally instructions for use.

In any embodiments, the kit further comprising the device as disclosed herein or the milk storage container as disclosed herein.

BRIEF DESCRIPTION OF THE SEVERAL VIEWS OF THE DRAWING(S)

Features, aspects, and advantages of the present disclosure will become apparent from the following description and the accompanying non-limiting examples shown in the drawings, which are briefly described below.

FIG. 1 depicts the results of glycerol accumulation, a byproduct of fat breakdown, in human milk sample after storage at −20° C. for different periods of time. Glycerol was detected by a glycerol-dependent, light-producing reaction presented as a measure of bioluminescence for each sample (lux; Y axis). The samples were tested at different time points post storage as identified on the X axis and compared to three controls.

Figure 2:
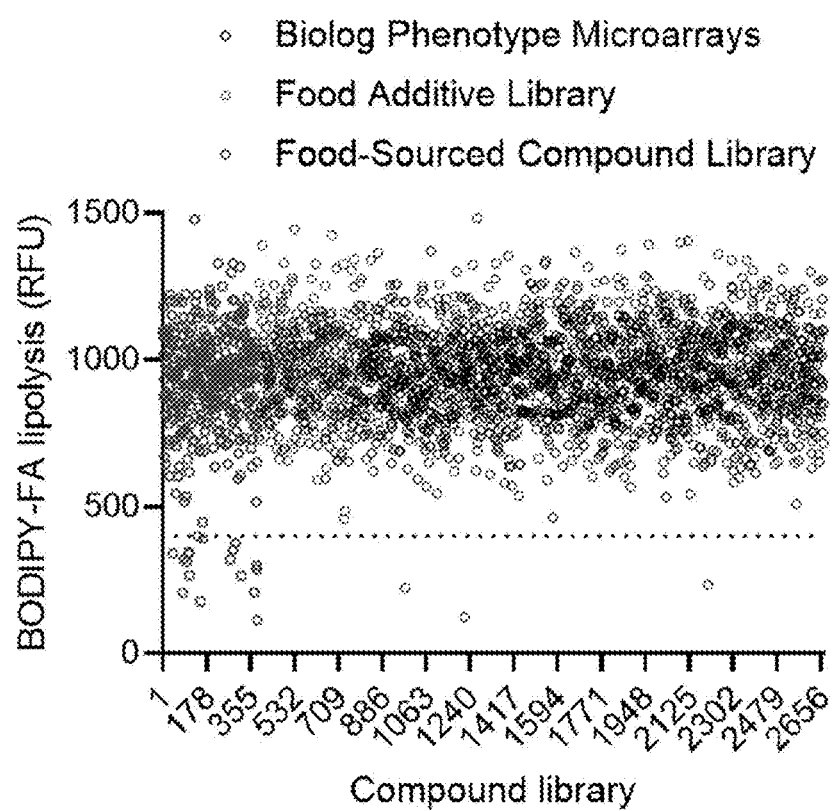

FIG. 2 depicts the results of lipase inhibition from an approximately 2700 compound screen from three different compound libraries (Biolog Phenotype Microarrays, Food Additive Library, and Food-Source Compound Library) on human milk samples stored at −20° C. for 1 week. Lipase was detected by quenched BODIPY-fatty acid conjugate. RFU<400 (dotted line) indicates lipase inhibition.

FIGS. 3A and 3B depict the results of lipase inhibition on human milk samples detected by quenched BODIPY-fatty acid conjugate from exemplary compounds alone or in combination as shown on the X axis. For all compounds tested except for vitamin C and vitamin E, the far-right bar of each compound series is 10 mg/mL (1% w/v) followed by 2-fold dilutions for each of the preceding bars. For vitamin C, the far-right bar of the series is 350 µg/mL followed by 2-fold dilutions for each of the preceding bars. For vitamin E, the far-right bar of the series is 150 µg/mL followed by 2-fold dilutions for each of the preceding bars (FIG. 3A). Antioxidant capacity is demonstrated as a measure of absorbance quantified over a period of time as displayed on the X axis for fresh human milk, untreated stored milk, stored milk treated with pectin, and stored milk treated with a combination of sunflower lecithin, pectin (low methoxyl), vitamin C, and vitamin E (FIG. 3B). FIG. 3B depicts, at time zero, in order from highest to lowest values on the ordinate axis, the positive assay, fresh human milk, stored milk with sunflower lecithin and pectin (low methoxyl) and Vitamins C/E, stored milk with pectin, untreated milk, and the negative assay (at 0 absorbance).

Figure 4:
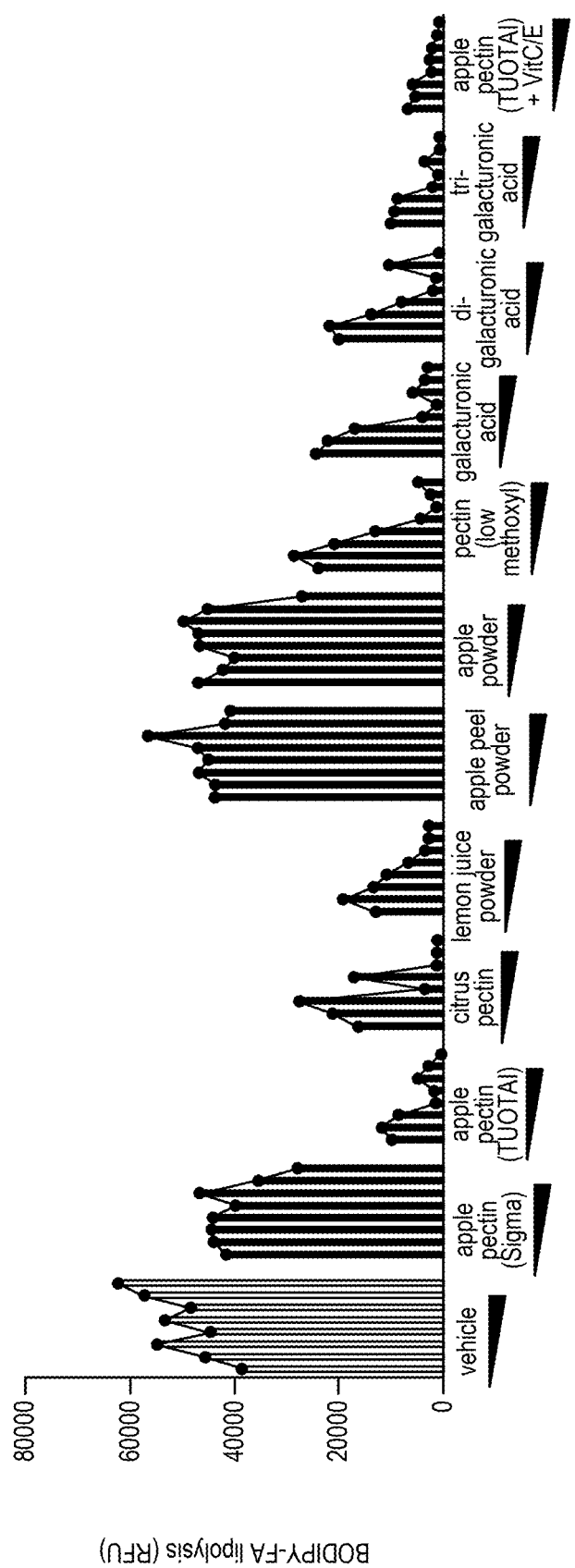

FIG. 4 depicts the results of lipase inhibition on human milk samples detected by quenched BODIPY-fatty acid conjugate from exemplary compounds alone or in combination as shown on the X axis. For all compounds tested except for vitamin C and vitamin E, the far-right bar of each compound series is 10 mg/mL (1% w/v) followed by 2-fold dilutions for each of the preceding bars. For vitamin C, the far-right bar of the series is 350 µg/mL followed by 2-fold dilutions for each of the preceding bars. For vitamin E, the far-right bar of the series is 150 µg/mL followed by 2-fold dilutions for each of the preceding bars.

Figure 5:
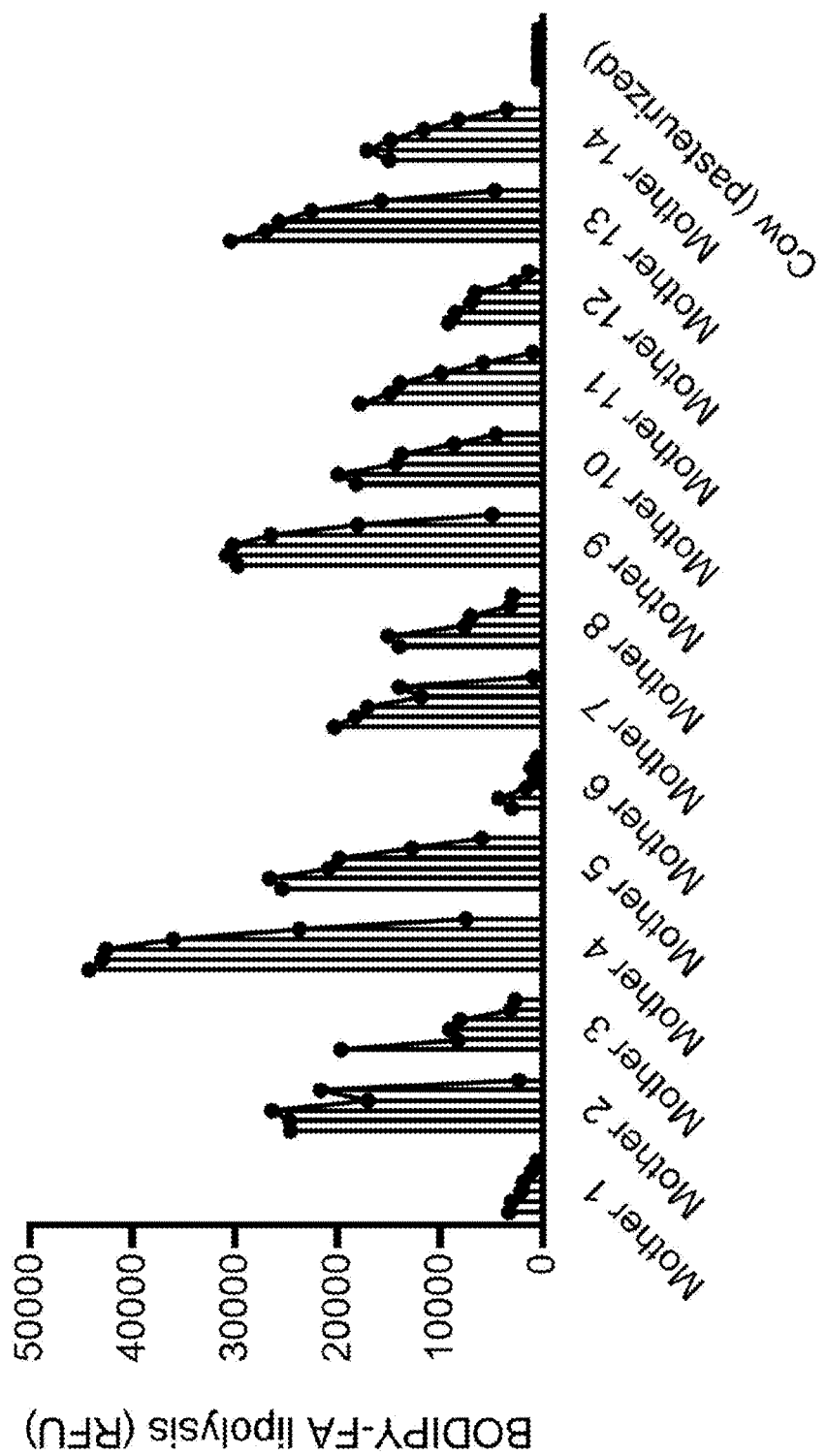

FIG. 5 depicts the results of lipase inhibition on 14 different donor human milk samples detected by BODIPY-fatty acid conjugate after storage with apple pectin (TUOTAI)+vitamin C+vitamin E. The samples were treated with no formulation and then dose increases 0.06%, 0.13%, 0.25%, and 1% of pectin, 22 µg/mL, 44 µg/mL, 88 µg/mL, 176 µg/mL, and 352 µg/mL of vitamin C, and 11 µg/mL, 22 µg/mL, 44 µg/mL, 88 µg/mL, and 176 µg/mL of vitamin E respectively from left to right.

Figure 6A:
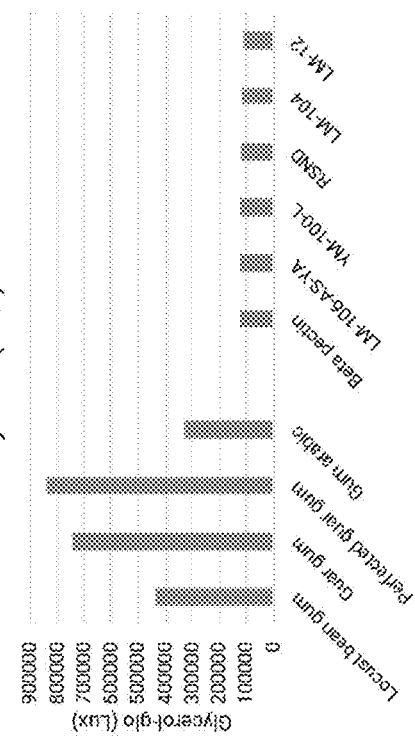
Figure 6B:
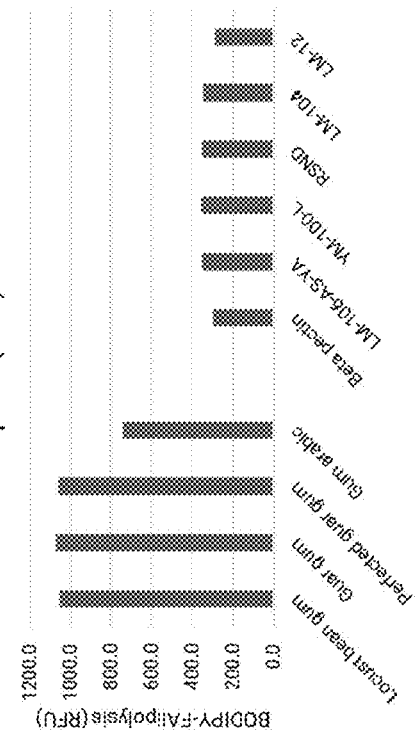
Figure 6C:
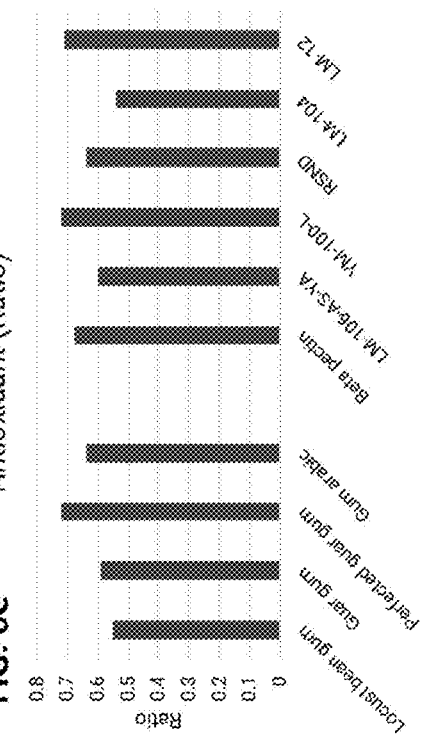

FIGS. 6A, 6B and 6C depict the results of lipase levels detected by BODIPY-fatty acid conjugate (FIG. 6A), glycerol levels detected by a glycerol-dependent, light-producing reaction presented as a measure of bioluminescence (FIG. 6B), and total antioxidant capacity (FIG. 6C) in stored human milk samples treated with either Locust bean gum, Guar gum, Perfected guar gum, Gum Arabic, GENU® Pectin Beta, GENU® Pectin LM-106 AS-YA, GENU®

Pectin YM-100-L, Pacific RSND Pectin, Pacific LM-104 Pectin, or Pacific LM-12 Pectin.

FIGS. 7A, 7B, 7C, 7D, 7E and 7F depict the results of lipase levels detected by BODIPY-fatty acid conjugate (FIG. 7A-FIG. 7C) and glycerol levels detected by a glycerol-dependent, light-producing reaction presented as a measure of bioluminescence (FIG. 7D-FIG. 7F) in human milk samples after storage. Lipase production was tested in human milk samples unpasteurized (RAW) or pasteurized by either batch pasteurization (BP), high temperature short time pasteurization (HTST), ultra-high temperature pasteurization (UHT), or ultra-pasteurization (UP) after being left untreated (FIG. 7A) or treated with 5 mg Pacific LM-12 Pectin+0.1014 mg vitamin C+2.7 µg of vitamin E per 1 mL of human (FIG. 7B). Lipase reduction fold change between treated and untreated samples was also determined (FIG. 7C). Glycerol levels were determined in human milk samples unpasteurized (RAW) or pasteurized by either batch pasteurization (BP), high temperature short time pasteurization (HTST), ultra-high temperature pasteurization (UHT), or ultra-pasteurization (UP) after being left untreated (FIG. 7D) or treated with 5 mg Pacific LM-12 Pectin+0.1014 mg vitamin C+2.7 µg of vitamin E per 1 mL of milk (FIG. 7E). Glycerol fold reduction between treated and untreated samples was also determined (FIG. 7F).

Figure 8A:
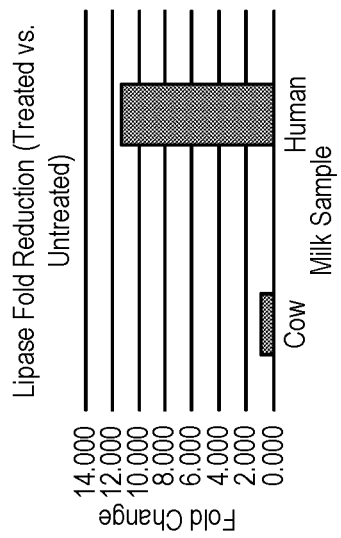
Figure 8B:
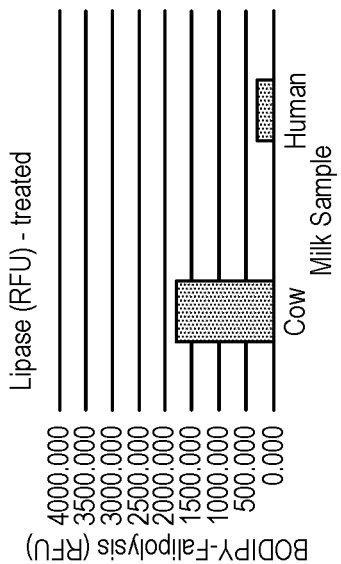
Figure 8C:
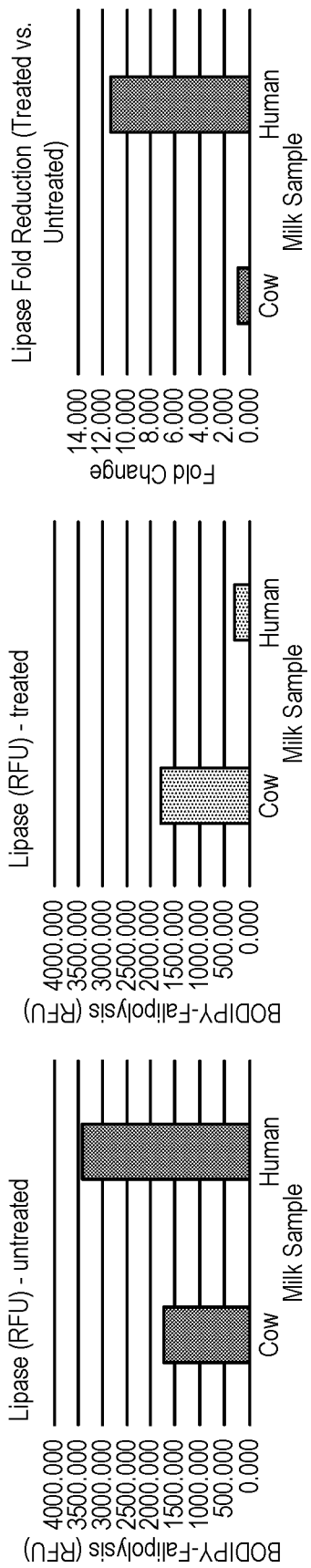
Figure 8D:
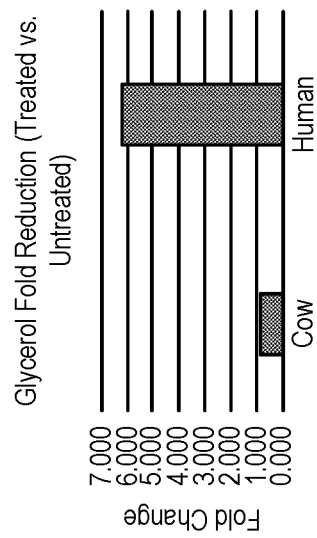
Figure 8E:
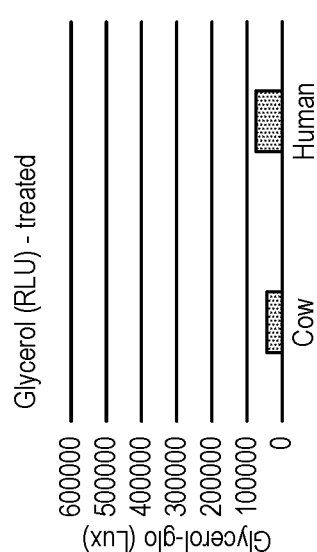
Figure 8F:
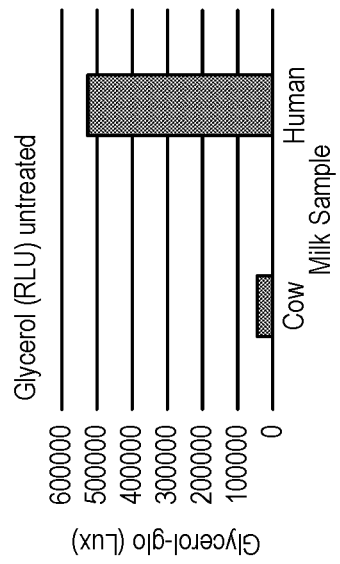

FIGS. 8A, 8B, 8C, 8D, 8E and 8F depict the results of lipase levels detected by BODIPY-fatty acid conjugate (FIG. 8A-FIG. 8C) and glycerol levels detected by a glycerol-dependent, light-producing reaction presented as a measure of bioluminescence (FIG. 8D-FIG. 8F) in unpasteurized cow milk and unpasteurized human milk after storage. Lipase production was tested in unpasteurized cow milk samples and unpasteurized human milk samples after being left untreated (FIG. 8A) or treated with 5 mg Pacific LM-12 Pectin+0.1014 mg vitamin C+2.7 µg of vitamin E per 1 mL of milk (FIG. 8B). Lipase reduction fold change between treated and untreated samples was also determined (FIG. 8C). Glycerol levels were determined in unpasteurized cow milk samples and unpasteurized human milk samples after being left untreated (FIG. 8D) or treated with 5 mg Pacific LM-12 Pectin+0.1014 mg vitamin C+2.7 µg of vitamin E (FIG. 8E). Glycerol fold change between treated and untreated samples was also determined (FIG. 8F).

Figure 9:
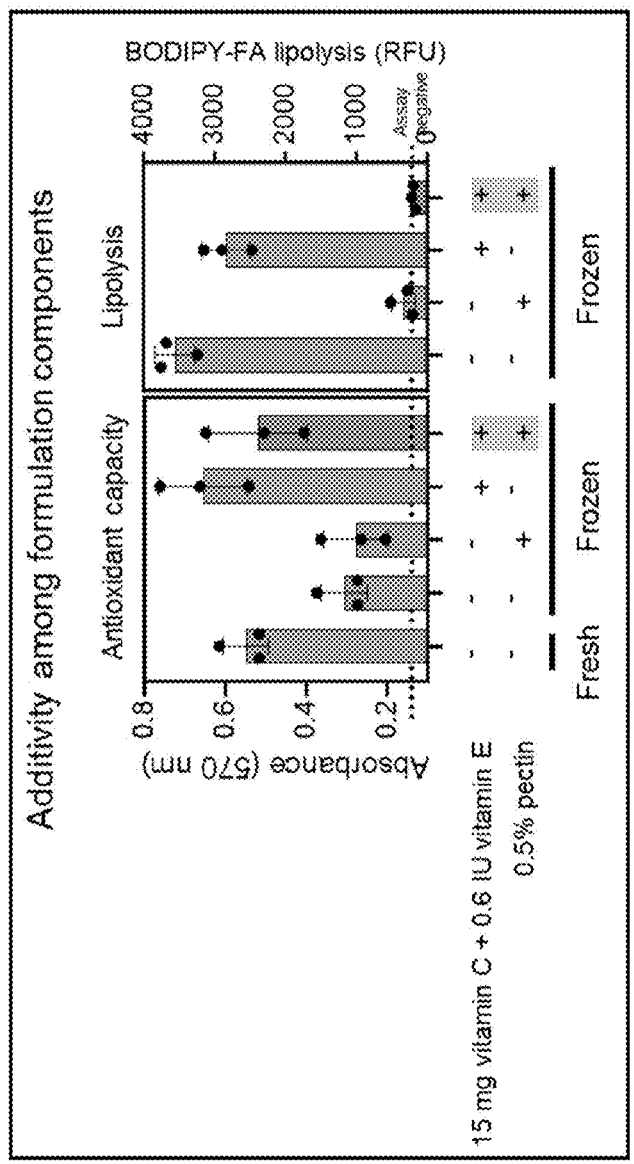

FIG. 9 depicts the results of antioxidant capacity (left) and lipase levels (right) in human milk samples from three different subjects. Samples were either left untreated, treated with 0.5% w/v (0.735 g) Pacific LM-12 Pectin, 15 mg vitamin C+0.6 IU (0.402 mg) vitamin E, or 0.5% w/v (0.735 g) Pacific LM-12 Pectin+15 mg vitamin C+0.6 IU (0.402 mg) vitamin E per 5 ounces of milk and stored (Frozen). Antioxidant capacity was determined in each sample as a measure of absorbance and results presented as an average from each treatment group. Fresh milk from each subject was left untreated and antioxidant capacity also determined. Lipase levels were detected by quenched BODIPY-fatty acid conjugate and presented as an average for each treatment group.

Figure 10:
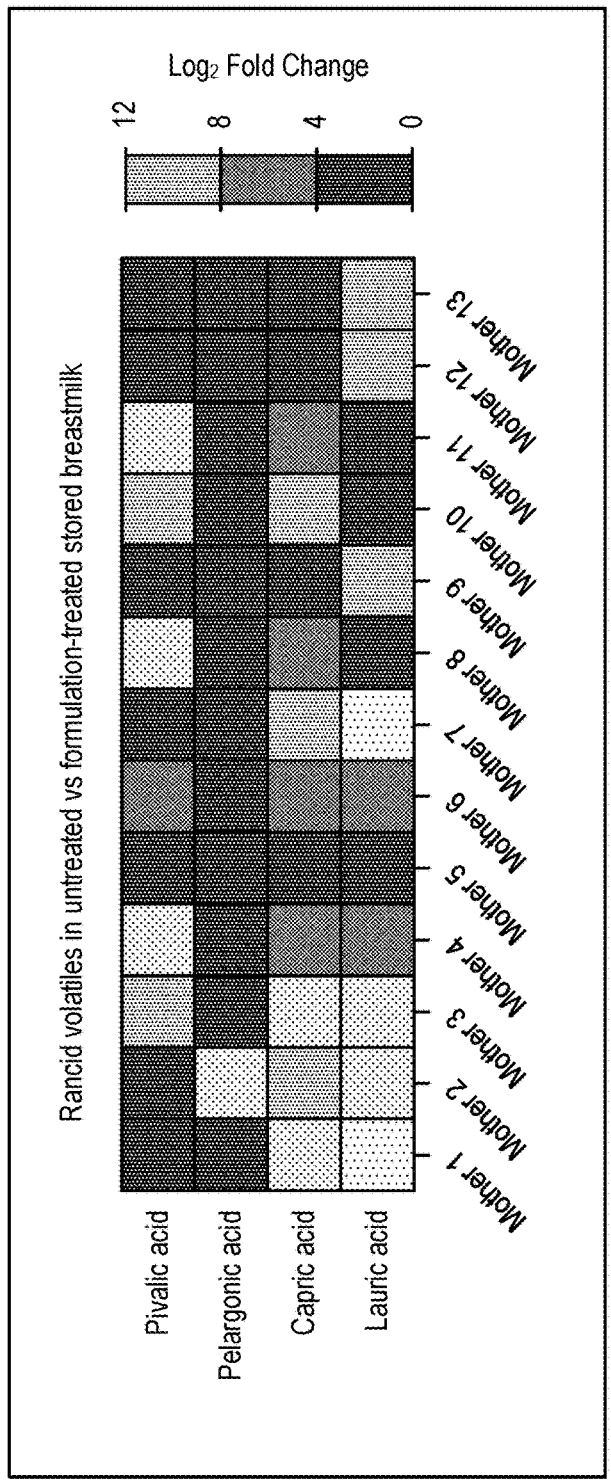

FIG. 10 depicts the results of headspace analysis of 13 different human milk samples after storage that were left untreated or treated with 5 mg Pacific LM-12 Pectin+0.1014 mg vitamin C+2.7 µg of vitamin E per 1 mL of milk. Results are presented as a $Log_2$ Fold Change between treated and untreated samples for Rancid volatiles Pivalic acid, Pelargonic acid, Capric acid, and Lauric acid as presented on the left Y axis.

Figure 11:
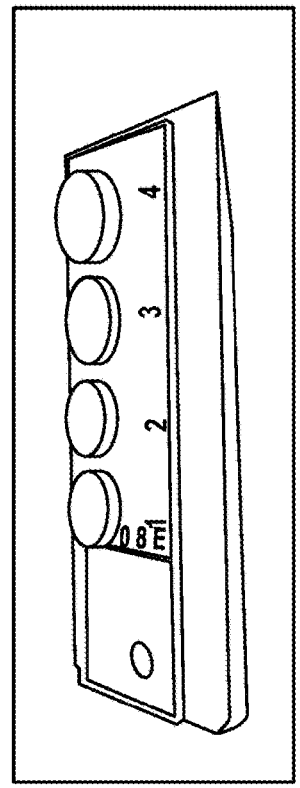

FIG. 11 depicts the formulation 0.5% w/v (0.735 g) Pacific LM-12 Pectin, 15 mg vitamin C, and 0.6 IU (0.402 mg) of vitamin E pressed with a LFA VICE Handheld Tablet Press per 5 ounces of milk. 1 represents 6 mm diameter and 1 mm thickness, 2 represents 6 mm diameter and 1.3 mm thickness, 3 represents 7.5 mm diameter and 0.5 mm thickness and 4 represents 7.5 mm diameter and 1.3 mm thickness.

Figure 12A:
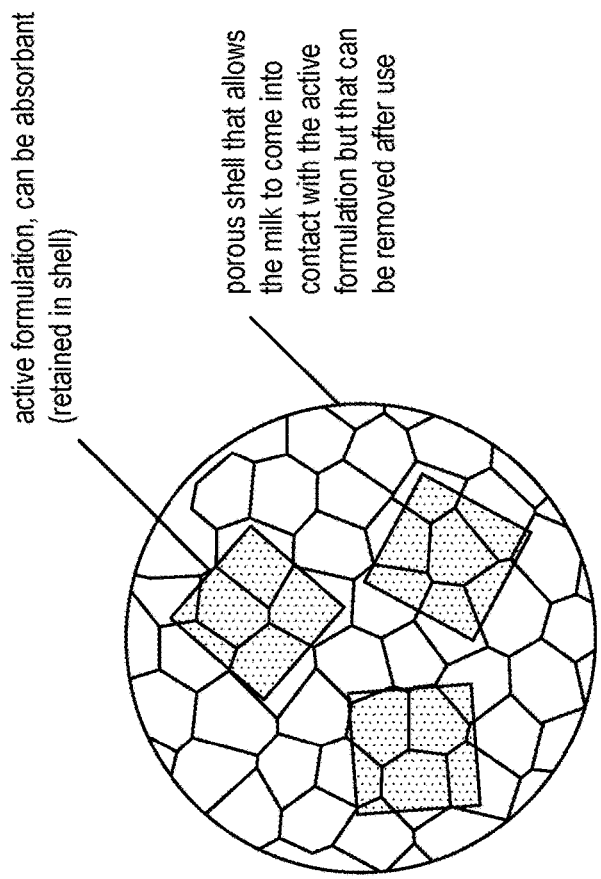
Figure 12B:
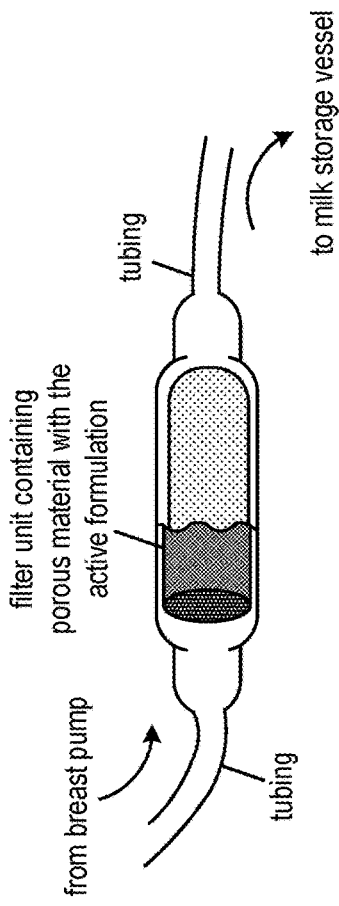

FIGS. 12A and 12B depict an illustration of a vented capsule (FIG. 12A) and a filtration unit (FIG. 12B).

DETAILED DESCRIPTION

Definitions

Embodiments according to the present disclosure will be described more fully hereinafter. Aspects of the disclosure may, however, be embodied in different forms and should not be construed as limited to the embodiments set forth herein. Rather, these embodiments are provided for completeness, and will fully convey the scope of the invention(s) to those skilled in the art. The terminology used in the description herein is for the purpose of describing particular embodiments only and is not intended to be limiting.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The terminology used in the description herein is for the purpose of describing particular embodiments only and is not intended to be limiting. All publications, patent applications, patents and other references mentioned herein are incorporated by reference in their entirety.

The practice of the present technology will employ, unless otherwise indicated, conventional techniques of molecular biology, microbiology, chemical engineering, and cell biology, which are within the skill of the art.

Unless the context indicates otherwise, it is specifically intended that the various features of the disclosure described herein can be used in any combination. Moreover, the disclosure also contemplates that in some embodiments, any feature or combination of features set forth herein can be excluded or omitted. To illustrate, if the specification states that a complex comprises components A, B and C (or A, B, and/or C), it is specifically intended that any of A, B or C, or a combination thereof, can be omitted and disclaimed singularly or in any combination.

All numerical designations, e.g., pH, temperature, time, concentration, and molecular weight, including ranges, are approximations which are varied (+) or (−) by increments of 1.0 or 0.1, as appropriate, or alternatively by a variation of +/−15%, or alternatively 10%, or alternatively 5%, or alternatively 2%. It is to be understood, although not always explicitly stated, that all numerical designations are preceded by the term "about" and that this term would be understood by the person of ordinary skill in the art and would also be understood to vary to some extent depending on context, and in some contexts this term may encompass any of the aforementioned variations. It also is to be understood, although not always explicitly stated, that the reagents described herein are merely exemplary and that equivalents of such are known in the art.

As used herein and in the appended claims, the singular forms "a," "an" and "the" are intended to include the plural forms as well as well as the singular form, unless the context clearly indicates otherwise.

Also as used herein, "and/or" refers to and encompasses any and all possible combinations of one or more of the associated listed items, as well as the lack of combinations when interpreted in the alternative ("or").

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, the terms "acceptable," "effective," or "sufficient" refer to the selection of any components, ranges, dose forms, etc. disclosed herein intend that said component, range, dose form, etc., is suitable for the disclosed purpose.

As used herein, the terms "emulsifying agent" or "emulsifier" refers to any chemical compound that permits the mixing of two or more immiscible liquids. Additionally, emulsifying agents maintain the stability of a mixture (i.e., at least two parts) and prevent the individual elements from separation.

As used herein, term "antioxidant" refers to any chemical compound that inhibits oxidant properties, such as, oxidation (i.e., a chemical reaction that can produce free radicals). In some embodiments, the antioxidant properties may only be observed in vitro. In some embodiments, antioxidants can be food-safe preservatives or antimicrobial agents.

As used herein, the term "ice-structuring protein" or "ice-binding protein" refers to a class of polypeptides produced by animals, plants, fungi, and bacteria. Ice-structuring proteins can act as a food preservative. Non-limiting examples include anti-freeze proteins and ice nucleation proteins that interact with ice and can influence ice crystal size and ice crystal structure. In general, ice-structuring proteins preserve the structure of milk.

As used herein, the terms "lipase inhibitor" refers to a molecule that is able to specifically bind to a lipase and prevent lipolysis. As used herein, the term "lipolysis" refers to the process of breakdown of fats and other lipids by hydrolysis to release fatty acids.

As used herein, the terms "synthetic human milk," "artificial milk" or "engineered laboratory milk" refers to manufactured milk made from fermentation or human cell lines.

As used herein, the term "preserve" refers to maintaining an original state or existing state.

As used herein, the terms "ANGPTL3" and "angiopoietin like 3" refers to an ANGPTL3 protein, peptide, or polypeptide. A non-limiting example includes, for example, Genbank Accession No. NM_014495.4 of which is incorporated by reference in its entirety. Additionally, the term "ANGPTL3" may also refer to nucleic acid sequences encoding an ANGPTL3 protein, peptide, or polypeptide. An example of an ANGPTL3 transcript is Genbank Accession No. NM_014495.4, which is incorporated by reference in its entirety. The term "ANGPTL3" may also include other ANGPTL3 encoding sequences, such as ANGPTL3 isoforms, mutant ANGPTL3 genes, splice variants of ANGPTL3 genes, and ANGPTL3 gene polymorphisms. The term "ANGPTL3" may also refer to a nucleic acid sequence that encodes the polypeptide gene product of an ANGPTL3 gene/transcript, e.g., an ANGPTL3 protein, peptide, or polypeptide as disclosed herein.

As used herein, the terms "ANGPTL8," "angiopoietin like 8," and "lipasin" refers to an ANGPTL8 protein, peptide, or polypeptide. A non-limiting example includes, for example, Genbank Accession No. NM_018687.7 of which is incorporated by reference in its entirety. Additionally, the term "ANGPTL8" may also refer to nucleic acid sequence encoding an ANGPTL8 protein, peptide, or polypeptide. An example of an ANGPTL8 transcript is Genbank Accession No. NM_018687.7, which is incorporated by reference in its entirety. The term "ANGPTL8" may also include other ANGPTL8 encoding sequences, such as ANGPTL8 isoforms, mutant ANGPTL8 genes, splice variants of ANGPTL8 genes, and ANGPTL8 gene polymorphisms. The term "ANGPTL8" may also refer to a nucleic acid sequence that encodes the polypeptide gene product of an ANGPTL8 gene/transcript, e.g., an ANGPTL8 protein, peptide, or polypeptide as disclosed herein.

As used herein, the terms "ANGPTL4" or "angiopoietin like 4," refers to an ANGPTL4 protein, peptide, or polypeptide. A non-limiting example includes, for example, Genbank Accession No. NM_139314.3 of which is incorporated by reference in its entirety. Additionally, the term "ANGPTL4" may also refer to nucleic acid sequence encoding an ANGPTL4 protein, peptide, or polypeptide. An example of an ANGPTL4 transcript is Genbank Accession No. NM_139314.3, which is incorporated by reference in its entirety. The term "ANGPTL4" may also include other ANGPTL4 encoding sequences, such as ANGPTL4 isoforms, mutant ANGPTL4 genes, splice variants of ANGPTL4 genes, and ANGPTL4 gene polymorphisms. The term "ANGPTL4" may also refer to a nucleic acid sequence that encodes the polypeptide gene product of an ANGPTL4 gene/transcript, e.g., an ANGPTL8 protein, peptide, or polypeptide as disclosed herein.

As used herein, the terms "milk storage vessel," "milk collection container" or "storage container" can be anything suitable for storing human milk. Non-limiting examples include plastic cups, plastic human milk storage bags, or a plastic biological collection container, suitable for collecting biological samples and biological fluids.

Compositions for Preserving Human Milk

In one embodiment, the disclosed approach comprises a composition of matter/process in which the user adds a formulation to human milk after it is expressed but before it is stored that protects the milk from the lipolysis and oxidation that occurs during storage. The active component of the formulation can comprise a single agent or a mixture of agents (e.g., surfactants, proteins, and/or nanoparticles that act as emulsifiers). Representative surfactants that are generally recognized as safe include polysorbates and citric acid esters of mono- and diglycerides. The agent can also comprise a naturally derived emulsifier such as saponin-rich quillaia extract. In addition to emulsification, the formulation(s) can comprise antioxidants and food-safe preservatives, such as ascorbic acid-tocopherol blends, EDTA, phospholipids, egg yolk, lambda-carrageenan and/or antimicrobial agents. The former group protects against rancidity by oxidation, and the latter protects against microbial fermentation. The formulation can additionally make use of ice-structuring proteins (aka anti-freeze proteins) to maintain the emulsified structure of the milk during storage and repeated freeze/thaw cycles. The formulation can additionally comprise known Lipoprotein Lipase (LPL) inhibitory proteins, including Angiopoietin-like proteins (ANGPTL 3, 4, and 8), small molecule lipase inhibitors, and/or milk-stabilizing proteins such as lactoperoxidase. Notably: the above examples could be used alone or in combination.

This present disclosure provides for compositions for preserving human milk that is expressed and stored. In general, the disclosed composition comprises at least one active ingredient that can prevent rancidity, extend the shelf-life, and maintain the nutritional properties of the human milk when stored for one or more days.

In some embodiments, the composition as disclosed herein comprises at least one active ingredient selected from at least one emulsifying agent, at least one antioxidant, at least one ice-structuring protein, at least one lipoprotein lipase (LPL) inhibitory protein, at least one small molecule lipase inhibitor, at least one milk-stabilizing protein, at least one glycosaminoglycan, at least one flavonoid, or a combination thereof. In some embodiment one or more active ingredients are selected from an emulsifying agent, an antioxidant, an ice-structuring protein, a lipoprotein lipase (LPL) inhibitory protein, a small molecule lipase inhibitor, a milk-stabilizing protein, a glycosaminoglycan, a flavonoid or a combination thereof. In some embodiments, the composition comprises one or more emulsifying agents. In some embodiments, the composition comprises one or more antioxidants. In some embodiments, the composition comprises one or more ice-structuring proteins. In some embodiments, the composition comprises one or more lipoprotein lipase (LPL) inhibitory proteins. In some embodiments, the composition comprises one or more small molecule lipase inhibitors. In some embodiments, the composition comprises one or more milk-stabilizing proteins. In some embodiments, the composition comprises one or more glycosaminoglycans. In some embodiments, the composition comprises one or more flavonoids. In some embodiments, the composition comprises one or more, two or more, three or more, four or more, five or more, six or more, seven or more, or eight or more active ingredients. In some embodiments, the composition comprises one or more active ingredients as disclosed in Tables 1-12. In some embodiments, the composition comprises at least one active ingredient. In some embodiments, the composition comprises one or more active ingredients. In some embodiments, the composition comprises one or more, two or more, three or more, four or more, five or more, six or more, seven or more, eight or more, nine or more, or ten or more active ingredients.

In some embodiments, a composition as disclosed herein preserves human milk comprising pectin, vitamin C, and vitamin E. Vitamin C can be referred to as ascorbic acid and vitamin E can be referred to as tocopherol. In some embodiments, the vitamin is synthetic vitamin E or natural vitamin E. In some embodiments, the vitamin E is synthetic vitamin E. In some embodiments, the vitamin is natural vitamin E. In some embodiments, the composition as disclosed herein can comprise a combination of synthetic and natural vitamin E. In some embodiments, the ascorbic acid is an ascorbic acid derivative. In some embodiments, the tocopherol is a tocopherol derivative. In some embodiments, the vitamin C and vitamin E is a vitamin C-vitamin E blend. In some embodiments, the pectin alone decreases or inhibits lipase activity but does not maintain antioxidant activity. In some embodiments, the vitamin C alone does not decrease or inhibit lipase activity but does maintain antioxidant activity. In some embodiments, the vitamin E alone does not decrease or inhibit lipase activity but does maintain antioxidant activity. In some embodiments, the vitamin C and vitamin E in combination do not decrease or inhibit lipase activity but do maintain antioxidant activity. In some embodiments, pectin, vitamin C, and vitamin work synergistically to decrease or inhibit lipase activity and maintain antioxidant activity. In some embodiments, the composition further comprises lecithin.

In some embodiments, the composition comprises at least one emulsifying agent selected from a surfactant, a protein and/or a nanoparticle that acts as an emulsifier. In general, a surfactant is a detergent. Nonionic surfactants are used as excipients in infant medication. In some embodiments, the composition comprises at least one surfactant. In some embodiments, the at least one surfactant is a polysorbate, a citric acid ester of mono- and diglycerides, and/or naturally derived emulsifier. In some embodiments, the at least one surfactant is a nonionic surfactant. In some embodiments, the at least one nonionic surfactant is selected from Tween™ 20, Tween™ 40, Tween™ 60, or Tween™ 80. In some embodiments, the nonionic surfactant is Tween™ 20. In some embodiments, the nonionic surfactant is Tween™ 40. In some embodiments, the nonionic surfactant is Tween™ 60. In some embodiments, the nonionic surfactant is Tween™ 80.

In some embodiments, the composition comprises at least one naturally derived emulsifier. In some embodiments, the at least one naturally derived emulsifier is lectin and/or saponin-rich quillaia extract. In some embodiments, the lectin is from sunflower or soy.

In some embodiments, the emulsifying agent is a pectin. In some embodiments, the composition comprises at least one pectin. In some embodiments, the composition comprises one or more pectins. In general, pectins may interact with emulsified substrates and inhibit the adsorption of lipase to the surface of substrate emulsion. In some embodiments, the pectin is poly-D-galacturonic acid methyl ester. In some embodiments, the pectin is apple pectin, citrus pectin, beet pectin, okra pectin, or kiwifruit pectin. In some embodiments, the pectin is selected from the group consisting of apple pectin, citrus pectin, beet pectin, okra pectin, and kiwifruit pectin. In some embodiments, the pectin is apple pectin. In some embodiments, the pectin is citrus pectin. In some embodiments, the pectin is beet pectin. In some embodiments, the pectin is okra pectin. In some embodiments, the pectin is kiwifruit pectin. In some embodiments, the pectin is low methoxyl pectin, low methoxyl amidated pectin, or high methoxyl pectin. In some embodiments, then pectin in low methoxyl pectin. In some embodiments, the pectin is low methoxyl amidated pectin. In some embodiments, then pectin is high methoxyl pectin. In some embodiments, the pectin is a pectin subunit. In some embodiments, the pectin subunit is selected from galacturonic acid, di-galacturonic acid, or tri-galacturonic acid. In some embodiments, the pectin subunit is selected from the group consisting of galacturonic acid, di-galacturonic acid, and tri-galacturonic acid. In some embodiments, the pectin is selected from GENU® Pectin Beta, GENU® Pectin LM-106 AS-YA, GENU® Pectin YM-100-L, Pacific RSND Pectin, Pacific LM-104 Pectin, or Pacific LM-12 Pectin. In some embodiments, the pectin is Pacific LM-12 Pectin. In some embodiments, Pacific LM-12 Pectin is a citrus pectin.

In some embodiments, the amount of pectin in the composition may be between about 0.03 mg/mL to about 20 mg/mL. In some embodiments, the amount of pectin in the composition may be between about 0.03 mg/mL to about 1 mg/mL, between about 0.03 mg/mL to about 2 mg/mL, between about 0.03 mg/mL to about 3 mg/mL, between about 1 mg/mL to about 2 mg/mL, between about 1 mg/mL to about 3 mg/mL, between about 2 mg/mL to about 3 mg/mL, between about 2 mg/mL to about 4 mg/mL, between about 2 mg/mL to about 5 mg/mL, between about 3 mg/mL to about 4 mg/mL, between about 3 mg/mL to about 5 mg/mL, between about 3 mg/mL to about 6 mg/mL, between 4 mg/mL to about 5 mg/mL, between 4 mg/mL to about 6 mg/mL, between about 4 mg/mL to about 7 mg/mL, between about 5 mg/mL to about 6 mg/mL, between about 5 mg/mL to about 7 mg/mL, between about 5 mg/mL to about 8 mg/mL, between 6 mg/mL to about 7 mg/mL, between about 6 mg/mL to about 8 mg/mL, between about 6 mg/mL to about 9 mg/mL, between about 7 mg/mL to about 8 mg/mL, between about 7 mg/mL to about 9 mg/mL, between about 7 mg/mL to about 10 mg/mL, between about 8 mg/mL to about 9 mg/mL, between about 8 mg/mL to about 10 mg/mL, between about 8 mg/mL to about 11 mg/mL, between about 9 mg/mL to about 10 mg/mL, between about 9 mg/mL to about 11 mg/mL, between about 9 mg/mL to about 12 mg/mL, between about 10 mg/mL to about 11 mg/mL, between about 10 mg/mL to about 12 mg/mL, between about 10 mg/mL to about 13 mg/mL, between about 11 mg/mL to about 12 mg/mL, between about 11 mg/mL to about 13 mg/mL, between about 11 mg/mL to about 14 mg/mL, between about 12 mg/mL to about 13 mg/mL, between about 12 mg/mL to about 14 mg/mL, between about 12 mg/mL to about 15 mg/mL, between about 13 mg/mL to about 14 mg/mL, between about 13 mg/mL to about 15 mg/mL, between about 13 mg/mL to about 16 mg/mL, between about 14 mg/mL to about 15 mg/mL, between about 14 mg/mL to about 16 mg/mL, between about 14 mg/mL to about 17 mg/mL, between about 15 mg/mL to about 16 mg/mL, between about 15 mg/mL to about 17 mg/mL, between about 15 mg/mL to about 18 mg/mL, between 16 mg/mL to about 17 mg/mL, between about 16 mg/mL to about 18 mg/mL, between 16 mg/mL to about 19 mg/mL, between about 17 mg/mL to about 18 mg/mL, between about 17 mg/mL to about 19 mg/mL, between about 17 mg/mL to about 20 mg/mL, between about 18 mg/mL to about 19 mg/mL, between about 18 mg/mL to about 20 mg/mL, or between about 19 mg/mL to about 20 mg/mL. In some embodiments, the amount of pectin in the composition may be between about 0.034 mg/mL to about 9 mg/mL.

In some embodiments, the amount of pectin in the composition may be at least 0.03 mg/mL, at least 1 mg/mL, at least 2 mg/mL, at least 3 mg/mL, at least 4 mg/mL, at least 5 mg/mL, at least 6 mg/mL, at least 7 mg/mL, at least 8 mg/mL, at least 9 mg/mL, at least 10 mg/mL, at least 11 mg/mL, at least 12 mg/mL, at least 13 mg/mL, at least 14 mg/mL, at least 15 mg/mL, at least 16 mg/mL, at least 17 mg/mL, at least 18 mg/mL, at least 19 mg/mL, or at least 20 mg/mL. In some embodiments, the amount of pectin in the composition may be about 0.03 mg/mL, about 1 mg/mL, about 2 mg/mL, about 3 mg/mL, about 4 mg/mL, about 5 mg/mL, about 6 mg/mL, about 7 mg/mL, about 8 mg/mL, about 9 mg/mL, about 10 mg/mL, about 11 mg/mL, about 12 mg/mL, about 13 mg/mL, about 14 mg/mL, about 15 mg/mL, about 16 mg/mL, about 17 mg/mL, about 18 mg/mL, about 19 mg/mL, or about 20 mg/mL.

In some embodiments, the amount of pectin is 20 mg/mL. In some embodiments, the amount of pectin is 0.034 mg/mL. In some embodiments, the amount of pectin is 5 mg/mL. In some embodiments, the amount of pectin is 9 mg/mL.

In some embodiments, the amount of pectin in the composition may be between about 0.034 mg to about 9 mg. In some embodiments, the amount of pectin in the composition may be between about 0.03 mg to about 0.1 mg, between about 0.03 mg to about 0.3 mg, between about 0.03 mg to about 0.9 mg, between about 0.1 mg to about 0.3 mg, between about 0.1 mg to about 0.9 mg, between about 0.1 mg to about 2.7 mg, between about 0.3 mg to about 0.9 mg, between about 0.3 mg to about 2.7 mg, between about 0.9 mg to about 9 mg, or between about 2.7 mg to about 9 mg.

In some embodiments, the amount of pectin in the composition may be between about 5 mg to about 75 mg. In some embodiments, the amount of pectin in the composition may be between about 5 mg to about 10 mg, between about 5 mg to about 20 mg, between about 5 mg to about 30 mg, between about 10 mg to about 20 mg, between about 10 mg to about 30 mg, between about 10 mg to about 40 mg, between about 20 mg to about 30 mg, between about 20 mg to about 40 mg, between about 20 mg to about 50 mg, between about 30 mg to about 40 mg, between about 30 mg to about 50 mg, between about 30 mg to about 60 mg, between about 40 mg to about 50 mg, between about 40 mg to about 60 mg, between about 40 mg to about 70 mg, between about 50 mg to about 60 mg, between about 50 mg to about 70 mg, between about 50 mg to about 75 mg, between about 60 mg to about 70 mg, or between about 60 mg to about 75 mg.

In some embodiments, the amount of pectin in the composition may be between about 5 mg to about 1332 mg. In some embodiments, the amount of pectin in the composition may be between about 5 mg to about 100 mg, between about 5 mg to about 200 mg, between about 5 mg to about 3000 mg, between about 100 mg to about 200 mg, between about 100 mg to about 300 mg, between about 100 mg to about 400 mg, between about 200 mg to about 300 mg, between about 200 mg to about 400 mg, between about 200 mg to about 500 mg, between about 300 mg to about 400 mg, between about 300 mg to about 500 mg, between about 300 mg to about 600 mg, between about 400 mg to about 500 mg, between about 400 mg to about 600 mg, between about 400 mg to about 700 mg, between about 500 mg to about 600 mg, between about 500 mg to about 700 mg, between about 500 mg to about 800 mg, between about 600 mg to about 700 mg, between about 600 mg to about 800 mg, between about 600 mg to about 900 mg, between about 700 mg to about 800 mg, between about 700 mg to about 900 mg, between about 700 mg to about 1000 mg, between about 800 mg to about 900 mg, between about 800 mg to about 1000 mg, between about 800 mg to about 1100 mg, between about 900 mg to about 1000 mg, between about 900 mg to about 1100 mg, between about 900 mg to about 1200 mg, between about 1000 mg to about 1100 mg, between about 1000 mg to about 1200 mg, between about 1000 mg to about 1300 mg, between about 1100 mg to about 1200 mg, between about 1100 mg to about 1300 mg, between about 1200 mg to about 1300 mg, or between about 1200 mg to about 1332 mg.

In some embodiments, the amount of pectin in the composition may be between about 34 mg to about 9000 mg. In some embodiments, the amount of pectin in the composition may be between about 34 mg to about 100 mg, between about 34 mg to about 300 mg, between about 34 mg to about 900 mg, between about 100 mg to about 300 mg, between about 100 mg to about 900 mg, between about 100 mg to about 2750 mg, between about 300 mg to about 900 mg, between about 300 mg to about 2750 mg, between about 300 mg to about 8200 mg, or between about 900 mg to about 2750 mg, between about 900 mg to about 8200 mg, between about 900 mg to about 9000 mg, between about 2750 mg to about 8200 mg, between about 2750 mg to about 9000 mg, or between about 8200 mg to about 9000 mg.

In some embodiments, the amount of pectin is about 5 mg. In some embodiments, the amount of pectin is 75 mg. In some embodiments, the amount of pectin is 735 mg. In some embodiments, the amount of pectin is about 1332 mg. In some embodiments, the amount of pectin is 9000 mg.

In some embodiments, the amount of pectin is about 0.003% w/v, about 0.03% w/v, about 0.1% w/v, about 0.2% w/v, about 0.3% w/v, about 0.4% w/v, about 0.5% w/v, about 0.6% w/v, about 0.7% w/v, about 0.8% w/v, 0.9% w/v, or about 1% or more w/v.

In some embodiments, the composition comprises at least one antioxidant. In some embodiments, the at least one antioxidant is selected from a food safe preservative or an antimicrobial agent. In some embodiments, the composition comprises one or more antioxidants. In some embodiments, the composition comprises at least two antioxidants. In some embodiments, the antioxidant is selected from vitamin C or a derivative thereof, Vitamin E or a derivative thereof, a vitamin C-vitamin E blend, ethylenediaminetetraacetic acid (EDTA) or a derivative thereof, a phospholipid, egg yolk, or a lambda-carrageenan. In some embodiments, the composition comprises vitamin C and vitamin E.

In some embodiments, as disclosed herein, the amount of vitamin C in the composition may be between about 0.6 µg/mL and about 350 µg/mL. In some embodiments, the amount of vitamin C may be between about 0.6 µg/mL to 10 µg/mL, between about 0.6 µg/mL to about 20 µg/mL, between about 0.6 µg/mL to about 30 µg/mL, between about 10 µg/mL to about 20 µg/mL, between about 10 µg/mL to about 30 µg/mL, between about 10 µg/mL to about 40 µg/mL, between about 10 µg/mL to about 50 µg/mL, between about 20 µg/mL to about 30 µg/mL, between about 20 µg/mL to about 40 µg/mL, between about 20 µg/mL to about 50 µg/mL, between about 30 µg/mL to about 40 µg/mL, between about 30 µg/mL to about 50 µg/mL, between about 30 µg/mL to about 60 µg/mL, between about 40 µg/mL to about 50 µg/mL, between about 40 µg/mL to about 60 µg/mL, between about 40 µg/mL to about 70 µg/mL, between about 50 µg/mL to about 60 µg/mL, between about 50 µg/mL to about 70 µg/mL, between about 50 µg/mL to about 80 µg/mL, between about 60 µg/mL to about 70 µg/mL, between about 60 µg/mL to about 80 µg/mL, between about 60 µg/mL to about 90 µg/mL, between about 70 µg/mL to about 80 µg/mL, between about 70 µg/mL to about 90 µg/mL, between about 80 µg/mL to about 90 µg/mL, between about 80 µg/mL to about 100 µg/mL, between about 80 µg/mL to about 110 µg/mL, between about 90 µg/mL to about 100 µg/mL, between about 90 µg/mL to about 110 µg/mL, between about 90 µg/mL to about 120 µg/mL, between about 100 µg/mL to about 110 µg/mL, between about 100 µg/mL to about 120 µg/mL, between about 100 µg/mL to about 130 µg/mL, between about 110 µg/mL to about 120 µg/mL, between about 110 µg/mL to about 130 µg/mL, between about 110 µg/mL to about 140 µg/mL, between about 120 µg/mL to about 130 µg/mL, between about 120 µg/mL to about 140 µg/mL, between about 120 µg/mL to about 150 µg/mL, between about 130 µg/mL to about 140 µg/mL, between about 130 µg/mL to about 150 µg/mL, between about 130 µg/mL to about 160 µg/mL, between about 140 µg/mL to about 150 µg/mL, between about 140 µg/mL to about 160 µg/mL, between about 140 µg/mL to about 170 µg/mL, between about 150 µg/mL to about 160 µg/mL, between about 150 µg/mL to about 170 µg/mL, between about 150 µg/mL to about 180 µg/mL, between about 160 µg/mL to about 170 µg/mL, between about 160 µg/mL to about 180 µg/mL, between about 160 µg/mL to about 190 µg/mL, between about 170 µg/mL to about 180 µg/mL, between about 170 µg/mL to about 190 µg/mL, between about 180 µg/mL to about 190 µg/mL, between about 180 µg/mL to about 200 µg/mL, between about 180 µg/mL to about 210 µg/mL, between about 190 µg/mL to about 200 µg/mL, between about 190 µg/mL to about 210 µg/mL, between about 190 µg/mL to about 220 µg/mL, between about 200 µg/mL to about 210 µg/mL, between about 200 µg/mL to about 220 µg/mL, between about 200 µg/mL to about 230 µg/mL, between about 210 µg/mL to about 220 µg/mL, between about 210 µg/mL to about 230 µg/mL, between about 210 µg/mL to about 240 µg/mL, between about 220 µg/mL to about 230 µg/mL, between about 220 µg/mL to about 240 µg/mL, between about 220 µg/mL to about 250 µg/mL, between about 230 µg/mL to about 240 µg/mL, between about 230 µg/mL to about 250 µg/mL, between about 230 µg/mL to about 260 µg/mL, between about 240 µg/mL to about 250 µg/mL, between about 240 µg/mL to about 260 µg/mL, between about 240 µg/mL to about 270 µg/mL, between about 250 µg/mL to about 260 µg/mL, between about 250 µg/mL to about 270 µg/mL, between about 2250 µg/mL to about 80 µg/mL, between about 260 µg/mL to about 270 µg/mL, between about 260 µg/mL to about 280 µg/mL, between about 260 µg/mL to about 290 µg/mL, between about 270 µg/mL to about 280 µg/mL, between about 270 µg/mL to about 290 µg/mL, 270 µg/mL to about 300 µg/mL, between about 280 µg/mL to about 290 µg/mL, to about 280 µg/mL to 300 µg/mL, between about 280 µg/mL to about 310 µg/mL, between about 290 µg/mL to about 300 µg/mL, between about 290 µg/mL to about 310 µg/mL, 290 µg/mL to about 320 µg/mL, between about 300 µg/mL to about 310 µg/mL, between about 300 µg/mL to about 320 µg/mL, between about 300 µg/mL to about 330 µg/mL, between about 310 µg/mL to about 320 µg/mL, between about 310 µg/mL to about 330 µg/mL, between about 310 µg/mL to about 340 µg/mL, between about 320 µg/mL to about 330 µg/mL, between about 320 µg/mL to about 340 µg/mL, between about 330 µg/mL to about 340 µg/mL, between about 330 µg/mL to about 350 µg/mL, or between about 340 µg/mL to about 350 µg/mL. In some embodiments, the amount of vitamin C in the composition may be between about 0676 µg/mL to about 101 µg/mL.

In some embodiments, the amount of the amount of vitamin C in the composition may be at least 0.034 µg/mL, at least 2.5 µg/mL, at least 10 µg/mL, at least 20 µg/mL, at least 30 µg/mL, at least 40 µg/mL, at least 50 µg/mL, at least 60 µg/mL, at least 70 µg/mL, at least 80 µg/mL, at least 90 µg/mL, at least 100 µg/mL, at least 110 µg/mL, at least 120 µg/mL, at least 130 µg/mL, at least 140 µg/mL, at least 150 µg/mL, at least 160 µg/mL, at least 170 µg/mL, at least 180 µg/mL, at least 190 µg/mL, at least 200 µg/mL, at least 210 µg/mL, at least 220 µg/mL, at least 230 µg/mL, at least 240 µg/mL, at least 250 µg/mL, at least 260 µg/mL, at least 270 µg/mL, at least 280 µg/mL, at least 290 µg/mL, at least 300 µg/mL, at least 310 µg/mL, at least 320 µg/mL, at least 330 µg/mL, at least 340 µg/mL, or at least 350 µg/mL. In some embodiments, the amount of vitamin C in the composition may be about 2.5 µg/mL, about 10 µg/mL, about 20 µg/mL, about 30 µg/mL, about 40 µg/mL, about 50 µg/mL, about 60 µg/mL, about 70 µg/mL, about 80 µg/mL, about 90 µg/mL, about 100 µg/mL, about 110 µg/mL, about 120 µg/mL, about 130 µg/mL, about 140 µg/mL, about 150 µg/mL, about 160 µg/mL, about 170 µg/mL, about 180 µg/mL, about 190 µg/mL, about 200 µg/mL, about 210 µg/mL, about 220 µg/mL, about 230 µg/mL, about 240 µg/mL, about 250 µg/mL, about 260 µg/mL, about 270 µg/mL, about 280 µg/mL, about 290 µg/mL, about 300 µg/mL, about 310 µg/mL, about 320 µg/mL, about 330 µg/mL, about 340 µg/mL, or about 350 µg/mL.

In some embodiments, the amount of vitamin C in the composition may be between about 0.676 µg to about 101 µg. In some embodiments, the amount of vitamin C in the composition may be between about 0.6 µg to about 2.7 µg, between about 0.6 µg to about 10.8 µg, between about 0.6 µg to about 43.2 µg, between about 2.7 µg to about 10.8 µg, between about 2.7 µg to about 43.2 µg, between about 2.7 µg to about 101 µg, between about 10.8 µg to about 43.2 µg, between about 10.8 µg to about 101 µg, or between about 43.2 µg to about 101 µg.

In some embodiments, the amount of vitamin C in the composition may be between about 0.1 mg to about 15 mg. In some embodiments, the amount of vitamin C in the composition may be between about 0.1 mg to about 1 mg, between about 0.1 mg to about 2 mg, between about 0.1 mg to about 3 mg, between about 1 mg to about 2 mg, between about 1 mg to about 3 mg, between about 1 mg to about 4 mg, between about 2 mg to about 3 mg, between about 2 mg to about 4 mg, between about 2 mg to about 5 mg, between 3 mg to about 4 mg, between about 3 mg to about 5 mg, between 3 mg to about 6 mg, between about 4 mg to about 5 mg, between about 4 mg to about 6 mg, between 4 mg to about 7 mg, between about 5 mg to about 6 mg, between about 5 mg to about 7 mg, between about 5 mg to about 8 mg, between about 6 mg to about 7 mg, between about 6 mg to about 8 mg, between about 6 mg to about 9 mg, between about 7 mg to about 8 mg, between about 7 mg to about 9 mg, between about 7 mg to about 10 mg, between about 8 mg to about 9 mg, between about 8 mg to about 10 mg, between about 8 mg to about 11 mg, between about 9 mg to about 10 mg, between about 9 mg to about 11 mg, between about 9 mg to about 12 mg, between about 10 mg to about 11 mg, between about 10 mg to about 12 mg, between about 10 mg to about 13 mg, between about 11 mg to about 12 mg, between about 11 mg to about 13 mg, between about 11 mg to about 14 mg, between about 12 mg to about 13 mg, between about 12 mg to about 14 mg, between about 12 mg to about 15 mg, between about 13 mg to about 14 mg, between about 13 mg to about 15 mg, or between about 14 mg to about 15 mg.

In some embodiments, the amount of vitamin C in the composition may be between about 0.676 mg to about 101 mg. In some embodiments, the amount of vitamin C in the composition may be between about 0.6 mg to about 2.7 mg, between about 0.6 mg to about 10.8 mg, between about 0.6 mg to about 43.2 mg, between about 2.7 mg to about 10.8 mg, between about 2.7 mg to about 43.2 mg, between about 2.7 mg to about 101 mg, between about 10.8 mg to about 43.2 mg, between about 10.8 mg to about 101 mg, or between about 43.2 mg to about 101 mg.

In some embodiments, the amount of vitamin C in the composition is 0.1 mg. In some embodiments, the amount of vitamin C is 0.1014 mg. In some embodiments, the amount of vitamin C in the composition is 15 mg. In some embodiments, the amount of vitamin C in the composition is 101.4 mg.

In some embodiments, as disclosed herein, the amount of vitamin E in the composition may be between about 0.01 µg/mL and about 150 µg/mL. In some embodiments, the amount of vitamin E may be between about 0.01 µg/mL to 10 µg/mL, between about 0.01 µg/mL to about 20 µg/mL, between about 0.01 µg/mL to about 30 µg/mL, between about 10 µg/mL to about 20 µg/mL, between about 10 µg/mL to about 30 µg/mL, between about 10 µg/mL to about 40 µg/mL, between about 20 µg/mL to about 30 µg/mL, between about 20 µg/mL to about 40 µg/mL, between about 20 µg/mL to about 50 µg/mL, between about 30 µg/mL to about 40 µg/mL, between about 30 µg/mL to about 50 µg/mL, between about 30 µg/mL to about 60 µg/mL, between about 40 µg/mL to about 50 µg/mL, between about 40 µg/mL to about 60 µg/mL, between about 40 µg/mL to about 70 µg/mL, between about 50 µg/mL to about 60 µg/mL, between about 50 µg/mL to about 70 µg/mL, between about 50 µg/mL to about 80 µg/mL, between about 60 µg/mL to about 70 µg/mL, between about 60 µg/mL to about 80 µg/mL, between about 60 µg/mL to about 90 µg/mL, between about 70 µg/mL to about 80 µg/mL, between about 70 µg/mL to about 90 µg/mL, between about 80 µg/mL to about 90 µg/mL, between about 80 µg/mL to about 100 µg/mL, between about 80 µg/mL to about 110 µg/mL, between about 90 µg/mL to about 100 µg/mL, between about 90 µg/mL to about 110 µg/mL, between about 90 µg/mL to about 120 µg/mL, between about 100 µg/mL to about 110 µg/mL, between about 100 µg/mL to about 120 µg/mL, between about 100 µg/mL to about 130 µg/mL, between about 110 µg/mL to about 120 µg/mL, between about 110 µg/mL to about 130 µg/mL, between about 110 µg/mL to about 140 µg/mL, between about 120 µg/mL to about 130 µg/mL, between about 120 µg/mL to about 140 µg/mL, between about 120 µg/mL to about 150 µg/mL, between about 130 µg/mL to about 140 µg/mL, between about 130 µg/mL to about 150 µg/mL, or between about 140 µg/mL to about 150 µg/mL.

In some embodiments, the amount of vitamin E in the composition may be at least 0.01 µg/mL, at least 1.15 µg/mL, at least 10 µg/mL, at least 20 µg/mL, at least 30 µg/mL, at least 40 µg/mL, at least 50 µg/mL, at least 60 µg/mL, at least 70 µg/mL, at least 80 µg/mL, at least 90 µg/mL, at least 100 µg/mL, at least 110 µg/mL, at least 120 µg/mL, at least 130 µg/mL, at least 140 µg/mL, or at least 150 µg/mL. In some embodiments, the amount of vitamin E in the composition may be about 1.15 µg/mL, about 10 µg/mL, about 20 µg/mL, about 30 µg/mL, about 40 µg/mL, about 50 µg/mL, about 60 µg/mL, about 70 µg/mL, about 80 µg/mL, about 90 µg/mL, about 100 µg/mL, about 110 µg/mL, about 120 µg/mL, about 130 µg/mL, about 140 µg/mL, or about 150 µg/mL.

In some embodiments, the amount of vitamin E in the composition may be between about 0.0000271 IU to about 0.004 IU. In some embodiments, the amount of vitamin E in the composition may be between about 0.0000271 IU to about 0.0001 IU, between about 0.0000271 IU to about 0.0001 IU, between about 0.0000271 IU to about 0.0001 IU, between about 0.0001 IU to about 0.0004 IU, between about 0.0001 IU to about 0.001 IU, between about 0.0001 IU to about 0.004 IU, between about 0.0004 IU to about 0.001 IU, between about 0.0004 IU to about 0.004 IU, or between about 0.001 IU to about 0.004 IU.

In some embodiments, the amount of vitamin E in the composition may be between about 0.004 IU to about 0.6 IU. In some embodiments, the amount of vitamin E in the composition may be between about 0.004 IU to about 0.1 IU, between about 0.004 IU to about 0.2 IU, between about 0.004 IU to about 0.3 IU, between about 0.1 IU to about 0.2 IU, between about 0.1 IU to about 0.3 IU, between about 0.1 IU to about 0.4 IU, between about 0.2 IU to about 0.3 IU, between about 0.2 IU to about 0.4 IU, between about 0.2 IU to about 0.5 IU, between about 0.3 IU to about 0.4 IU, between about 0.3 IU to about 0.5 IU, between about 0.3 IU to about 0.6 IU, between about 0.4 IU to about 0.5 IU, between about 0.4 IU to about 0.6 IU, or between about 0.5 IU to about 0.6 IU.

In some embodiments, the amount of vitamin E in the composition may be between about 0.0271 IU to about 4 IU.

In some embodiments, the amount of vitamin E in the composition may be between about 0.0271 IU to about 0.1 IU, between about 0.0271 IU to about 0.4 IU, between about 0.0271 IU to about 1.7 IU between about 0.1 IU to about 0.4 IU, between about 0.1 IU to about 1.7 IU, between about 0.1 IU to about 4 IU, between about 0.4 IU to about 1.7 IU, between about 0.4 IU to about 4 IU, or between about 1.7 IU to about 4 IU.

In some embodiments the amount of vitamin E in the composition is about 0.004 IU. In some embodiments, the amount of vitamin E is about 0.00406 IU. In some embodiments the amount of vitamin E is about 0.6 IU. In some embodiments, the amount of vitamin E is about 4 IU.

In some embodiments, the amount of natural vitamin E in the composition may be between about 0.01 µg to about 2.68 µg. In some embodiments, the amount of natural vitamin E in the composition may be between about 0.01 µg to about 0.04 µg, between about 0.01 µg to about 0.16 µg, between about 0.01 µg to about 0.64 µg, between about 0.04 µg to about 0.16 µg, between about 0.04 µg to about 0.64 µg, between about 0.04 µg to about 2.68 µg, between about 0.16 µg to about 0.64 µg, between about 0.16 µg to about 2.68 µg, or between about 0.64 µg to about 2.68 µg.

In some embodiments, the amount of natural vitamin E in the composition may be between about 0.00268 mg to about 0.402 mg. In some embodiments, the amount of vitamin E in the composition may be about 0.002 mg or more, about 0.006 mg or more, about 0.018 mg or more, about 0.054 mg, about 0.162 mg or more, or about 0.4 mg or more. In some embodiments, the natural vitamin E is about 0.00268 mg. In some embodiments, the natural vitamin E is about 0.402 mg.

In some embodiments, the amount of natural vitamin E in the composition may be between about 0.01 mg to about 2.68 mg. In some embodiments, the amount of natural vitamin E in the composition may be between about 0.01 mg to about 0.04 mg, between about 0.01 mg to about 0.16 mg, between about 0.01 mg to about 0.64 mg, between about 0.04 mg to about 0.16 mg, between about 0.04 mg to about 0.64 mg, between about 0.04 mg to about 2.68 mg, between about 0.16 mg to about 0.64 mg, between about 0.16 mg to about 2.68 mg, or between about 0.64 mg to about 2.68 mg.

In some embodiments, the amount of natural vitamin E in the composition is about 0.00406 mg or about 0.402 mg. In some embodiments, the amount of natural vitamin E in the composition is about 2.68 mg.

In some embodiments, the amount of synthetic vitamin E in the composition may be between about 0.0122 µg to about 1.8 µg. In some embodiments, the amount of synthetic vitamin E in the composition may be between about 0.0122 µg to about 0.04 µg, between about 0.0122 µg to about 0.16 µg, between about 0.0122 µg to about 0.64 µg, between about 0.04 µg to about 0.16 µg, between about 0.04 µg to about 0.64 µg, between about 0.04 µg to about 1.8 µg, between about 0.16 µg to about 0.64 µg, between about 0.16 µg to about 1.8 µg, or between about 0.64 µg to about 1.8 µg.

In some embodiments, the amount of synthetic vitamin E in the composition may be between about 0.0122 mg to about 1.8 mg. In some embodiments, the amount of synthetic vitamin E in the composition may be between about 0.0122 mg to about 0.04 mg, between about 0.0122 mg to about 0.16 mg, between about 0.0122 mg to about 0.64 mg, between about 0.04 mg to about 0.16 mg, between about 0.04 mg to about 0.64 mg, between about 0.04 mg to about 1.8 mg, between about 0.16 mg to about 0.64 mg, between about 0.16 mg to about 1.8 mg, or between about 0.64 mg to about 1.8 mg.

In some embodiments, the amount of synthetic vitamin E in the composition may be between about 0.0018 mg to about 0.27 mg. In some embodiments, the amount of vitamin E in the composition may be about 0.001 mg or more, about 0.003 mg or more, about 0.009 mg or more, about 0.027 mg or more, about 0.081 mg or more, 0.2 mg or more. In some embodiments, the natural vitamin E is about 0.0018 mg. In some embodiments, the synthetic vitamin E is about 0.27 mg.

In some embodiments, the composition comprises at least one ice-structuring protein (i.e., ice binding protein). In some embodiments, the composition comprises at least one cryopreservative. In some embodiments, the cryopreservative is trehalose.

In general, lipolysis is a process where lipids or fats are broken down into free fatty acids, by lipases. Excess lipase activity can result in excess fatty acids and can accelerate rancidity of milk during storage. There are at least two types of lipases in human milk, bile salt-dependent lipase and lipoprotein lipase (LPL). Lipase inhibitors can block the function of lipases. In some embodiments, the composition comprises at least one lipase inhibitor. In some embodiments, the composition comprises at least one lipoprotein lipase (LPL) inhibitory protein. In some embodiments, the composition comprises one or more LPL inhibitory proteins. In some embodiments, the LPL inhibitory protein is ANGPTL3, ANGPTL4, and/or ANGPTL8. In some embodiments, the LPL inhibitory protein is selected from ANGPTL3, ANGPTL4, or ANGPTL8. In some embodiments, the LPL inhibitory protein is selected from ANGPTL3, ANGPTL4, and ANGPTL8. In some embodiments, the LPL inhibitory protein is ANGPTL3. In some embodiments, the LPL inhibitory protein is ANGPTL4. In some embodiments, the LPL inhibitory protein is ANGPTL8. In some embodiments, the composition may comprise one LPL inhibitory protein. In some embodiments, the one LPL inhibitory protein is one of ANGPTL3, ANGPTL4, or ANGPTL8. In some embodiments, the composition may comprise two LPL inhibitory proteins. In some embodiments, the two LPL inhibitory proteins are selected from ANGPTL3, ANGPTL4, or ANGPTL8. In some embodiments, the composition may comprise three LPL inhibitory proteins. In some embodiments, the three LPL inhibitory protein are ANGPTL3, ANGPTL4, and ANGPTL8. In some embodiments, the composition comprises a small molecule lipase inhibitor. In some embodiments, the lipase inhibitor is a lipase specific antibody. In some embodiments the lipase inhibitor is synthetic.

In some embodiments, the composition does not comprise one or more active ingredients that bind to lipase. In some embodiments, the composition does not comprise one or more active ingredients that are antibodies or proteins that bind to, or directly interact with lipase. In some embodiments, the composition does not comprise one or more active ingredients that are antibodies or proteins that bind to LPL. In some embodiments, the one or more active ingredients is not a lipase inhibitor selected from GSK264220A, Orlistat, RHC 80267, and Xen 445.

In some embodiments, the composition comprises at least one milk-stabilizer. Non-limiting examples include, but are not limited to, polysaccharides including gums, fibers, and starches, or proteins including whey and gelatin. In some embodiments, the milk-stabilizers can have thickening or gelling properties. In general, milk-stabilizers prevent the appearance and mouthfeel of becoming undesirable and keep the milk product and composition of milk in solution through the binding of water and by reducing the interfacial tension between the oil (fat droplets) and water phases. In some embodiments, the milk-stabilizers may be antimicrobial agents. In some embodiments, the composition comprises a milk-stabilizing protein. In some embodiments, the milk-stabilizing protein is lactoperoxidase.

In some embodiments, the composition comprises at least one glycosaminoglycan (GAGs). In general, GAGs play roles in cell signaling processes and are used in human supplements. Non-limiting examples include regulation of cell growth, proliferation, promotion of cell adhesion, anticoagulation, and wound repair. In some embodiments, the at least one glycosaminoglycan is selected from glucosamine sulfate, chondroitin sulfate, hyaluronic acid, heparan sulfate, or fucoidan. In some embodiments, the glycosaminoglycan is chondroitin sulfate. In some embodiments, the glycosaminoglycan is fucoidan.

In some embodiments, the composition comprises at least one flavonoid. In general, flavonoids (also referred to as vitamin P) are derived from plants with variable phenolic structures. In some embodiments, the at least one flavonoid is selected from ginkgetin, iso-ginkgetin, myricetin, luteolin, or epigallocatechin gallate.

In some embodiments, the composition comprises one or more active ingredients that are not naturally occurring in mammalian milk. In some embodiments, the composition comprises one or more active ingredients that are not naturally occurring in human milk. In some embodiments, one active ingredient does not naturally occur in human milk.

In some embodiments, the composition as disclosed herein, comprises one or more of a disintegrant, an absorbent, a colorant, a flavorant, a sweetener, or a dispersing agent. Non-limiting examples of disintegrants include starches, agar, methyl cellulose, bentonite, xanthan gum, algic acid or its sodium salt, or effervescent mixtures. Non-limiting examples of dispersing agents include Labrasol, HPMC, DOSS, caproyl 909, labrafac, labrafil, peceol, transcutol, capmul MCM, capmul PG-12, captex 355 or gelucire.

In some embodiments, the composition as disclosed herein, comprises a binder. Non-limiting examples include magnesium aluminum silicate, starch paste, gelatin, tragacanth, methylcellulose, sodium carboxymethylcellulose, magnesium carbonate, natural sugars such as glucose or beta-lactose, corn sweeteners, natural and synthetic gums such as acacia, tragacanth or sodium alginate, waxes, and polyvinylpyrrolidone.

In some embodiments, the composition as disclosed herein comprises an agent that enhances absorption of the one or more active ingredients. Non-limiting examples include cyclodextrin, hydroxypropyl-cyclodextrin, PEG400, and PEG200.

In some embodiments, the composition as disclosed herein is formulated as one of a concentrated liquid, a tablet, a powder, or a single use sachet. In some embodiments, the composition is formulated as a tablet. In some embodiments, the tablet disintegrates in solution. In some embodiments, the formulated powered is encased in a capsule.

Tablets are generally molded, for example, in a suitable tableting machine by mixing powdered compounds with or without moistening with an inert liquid element. The tablets may optionally be coated or scored, and may be formulated so as to provide slow or controlled release. Tablets may optionally be provided with a coating, such as a thin film or sugar coating. Processes, equipment, and toll manufacturers for tablet and capsule making are known in the art.

In some embodiments, the composition comprises a pharmaceutically acceptable carrier, excipient, and/or diluent. Examples of suitable carriers, excipients, and diluents include lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, minerals, and the like. In some embodiments, the composition or the active ingredients are in water or another pharmaceutically acceptable aqueous carrier in which the conjugate exhibits good solubility, optionally with or without other pharmaceutical acceptable excipients, or preservatives.

In some embodiments, the composition as disclosed herein, decreases lipase activity and maintains antioxidation capacity of human milk. In some embodiments, the composition prevents rancidity of human milk. In some embodiments, the composition extends the shelf life of human milk. In some embodiments, the composition maintains the nutritional properties of human milk. In some embodiments, the composition maintains the nutritional properties of human milk upon storage. In some embodiments, the composition prevents rancidity of human milk, extends the shelf life of human milk, maintains the nutritional properties of human milk, and/or maintains the nutritional properties of human milk upon storage. In some embodiments, the composition as disclosed herein is provided for use in preventing rancidity of human milk, extending shelf life of human milk, and/or maintaining the nutritional properties of human milk upon storage.

The composition as disclosed herein can be used for preserving mammalian milk. In some embodiments, the mammal is human.

Methods for Preserving Human Milk

This present disclosure provides for methods for preserving human milk comprising contacting the composition as disclosed herein with the human milk.

The present disclosure provides for methods for preserving human milk comprising, contacting the human milk with the composition as disclosed herein and storing the human milk. Additionally, the present disclosure provides for methods for preventing rancidity of human milk, extending shelf life of human milk, and/or maintaining the nutritional properties of human milk upon storage. In some embodiments, the method comprises contacting the human milk with the composition as disclosed herein. In some embodiments, the method is for preventing rancidity of human milk. In some embodiments, the method is for extending shelf life of human milk. In some embodiments, the method is for maintaining the nutritional properties of human milk. In some embodiments, the method is for maintaining the nutritional properties of human milk upon storage. In some embodiments, the composition comprises at least one active ingredient selected from at least one emulsifying agent, at least one antioxidant, at least one ice-structuring protein, at least one lipoprotein lipase (LPL) inhibitory protein, at least one small molecule lipase inhibitor, at least one milk-stabilizing protein, at least one glycosaminoglycan, at least one flavonoid, or a combination thereof. In some embodiments, the composition comprises pectin, vitamin C, and vitamin E, as disclosed herein. In some embodiments, the composition is formulated as a tablet. In some embodiments, the composition comprises a binder.

In some embodiments, the methods as disclosed herein preserve human milk comprising, (a) contacting human milk with a composition comprising: (i) between about 0.034 mg/mL to about 9 mg/mL of pectin; (ii) between about 0.676 µg/mL to about 101 µg/mL of vitamin C; and (iii) between about 0.0182 µg/mL to about 2.68 µg/mL of natural vitamin E or between about 0.0122 µg/mL to about 1.8 µg/mL of synthetic vitamin E; and (b) and storing the human milk.

In some embodiments, the method as disclosed herein decreases lipase activity and maintains antioxidation capacity in human milk.

In some embodiments, the storing comprises freezing the human milk at about −20° C. In some embodiments, the storing is at about −20° C. In some embodiments, the storing comprises freezing the human milk at a temperature of about 0° C., about −2° C. about −4° C. about −8° C., about −10° C., about −12° C., about −14° C., about −16° C., about −18° C., or about −20° C. or less. In some embodiments, the storing comprises freezing the human milk at a temperature of at least about 0° C., at least about −2° C., at least about −4° C., at least about −8° C., at least about −10° C., at least about −12° C., at least about −14° C., at least about −16° C., at least about −18° C., or at least about −20° C. or less. In some embodiments, the storing comprising freezing the human milk at a temperature of greater than about −20° C. In some embodiments, the storing comprising freezing the human milk at a temperature of at least about −30° C., at least about −40° C., at least about −50° C., at least about −60° C., at least about −70° C., or at least about −80° C. In some embodiments, the storing comprises freezing the human milk at a temperature of greater than about −80° C. In some embodiments, the freezing comprises snap freezing. In some embodiments, the storing comprising freezing in liquid nitrogen.

In some embodiments, the storing is at about 4° C. In some embodiments, the storing is at about 2° C., about 4° C., about 6° C., about 8° C., about 10° C., about 12° C., about 14° C., or about 16° C. or more. In some embodiments, the storing is at a temperature of at least about 2° C., at least about 4° C., at least about 6° C., at least about 8° C., at least about 10° C., at least about 12° C., at least about 14° C., or at least about 16° C. or more.

In some embodiments, the storing is at room temperature.

In some embodiments, the storing is for between about 1 day to about 5 years. In some embodiments, the storing is for between about 1 day to about 2 days, between about 1 day to about 3 days, between about 1 day to about 4 days, between about 2 days to about 3 days, between about 2 days to about 4 days, between about 2 days to about 5 days, between about 3 days to about 4 days, between about 3 days to about 5 days, between about 3 days to about 6 days, between about 4 days to about 5 days, between about 4 days to about 6 days, between about 4 days to about 7 days, between about 5 days to about 6 days, between about 5 days to about 7 days, between about 6 days to about 7 days, between about 1 week to about 2 weeks, between about 1 week to about 2 weeks, between about 1 week to about 3 weeks, between about 2 weeks to about 3 weeks, between about 2 weeks to about 4 weeks, between about 3 weeks to about 4 weeks, between about 1 month to about 1.5 months, between about 1 month to about 2 months, between about 1.5 months to about 2 months, 2 months to about 4 months, between about 2 months to about 6 months, between about 2 months to about 8 months, between about 4 month to about 6 months, between about 4 months to about 8 months, 4 months to about 10 months, between about 6 months to about 8 months, between about 6 months to about 10 months, between about 6 months to about 12 months, between about 8 months to about 10 months, between about 8 months to about 12 months, between about 8 months to about 14 months, between about 10 months to about 12 months, between about 10 months to about 14 months, between about 10 months to about 16 months, between about 12 months to about 14 months, between about 12 months to about 16 months, between about 12 months to about 18 months, between about 14 months to about 16 months, between about 14 months to about 18 months, between about 14 months to about 20 months, between about 16 months to about 18 months, between about 16 months to about 20 months, between about 16 months to about 22 months, between about 18 months to about 20 months, between about 18 months to about 22 months, between about 18 months to about 24 months, between about 20 months to about 22 months, between about 20 months to about 24 months, between about 22 months to about 24 months, between about 2 years and about 2.5 years, between about 2 year and 3 years, between about 2 years and 3.5 years, between about 2.5 years and about 3 years, between about 2.5 years and 3.5 years, between about 2.5 years and 4 years, between about 3 years and about 3.5 years, between about 3 years to about 4 years, between about 3 years and about 4.5 years, between about 3.5 years to about 4 years, between about 3.5 years to about 4.5 years, between 3.5 years to about 5 years, between about 4 years to about 4.5 years, between about 4 years to about 5 years, or between about 4.5 years to about 5 or more years.

In some embodiments, as disclosed herein, the amount of human milk is between about 1 mL and about 150 mL. In some embodiments, the amount of human milk is between about 1 mL to 10 mL, between about 1 mL to about 20 mL, between about 1 mL to about 30 mL, between about 10 mL to about 20 mL, between about 10 mL to about 30 mL, between about 10 mL to about 40 mL, between about 20 mL to about 30 mL, between about 20 mL to about 40 mL, between about 20 mL to about 50 mL, between about 30 mL to about 40 mL, between about 30 mL to about 50 mL, between about 30 mL to about 60 mL, between about 40 mL to about 50 mL, between about 40 mL to about 60 mL, between about 40 mL to about 70 mL, between about 50 mL to about 60 mL, between about 50 mL to about 70 mL, between about 50 mL to about 80 mL, between about 60 mL to about 70 mL, between about 60 mL to about 80 mL, between about 60 mL to about 90 mL, between about 70 mL to about 80 mL, between about 70 mL to about 90 mL, between about 80 mL to about 90 mL, between about 80 mL to about 100 mL, between about 80 mL to about 110 mL, between about 90 mL to about 100 mL, between about 90 mL to about 110 mL, between about 90 mL to about 120 mL, between about 100 mL to about 110 mL, between about 100 mL to about 120 mL, between about 100 mL to about 130 mL, between about 110 mL to about 120 mL, between about 110 mL to about 130 mL, between about 110 mL to about 140 mL, between about 120 mL to about 130 mL, between about 120 mL to about 140 mL, between about 120 mL to about 150 mL, between about 130 mL to about 140 mL, between about 130 mL to about 150 mL, or between about 140 mL to about 150 mL.

In some embodiments, as disclosed herein, the amount of human milk is between about 1 mL and about 1000 mL. In some embodiments, the amount of human milk is between about 1 mL to 100 mL, between about 1 mL to about 200 mL, between about 1 mL to about 300 mL, between about 100 mL to about 200 mL, between about 100 mL to about 300 mL, between about 100 mL to about 400 mL, between about 200 mL to about 30 0 mL, between about 200 mL to about 400 mL, between about 2000 mL to about 50 mL, between about 300 mL to about 400 mL, between about 300 mL to about 500 mL, between about 300 mL to about 600 mL, between about 400 mL to about 500 mL, between about 400 mL to about 600 mL, between about 400 mL to about 700 mL, between about 500 mL to about 600 mL, between about 500 mL to about 700 mL, between about 500 mL to about 80 mL, between about 600 mL to about 700 mL, between about 600 mL to about 800 mL, between about 600 mL to about 900 mL, between about 700 mL to about 800 mL, between about 700 mL to about 900 mL, between about 800 mL to about 900 mL, between about 800 mL to about 1000 mL, or between about 900 mL to about 1000 mL.

In some embodiments, the amount of human milk is about 1 mL. In some embodiments, the amount of human milk is about 147.93 mL. In some embodiments, the amount of milk is about 5 ounces.

In some embodiments, the composition is contacted with the human milk before storage. In some embodiments, the composition is contacted with the human milk during storage. In some embodiments, the composition is contacted with the human milk and the milk is immediately stored. In some embodiments, the human milk is stored at least 1 day, at least 2 days, at least 3 days, at least 4 days, at least 5 days, at least 6 days, or at least 7 days after being contacted with the composition as disclosed herein. In some embodiments, the human milk is stored about 1 day, about 2 days, about 3 days, about 4 days, about 5 days, about 6 days, or about 7 days or more after being contacted with the composition as disclosed herein.

In some embodiments, the human milk is contacted with the composition as disclosed herein immediately after being expressed. In some embodiments, the human milk is contacted with the composition as disclosed herein at least 1 day, at least 2 days, at least 3 days, at least 4 days, at least 5 days, at least 6 days, or at least 7 days after being expressed. In some embodiments, the human milk is contacted with the composition as disclosed herein about 1 day, about 2 days, about 3 days, about 4 days, about 5 days, about 6 days, or about 7 days or more after being expressed.

In some embodiments, the human milk is contacted with the composition as disclosed herein once. In some embodiments, the human milk is contacted with the composition about once daily during storage. In some embodiments, the human milk is contacted with the composition about once a week during storage. In some embodiments, the human milk is contacted with the composition about once a month during storage. In some embodiments, the human milk is contacted with the composition about once every two months during storage. In some embodiments, the human milk is contacted with the composition about once every six months during storage. In some embodiments, the human milk is contacted with the composition about once every year during storage.

In some embodiments, the human milk as disclosed herein is expressed human milk or synthetic human milk. In some embodiments, the human milk is synthetic and provided as formula.

In some embodiments, the human milk is colostrum, transitional milk, mature milk or a combination thereof. In some embodiments, the human milk is colostrum. In some embodiments, the human milk is transitional milk. In some embodiments, the human milk is mature milk. In some embodiments, the milk is expressed between about at birth to about 5 years. In some embodiments, the human milk is expressed about 1 day to about 2 days, between about 1 day to about 3 days, between about 1 day to about 4 days, between about 2 days to about 3 days, between about 2 days to about 4 days, between about 2 days to about 5 days, between about 3 days to about 4 days, between about 3 days to about 5 days, between about 3 days to about 6 days, between about 4 days to about 5 days, between about 4 days to about 6 days, between about 4 days to about 7 days, between about 5 days to about 6 days, between about 5 days to about 7 days, between about 6 days to about 7 days, between about 1 week to about 2 weeks, between about 1 week to about 2 weeks, between about 1 week to about 3 weeks, between about 2 weeks to about 3 weeks, between about 2 weeks to about 4 weeks, between about 3 weeks to about 4 weeks, between about 1 month to about 1.5 months, between about 1 month to about 2 months, between about 1.5 months to about 2 months, 2 months to about 4 months, between about 2 months to about 6 months, between about 2 months to about 8 months, between about 4 month to about 6 months, between about 4 months to about 8 months, 4 months to about 10 months, between about 6 months to about 8 months, between about 6 months to about 10 months, between about 6 months to about 12 months, between about 8 months to about 10 months, between about 8 months to about 12 months, between about 8 months to about 14 months, between about 10 months to about 12 months, between about 10 months to about 14 months, between about 10 months to about 16 months, between about 12 months to about 14 months, between about 12 months to about 16 months, between about 12 months to about 18 months, between about 14 months to about 16 months, between about 14 months to about 18 months, between about 14 months to about 20 months, between about 16 months to about 18 months, between about 16 months to about 20 months, between about 16 months to about 22 months, between about 18 months to about 20 months, between about 18 months to about 22 months, between about 18 months to about 24 months, between about 20 months to about 22 months, between about 20 months to about 24 months, between about 22 months to about 24 months, between about 2 years and about 2.5 years, between about 2 year and 3 years, between about 2 years and 3.5 years, between about 2.5 years and about 3 years, between about 2.5 years and 3.5 years, between about 2.5 years and 4 years, between about 3 years and about 3.5 years, between about 3 years to about 4 years, between about 3 years and about 4.5 years, between about 3.5 years to about 4 years, between about 3.5 years to about 4.5 years, between 3.5 years to about 5 years, between about 4 years to about 4.5 years, between about 4 years to about 5 years, or between about 4.5 years to about 5 or more years post birth.

Device and Milk Storage Container for Storing or Preserving the Human Milk

Another embodiment comprises a coating in which one or more of the above-mentioned formulations is embedded in a milk storage vessel via immobilization chemistry prior to the milk being added, before being stored.

Yet another embodiment comprises a non-dissolving vented device, such as a filter or a capsule, that contains inside of it, one or more of the above-mentioned formulations. In this instance, the vented device is added to the milk vessel before it is stored, and the device traps/siphons off lipolytic enzymes, oxidizing agents and other factors that promote rancidity. The unwanted enzymes, oxidizing agents, and rancidity promoting factors can be removed from the vessel after thawing the milk. Optionally, the vented device can be re-used (FIG. 12A).

Still another embodiment comprises a filter cartridge situated between the breast pump and the milk storage vessel that filters out, binds, or detoxifies lipolytic enzymes, oxidizing agents, and rancidity promoting factors from the milk while the milk is being collected (FIG. 12B).

This present disclosure provides for a device for preserving human milk comprising a housing defining an internal volume of space, the housing having at least one opening configured to allow a material within the internal volume of space to exit the housing and contact human milk, or to come into contact with human milk within the internal volume of space, the material within the internal volume of space comprising the composition as disclosed herein. In some embodiments, the material is a non-dissolving filter or mesh. In some embodiments, the composition as disclosed herein coats the material.

In some embodiments, the device is configured to be placed in a milk collection or storage container.

In some embodiments, the device is configured to have an inlet and an outlet, and the device is configured to be disposed between a breast pump and a milk storage vessel, such that all the human milk must pass through the inlet and outlet before entering the milk storage vessel.

The present disclosure provides for a milk storage container comprising the composition as disclosed herein. In some embodiments, the composition is immobilized to an inner surface of the container. In some embodiments, the composition can be added to the milk storage container prior to the human milk being added to the storage container. In some embodiments, the composition can be added to the storage container in a formulation as one of a concentrated liquid, a tablet, or a powder.

In some embodiments, the milk storage container comprises plastic. In some embodiments, the milk storage container is a plastic bag. In some embodiments, the milk storage container is a human milk storage bag. In some embodiments, the human milk storage bag is configured to be stored between about −80° C. to about 4° C. for at least 5 years.

In some embodiments, the milk storage bag is configured to be stored for between about 1 day to about 5 years. In some embodiments, the milk storage bag is configured to be stored for between about 1 day to about 2 days, between about 1 day to about 3 days, between about 1 day to about 4 days, between about 2 days to about 3 days, between about 2 days to about 4 days, between about 2 days to about 5 days, between about 3 days to about 4 days, between about 3 days to about 5 days, between about 3 days to about 6 days, between about 4 days to about 5 days, between about 4 days to about 6 days, between about 4 days to about 7 days, between about 5 days to about 6 days, between about 5 days to about 7 days, between about 6 days to about 7 days, between about 1 week to about 2 weeks, between about 1 week to about 2 weeks, between about 1 week to about 3 weeks, between about 2 weeks to about 3 weeks, between about 2 weeks to about 4 weeks, between about 3 weeks to about 4 weeks, between about 1 month to about 1.5 months, between about 1 month to about 2 months, between about 1.5 months to about 2 months, 2 months to about 4 months, between about 2 months to about 6 months, between about 2 months to about 8 months, between about 4 month to about 6 months, between about 4 months to about 8 months, 4 months to about 10 months, between about 6 months to about 8 months, between about 6 months to about 10 months, between about 6 months to about 12 months, between about 8 months to about 10 months, between about 8 months to about 12 months, between about 8 months to about 14 months, between about 10 months to about 12 months, between about 10 months to about 14 months, between about 10 months to about 16 months, between about 12 months to about 14 months, between about 12 months to about 16 months, between about 12 months to about 18 months, between about 14 months to about 16 months, between about 14 months to about 18 months, between about 14 months to about 20 months, between about 16 months to about 18 months, between about 16 months to about 20 months, between about 16 months to about 22 months, between about 18 months to about 20 months, between about 18 months to about 22 months, between about 18 months to about 24 months, between about 20 months to about 22 months, between about 20 months to about 24 months, between about 22 months to about 24 months, between about 2 years and about 2.5 years, between about 2 year and 3 years, between about 2 years and 3.5 years, between about 2.5 years and about 3 years, between about 2.5 years and 3.5 years, between about 2.5 years and 4 years, between about 3 years and about 3.5 years, between about 3 years to about 4 years, between about 3 years and about 4.5 years, between about 3.5 years to about 4 years, between about 3.5 years to about 4.5 years, between 3.5 years to about 5 years, between about 4 years to about 4.5 years, between about 4 years to about 5 years, or between about 4.5 years to about 5 or more years.

In some embodiments, the milk storage bag is configured to be stored at a temperature of about 0° C., about −2° C. about −4° C. about −8° C., about −10° C., about −12° C., about −14° C., about −16° C., about −18° C., or about −20° C. or less. In some embodiments, milk storage bag is configured to be stored at a temperature of at least 0° C., at least −2° C. at least −4° C. at least −8° C., at least −10° C., at least −12° C., at least −14° C., at least −16° C., at least −18° C., or at least-20° C. or less. In some embodiments, the milk storage bag is configured to be stored at a temperature of greater than −20° C. In some embodiments, the milk storage bag is configured to be stored at a temperature of at least −30° C., at least −40° C., at least −50° C., at least −60° C., at least −70° C., at least −80° C. In some embodiments, the milk storage bag is configured to be stored at a temperature of greater than −80° C. In some embodiments, the milk storage bag is configured to be snap frozen. In some embodiments, the milk storage bag is configured to be stored in liquid nitrogen.

In some embodiments, the milk storage bag is configured to be stored at a temperature of 4° C. In some embodiments, the milk storage bag is configured to be stored at a temperature at about 2° C., about 4° C., about 6° C., about 8° C., about 10° C., about 12° C., about 14° C., about 16° C. or more. In some embodiments, the milk storage bag is configured to be stored at a temperature of at least 2° C., at least 4° C., at least 6° C., at least 8° C., at least 10° C., at least 12° C., at least 14° C., at least 16° C. or more.

In some embodiments, the milk storage bag is configured to be stored at room temperature.

Kits

Also provided herein are kits. In some embodiments, the kit comprises the composition as disclosed herein, contained in a suitable container, optional together with instructions for use in a method as disclosed herein. In some embodiments, the composition is formulated as one of a concentrated liquid, a tablet, a powder, or a single use sachet. In some embodiments, the kit comprises a measurable scoop.

In some embodiments, the kit comprises a sterile device capable of delivering the composition as disclosed herein prefilled with predetermined amounts. Non-limiting examples include vials and syringes.

In some embodiments, the kit further comprises at least one device as disclosed herein. In some embodiments, the kit further comprises at least one milk storage container as disclosed herein. In some embodiments, the kit comprises at least one device and at least one milk storage container as disclosed herein.

EXAMPLES

These examples are provided for illustrative purposes only and not to limit the scope of the claims provided herein.

Example 1. Accumulation of Glycerol in Human Milk

Eight human milk samples were tested to determine if glycerol, a byproduct of fat breakdown, accumulated after storage. Human milk samples were collected from the same donor anywhere between 1 month and 7 months after birth, frozen, and then thawed for testing. The samples were frozen on the same day as collection. Samples were tested for glycerol at day one (fresh), 33 days, 107 days, 122 days, 148 days, 157 days, 177 days, or 196 days storage at −20° C. The samples were thawed, and the presence of glycerol was detected by a glycerol-dependent, light-producing reaction presented as a measure of bioluminescence using the Glycerol-Glo™ Assay (Promega; catalog #: J3150) according to the manufacturer's instructions. A buffer with either 0 μM glycerol or 100 μM glycerol, alongside organic whole milk (cow) was used as a control. Glycerol content (bioluminescence) was measured using a BioTek Synergy Neo2 Hybrid Multimode Reader (Agilent; catalog #: BTNE02).

Results: Glycerol content was slightly higher in fresh human milk than in organic whole milk (cow) and the amount of glycerol in human milk began to significantly increase at 33 days storage with maximum accumulation starting at 107 days storage, comparable to the control containing 100 μM glycerol. Thus, human milk accumulates significant amounts of glycerol, a byproduct of fat breakdown, during storage under freezing conditions as compared to pasteurized cow's milk which does not accumulate significant glycerol under the same conditions/under all conditions tested. Glycerol and, concomitantly, free fatty acids are byproducts of fat breakdown, which remain in the human milk post thawing (FIG. 1) affecting the freshness and nutritional value of the milk leading to rancidity.

Example 2. Compound Screen for Inhibitors of Fat Breakdown in Stored Human Milk Approximately 2700 compounds from three different compound libraries (Biolog Phenotype Microarrays, Food Additive Library, and Food-Source Compound Library) were added to fresh human milk and each individual sample was stored for 1 week at −20° C. The samples were thawed at room temperate and measured for lipolysis using the Lipase: EnzChek™ Lipase Substrate, green fluorescent, 505/515 (Thermo Fisher; catalog #: E33955) kit and quenched BODIPY-fatty acid conjugate in a plate reader according to the manufacturer's instructions. Compounds with a RFU of <400 was considered as a hit. Surprisingly, out of the approximately 2700 compounds tested, only 24 compounds significantly inhibited lipase activity and thus inhibited lipolysis (FIG. 2). These compounds included Tween 80, Isoginkgetin, Itaconic Acid, Methyl Pyruvate, Butyric Acid, Myricetin, Ginkgetin, 2'-Deoxy Inosine, N-Acetyl-Neuraminic Acid, Tween 20, Tween 40, Chondroitin Sulfate C, L-Djenkolic Acid, Glycyl-L-Proline, Laminarin, Tween 40, Pectin, Tetramethylene Sulfone, 2'-Deoxy Adenosine, Sorbic Acid, and d-Amino Valeric Acid. These compounds are related to pectins, surfactants, glycosaminoglycans, and flavonoids. All compounds tested are show in Tables 1 to 6.

TABLE 1

Screened Compounds from Biolog Phenotype Microarrays (PM1) for lipase nhibition activity on stored human milk samples.
Biolog Phenotype Microarrays (PM1)

| Library Code | Compound | Lipase (RFU) | Compound | Lipase (RFU) |
|---|---|---|---|---|
| Biolog: PM1 | L-Arabinose | 1095.287 | m-Tartaric Acid | 1006.925 |
| Biolog: PM1 | N-Acetyl-D-Glucosamine | 1097.413 | D-Glucose-1-Phosphate | 853.7765 |
| Biolog: PM1 | D-Saccharic Acid | 1181.227 | D-Fructose-6-Phosphate | 1197.545 |
| Biolog: PM1 | Succinic Acid | 1079.729 | Tween 80 | 544.5555 |
| Biolog: PM1 | D-Galactose | 1015.644 | a-Hydroxy Glutaric Acid-g-Lactone | 873.2016 |
| Biolog: PM1 | L-Aspartic Acid | 875.054 | a-Hydroxy Butyric Acid | 961.5059 |
| Biolog: PM1 | L-Proline | 933.1142 | b-Methyl-D-Glucoside | 706.0716 |
| Biolog: PM1 | D-Alanine | 667.2873 | Adonitol | 916.8639 |
| Biolog: PM1 | D-Trehalose | 817.3943 | Maltotriose | 917.8057 |
| Biolog: PM1 | D-Mannose | 984.0635 | 2-Deoxy Adenosine | 947.0571 |
| Biolog: PM1 | Dulcitol | 642.9411 | AdenosineAcid | 1022.153 |
| Biolog: PM1 | D-Serine | 1090.454 | Glycyl-L-Aspartic | 903.5873 |
| Biolog: PM1 | D-Sorbitol | 892.2918 | Citric Acid | 603.536 |
| Biolog: PM1 | Glycerol | 1079.2 | m-Inositol | 958.1532 |
| Biolog: PM1 | L-Fucose | 882.8257 | D-Threonine | 1111.617 |
| Biolog: PM1 | D-Glucuronic Acid | 809.7621 | Fumaric Acid | 1056.645 |
| Biolog: PM1 | D-Gluconic Acid | 876.4287 | Bromo Succinic Acid | 1206.804 |
| Biolog: PM1 | D,L-a-Glycerol-Phosphate | 967.7044 | Propionic Acid | 949.5989 |
| Biolog: PM1 | D-Xylose | 879.2747 | Mucic Acid | 636.2061 |
| Biolog: PM1 | L-Lactic Acid | 991.1422 | Glycolic Acid | 806.0101 |
| Biolog: PM1 | Formic Acid | 1027.958 | Glyoxylic Acid | 994.5383 |
| Biolog: PM1 | D-Mannitol | 1077.776 | D-Cellobiose | 785.8282 |
| Biolog: PM1 | L-Glutamic Acid | 1101.527 | Inosine | 739.9959 |
| Biolog: PM1 | D-Glucose-6-Phosphate | 1034.77 | Glycyl-L-Glutamic Acid | 846.2286 |
| Biolog: PM1 | D-Galactonic Acid-g-Lactone | 711.3595 | Tricaballylic Acid | 749.9547 |
| Biolog: PM1 | D,L-Malic Acid | 781.9881 | L-Serine | 1052.209 |
| Biolog: PM1 | D-Ribose | 724.4983 | L-Threonine | 828.6034 |
| Biolog: PM1 | Tween 20 | 1219.614 | L-Alanine | 991.9007 |

TABLE 1-continued

Screened Compounds from Biolog Phenotype Microarrays (PM1) for lipase nhibition activity on stored human milk samples.
Biolog Phenotype Microarrays (PM1)

| Library Code | Compound | Lipase (RFU) | Compound | Lipase (RFU) |
|---|---|---|---|---|
| Biolog: PM1 | L-Rhamnose | 856.5977 | L-Alanyl-Glycine | 816.3246 |
| Biolog: PM1 | D-Fructose | 604.1611 | Acetoacetic Acid | 1111.177 |
| Biolog: PM1 | Acetic Acid | 1200.605 | N-Acetyl-b-D-Mannosamine | 1197.275 |
| Biolog: PM1 | a-D-Glucose | 1053.033 | Mono Methyl Succinate | 1078.048 |
| Biolog: PM1 | Maltose | 952.8215 | Methyl Pyruvate | 205.0162 |
| Biolog: PM1 | D-Melibiose | 850.0787 | D-Malic Acid | 752.7528 |
| Biolog: PM1 | Thymidine | 823.4011 | L-Malic Acid | 1144.049 |
| Biolog: PM1 | L-Asparagine | 940.1972 | Glycyl-L-Proline | 318.8964 |
| Biolog: PM1 | D-Aspartic Acid | 878.5051 | p-Hydroxy Phenyl Acetic Acid | 1082.882 |
| Biolog: PM1 | D-Glucosaminic Acid | 794.5821 | m-Hydroxy Phenyl Acetic Acid | 1038.295 |
| Biolog: PM1 | 1,2-Propanediol | 1150.168 | Tyramine | 517.4752 |
| Biolog: PM1 | Tween 40 | 339.7489 | D-Psicose | 990.8733 |
| Biolog: PM1 | a-Keto-Glutaric Acid | 1066.701 | L-Lyxose | 984.5688 |
| Biolog: PM1 | a-Keto-Butyric Acid | 1049.856 | Glucuronamide | 916.3562 |
| Biolog: PM1 | a-Methyl-D-Galactoside | 1112.186 | Pyruvic Acid | 757.2242 |
| Biolog: PM1 | a-D-Lactose | 948.2401 | L-Galactonic Acid-g-Lactone | 1223.337 |
| Biolog: PM1 | Lactulose | 721.9139 | D-Galacturonic Acid | 857.8647 |
| Biolog: PM1 | Sucrose | 979.1753 | Phenylethyl-amine | 904.3943 |
| Biolog: PM1 | Uridine | 818.9178 | 2-Aminoethanol | 533.78099 |
| Biolog: PM1 | L-Glutamine | 935.2971 | | |

TABLE 2

Screened Compounds from Biolog Phenotype Microarrays (PM2a) for lipase inhibition activity on stored human milk samples.
Biolog Phenotype Microarray (PM2a)

| Library Code | Compound | Lipase (RFU) | Compound | Lipase (RFU) |
|---|---|---|---|---|
| Biolog: PM2a | Chondroitin Sulfate C | 308.9045 | Caproic Acid | 905.3416 |
| Biolog: PM2a | a-Cyclodextrin | 1052.874 | Citraconic Acid | 837.0688 |
| Biolog: PM2a | b-Cyclodextrin | 873.5385 | Citramalic Acid | 1053.518 |
| Biolog: PM2a | g-Cyclodextrin | 864.9176 | D-Glucosamine | 688.2356 |
| Biolog: PM2a | Dextrin | 915.3079 | 2-Hydroxy Benzoic Acid | 894.0225 |
| Biolog: PM2a | Gelatin | 658.8161 | 4-Hydroxy Benzoic Acid | 1161.243 |
| Biolog: PM2a | Glycogen | 745.3227 | b-Hydroxy Butyric Acid | 986.2848 |
| Biolog: PM2a | Inulin | 793.2721 | g-Hydroxy Butyric Acid | 966.3647 |
| Biolog: PM2a | Laminarin | 336.7375 | a-Keto-Valeric Acid | 996.3471 |
| Biolog: PM2a | Mannan | 1091.353 | Itaconic Acid | 177.3666 |
| Biolog: PM2a | Pectin | 344.0037 | 5-Keto-D-Gluconic Acid | 922.1469 |
| Biolog: PM2a | N-Acetyl-D-Galactosamine | 615.1658 | D-Lactic Acid Methyl Ester | 813.9106 |
| Biolog: PM2a | N-Acetyl-Neuraminic Acid | 264.6242 | Malonic Acid | 792.7976 |
| Biolog: PM2a | b-D-Allose | 911.8228 | Melibionic Acid | 917.5297 |
| Biolog: PM2a | Amygdalin | 1036.373 | Oxalic Acid | 973.8306 |
| Biolog: PM2a | D-Arabinose | 843.3445 | Oxalomalic Acid | 974.3885 |
| Biolog: PM2a | D-Arabitol | 977.3738 | Quinic Acid | 1030.135 |
| Biolog: PM2a | L-Arabitol | 912.8862 | D-Ribono-1,4-Lactone | 447.2339 |
| Biolog: PM2a | Arbutin | 1141.749 | Sebacic Acid | 998.9916 |
| Biolog: PM2a | 2-Deoxy-D-Ribose | 844.3126 | Sorbic Acid | 390.5742 |
| Biolog: PM2a | i-Erythritol | 1017.682 | Succinamic Acid | 722.1343 |
| Biolog: PM2a | D-Fucose | 779.358 | D-Tartaric Acid | 685.8128 |
| Biolog: PM2a | 3-0-b-D-Galacto-pyranosyl-D-Arabinose | 1010.794 | L-Tartaric Acid | 877.178 |
| Biolog: PM2a | Gentiobiose | 1106.66 | Acetamide | 1098.671 |
| Biolog: PM2a | L-Glucose | 694.8503 | L-Alaninamide | 1023.189 |
| Biolog: PM2a | Lactitol | 720.8594 | N-Acetyl-L-Glutamic Acid | 1040.727 |
| Biolog: PM2a | D-Melezitose | 1021.506 | L-Arginine | 753.4686 |
| Biolog: PM2a | Maltitol | 943.5543 | Glycine | 1055.523 |
| Biolog: PM2a | a-Methyl-D-Glucoside | 996.7815 | L-Histidine | 781.9838 |
| Biolog: PM2a | b-Methyl-D-Galactoside | 993.3397 | L-Homoserine | 860.3561 |
| Biolog: PM2a | 3-Methyl Glucose | 724.4134 | Hydroxy-L-Proline | 1019.101 |
| Biolog: PM2a | b-Methyl-D-Glucuronic Acid | 949.5212 | L-Isoleucine | 1080.411 |
| Biolog: PM2a | a-Methyl-D-Mannoside | 1021.424 | L-Leucine | 1008.279 |
| Biolog: PM2a | b-Methyl-D-Xyloside | 1480.923 | L-Lysine | 909.5913 |
| Biolog: PM2a | Palatinose | 803.211 | L-Methionine | 910.747 |
| Biolog: PM2a | D-Raffinose | 981.0683 | L-Ornithine | 908.7319 |
| Biolog: PM2a | Salicin | 1164.126 | L-Phenylalanine | 853.3612 |
| Biolog: PM2a | Sedoheptulosan | 1068.783 | L-Pyroglutamic Acid | 891.6509 |
| Biolog: PM2a | L-Sorbose | 1197.031 | L-Valine | 825.5247 |
| Biolog: PM2a | Stachyose | 882.4617 | D,L-Carnitine | 1067.602 |
| Biolog: PM2a | D-Tagatose | 939.2844 | Sec-Butylamine | 784.9928 |
| Biolog: PM2a | Turanose | 1221.239 | D,L-Octopamine | 1138.925 |

TABLE 2-continued

Screened Compounds from Biolog Phenotype Microarrays (PM2a) for lipase inhibition activity on stored human milk samples.
Biolog Phenotype Microarray (PM2a)

| Library Code | Compound | Lipase (RFU) | Compound | Lipase (RFU) |
| --- | --- | --- | --- | --- |
| Biolog: PM2a | Xylitol | 928.7995 | Putrescine | 985.579 |
| Biolog: PM2a | N-Acetyl-D-Glucosaminitol | 1055.486 | Dihydroxy Acetone | 873.0524 |
| Biolog: PM2a | g-Amino Butyric Acid | 1141.54 | 2,3-Butanediol | 960.3042 |
| Biolog: PM2a | d-Amino Valeric Acid | 398.69 | 2,3-Butanone | 1021.976 |
| Biolog: PM2a | Butyric Acid | 1003.292 | 3-Hydroxy 2-Butanone | 1237.018 |
| Biolog: PM2a | Capric Acid | 943.0875 | | |

TABLE 3

Screened Compounds from Biolog Phenotype Microarrays (PM4) for lipase inhibition activity on stored human milk samples.
Biolog Phenotype Microarray (PM4)

| Library Code | Compound | Lipase (RFU) | Compound | Lipase (RFU) |
| --- | --- | --- | --- | --- |
| Biolog: PM4 | Phosphate | 1007.654 | O-Phospho-D-Tyrosine | 980.7186 |
| Biolog: PM4 | Pyrophosphate | 1218.619 | O-Phospho-L-Tyrosine | 844.9342 |
| Biolog: PM4 | Trimeta-phosphate | 1053.513 | Phosphocreatine | 915.1867 |
| Biolog: PM4 | Tripoly-phosphate | 1034.13 | Phosphoryl Choline | 931.0385 |
| Biolog: PM4 | Triethyl Phosphate | 963.8293 | O-Phosphoryl-Ethanolamine | 1247.866 |
| Biolog: PM4 | Hypophosphite | 1200.972 | Phosphono Acetic Acid | 973.2717 |
| Biolog: PM4 | Adenosine-2'-monophosphate | 835.9772 | 2-Aminoethyl Phosphonic Acid | 863.4665 |
| Biolog: PM4 | Adenosine-3'-monophosphate | 1177.204 | Methylene Diphosphonic Acid | 1100.448 |
| Biolog: PM4 | Adenosine-5'-monophosphate | 943.1275 | Thymidine-3'-monophosphate | 989.4086 |
| Biolog: PM4 | Adenosine-2',3'-cyclic monophosphate | 828.2019 | Thymidine-5'-monophosphate | 974.1167 |
| Biolog: PM4 | Adenosine-3',5'-cyclic monophosphate | 960.1114 | Inositol Hexaphosphate | 930.6695 |
| Biolog: PM4 | Thiophosphate | 918.3175 | Thymidine 3',5'-cyclic monophosphate | 956.7267 |
| Biolog: PM4 | Dithiophosphate | 1139.127 | Sulfate | 1102.113 |
| Biolog: PM4 | D,L-a-Glycerol Phosphate | 953.3933 | Thiosulfate | 1139.701 |
| Biolog: PM4 | b-Glycerol Phosphate | 984.3562 | Tetrathionate | 924.2846 |
| Biolog: PM4 | Carbamyl Phosphate | 699.376 | Thiophosphate | 750.1825 |
| Biolog: PM4 | D-2-Phospho-Glyceric Acid | 864.3266 | Dithiophosphate | 1027.185 |
| Biolog: PM4 | D-3-Phospho-Glyceric Acid | 875.2279 | L-Cysteine | 873.2094 |
| Biolog: PM4 | Guanosine-2'-monophosphate | 884.9602 | D-Cysteine | 846.0712 |
| Biolog: PM4 | Guanosine-3'-monophosphate | 1064.116 | L-Cysteinyl-Glycine | 708.9877 |
| Biolog: PM4 | Guanosine-5'-monophosphate | 634.7352 | L-Cysteic Acid | 958.3734 |
| Biolog: PM4 | Guanosine-2',3'-cyclic monophosphate | 1192.965 | Cysteamine | 1065.267 |
| Biolog: PM4 | Guanosine-3',5'-cyclic monophosphate | 813.7484 | L-Cysteine Sulfinic Acid | 845.2477 |
| Biolog: PM4 | Phosphoenol Pyruvate | 858.9337 | N-Acetyl-L-Cysteine | 1073.744 |
| Biolog: PM4 | Phospho- Glycolic Acid | 939.7996 | S-Methyl-L-Cysteine | 642.8406 |
| Biolog: PM4 | D-Glucose-1-Phosphate | 929.0604 | Cystathionine | 980.1408 |
| Biolog: PM4 | D-Glucose-6-Phosphate | 847.6712 | Lanthionine | 968.1267 |
| Biolog: PM4 | 2-Deoxy-D-Glucose 6-Phosphate | 1037.931 | Glutathione | 715.7865 |
| Biolog: PM4 | D-Glucosamine-6-Phosphate | 757.8961 | D,L-Ethionine | 921.5463 |
| Biolog: PM4 | 6-Phospho-Gluconic Acid | 914.9964 | L-Methionine | 997.9974 |
| Biolog: PM4 | Cytidine-2'-monophosphate | 1065.318 | D-Methionine | 1130.424 |
| Biolog: PM4 | Cytidine-3'-monophosphate | 1014.641 | Glycyl-L-Methionine | 941.7214 |
| Biolog: PM4 | Cytidine-5'-monophosphate | 942.9374 | N-Acetyl-D,L-Methionine | 830.2999 |
| Biolog: PM4 | Cytidine-2',3'-cyclic monophosphate | 1332.358 | L- Methionine Sulfoxide | 820.2856 |
| Biolog: PM4 | Cytidine-3',5'-cyclic monophosphate | 969.0543 | L-Methionine Sulfone | 897.1863 |
| Biolog: PM4 | D-Mannose-1-Phosphate | 1121.007 | L-Djenkolic Acid | 317.7642 |
| Biolog: PM4 | D-Mannose-6-Phosphate | 906.9952 | Thiourea | 953.896 |
| Biolog: PM4 | Cysteamine-S-Phosphate | 1087.129 | 1-Thio-b-D-Glucose | 908.9172 |
| Biolog: PM4 | Phospho-L-Arginine | 783.4713 | D,L-Lipoamide | 1094.48 |
| Biolog: PM4 | O-Phospho-D-Serine | 913.5487 | Taurocholic Acid | 1299.592 |
| Biolog: PM4 | O-Phospho-L-Serine | 952.4768 | Taurine | 1004.117 |
| Biolog: PM4 | O-Phospho-L-Threonine | 752.2541 | Hypotaurine | 1147.047 |

TABLE 3-continued

Screened Compounds from Biolog Phenotype Microarrays (PM4) for lipase inhibition activity on stored human milk samples.
Biolog Phenotype Microarray (PM4)

| Library Code | Compound | Lipase (RFU) | Compound | Lipase (RFU) |
|---|---|---|---|---|
| Biolog: PM4 | Uridine-2'-monophosphate | 909.0878 | p-Amino Benzene Sulfonic Acid | 861.3127 |
| Biolog: PM4 | Uridine-3'-monophosphate | 718.4579 | Butane Sulfonic Acid | 1201.684 |
| Biolog: PM4 | Uridine-5'-monophosphate | 946.5748 | 2-Hydroxyethane Sulfonic Acid | 784.5377 |
| Biolog: PM4 | Uridine-2',3'-cyclic monophosphate | 728.5508 | Methane Sulfonic Acid | 943.4595 |
| Biolog: PM4 | Uridine-3',5'-cyclic monophosphate | 986.1264 | Tetramethylene Sulfone | 353.4767 |

TABLE 4

Screened Compounds from Biolog Phenotype Microarrays (PM5) for lipase inhibition activity on stored human milk samples.
Biolog Phenotype Microarrays (PM5)

| Library Code | Compound | Lipase (RFU) | Compound | Lipase (RFU) |
|---|---|---|---|---|
| Biolog: PM5 | L-Alanine | 1331.383 | Pyridoxine | 1071.75 |
| Biolog: PM5 | L-Arginine | 980.9809 | Pyridoxal | 921.5601 |
| Biolog: PM5 | L-Asparagine | 1092.375 | Pyridoxamine | 954.5832 |
| Biolog: PM5 | L-Aspartic Acid | 1061.921 | b-Alanine | 950.4748 |
| Biolog: PM5 | L-Cysteine | 793.6132 | D-Pantothenic Acid | 1005.134 |
| Biolog: PM5 | L-Glutamic Acid | 821.1812 | Orotic Acid | 1057.435 |
| Biolog: PM5 | Adenosine-3',5'-cyclic monophosphate | 1005.271 | Uracil | 876.7354 |
| Biolog: PM5 | Adenine | 1202.436 | Uridine | 858.0629 |
| Biolog: PM5 | Adenosine | 952.179 | 2'-Deoxy Uridine | 822.7632 |
| Biolog: PM5 | 2'-Deoxy Adenosine | 374.7843 | Quinolinic Acid | 1209.412 |
| Biolog: PM5 | L-Glutamine | 832.4002 | Nicotinic Acid | 1041.771 |
| Biolog: PM5 | Glycine | 1085.013 | Nicotinamide | 1058.118 |
| Biolog: PM5 | L-Histidine | 980.1322 | b-Nicotinamide | 921.8711 |
| Biolog: PM5 | L-Isoleucine | 755.2513 | Adenine Dinucleotide | 1049.866 |
| Biolog: PM5 | L-Leucine | 922.193 | d-Amino-Levulinic Acid | 900.4212 |
| Biolog: PM5 | L-Lysine | 1084.77 | Hematin | 854.3329 |
| Biolog: PM5 | L-Methionine | 992.2289 | Deferoxamine | 806.6176 |
| Biolog: PM5 | L-Phenylalanine | 595.2894 | Mesylate | 869.9771 |
| Biolog: PM5 | Guanosine-3',5'-cyclic monophosphate | 1141.322 | D--Glucose | 992.2563 |
| Biolog: PM5 | Guanine | 909.1174 | N-Acetyl D-Glucosamine | 1058.802 |
| Biolog: PM5 | Guanosine | 912.4694 | Thymine | 947.068 |
| Biolog: PM5 | 2'-Deoxy Guanosine | 811.6129 | Glutathione | 1028.094 |
| Biolog: PM5 | L-Proline | 680.3258 | Thymidine | 991.7514 |
| Biolog: PM5 | L-Serine | 724.1414 | Oxaloacetic Acid | 810.9101 |
| Biolog: PM5 | L-Threonine | 873.9208 | D-Biotin | 697.9239 |
| Biolog: PM5 | L-Tryptophan | 1156.719 | Cyano-Cobalamine | 1050.9 |
| Biolog: PM5 | L-Tyrosine | 1318.063 | p-Amino- | 1088.1 |
| Biolog: PM5 | L-Valine | 1052.532 | Benzoic Acid | 1003.567 |
| Biolog: PM5 | L-isoleucine + L-Valine | 725.8213 | Folic Acid | 635.4394 |
| Biolog: PM5 | trans-4-Hydroxy L-Proline | 608.0856 | Inosine + Thiamine | 729.9739 |
| Biolog: PM5 | 4-Amino-Imidazole-4-Carboxamide | 1133.153 | Thiamine | 935.4969 |
| Biolog: PM5 | Hypoxanthine | 958.2355 | Thiamine | 938.7666 |
| Biolog: PM5 | Inosine | 959.6179 | Pyrophosphate | 873.0451 |
| Biolog: PM5 | 2'-Deoxy Inosine | 263.369 | Riboflavin | 1037.621 |
| Biolog: PM5 | L-Ornithine | 988.7604 | Pyrrolo-Quinoline Quinone | 991.7086 |
| Biolog: PM5 | L-Citrulline | 1167.04 | Menadione | 774.4043 |
| Biolog: PM5 | Chorismic Acid | 935.6375 | m-Inositol | 938.5355 |
| Biolog: PM5 | Shikimic Acid | 928.5856 | Butyric Acid | 207.037 |
| Biolog: PM5 | L-Homoserine Lactone | 1108.032 | D,L-a-Hydroxy-Butyric Acid | 953.4038 |
| Biolog: PM5 | D-Alanine | 1010.933 | a-Keto-Butyric Acid | 951.1931 |
| Biolog: PM5 | D-Aspartic Acid | 1152.002 | Caprylic Acid | 1013.714 |
| Biolog: PM5 | D-Glutamic Acid | 1176.72 | D,L-a-Lipoic Acid | 1057.919 |
| Biolog: PM5 | D,L-a,e-Diamino-pimelic Acid | 1024.071 | D,L-Mevalonic Acid | 770.5753 |
| Biolog: PM5 | Cytosine | 991.9282 | D,L-Carnitine | 1032.196 |
| Biolog: PM5 | Cytidine | 1164.328 | Choline | 515.8895 |
| Biolog: PM5 | 2'-Deoxy Cytidine | 732.9443 | Tween 20 | 284.3494 |
| Biolog: PM5 | Putrescine | 1083.038 | Tween 40 | 297.5657 |
| Biolog: PM5 | Spermidine | 994.6739 | Tween 60 | 651.205 |
| Biolog: PM5 | Spermine | 1092.25 | Tween 80 | 112.6708 |

TABLE 5

Screened Compounds from the Food Additive Library for lipase inhibition activity on stored human milk samples.
Food Additive Library

| Library Code | Compound | Lipase (RFU) | Library Code | Compound | Lipase (RFU) |
|---|---|---|---|---|---|
| MedChemExpress: HY-B2227A | Lactate (calcium) | 763.893 | MedChemExpress: HY-W007828 | Methyl 3-phenylpropanoate | 889.7516 |
| MedChemExpress: HY-W017613 | (Ethoxymethyl)benzene | 811.133 | MedChemExpress: HY-W012999 | Tiglic acid | 1078.568 |
| MedChemExpress: HY-N1926 | Dihydrocoumarin | 1183.435 | MedChemExpress: HY-Y1683 | DL-Menthol | 1275.242 |
| MedChemExpress: HY-W010178 | 4-Methyloctanoic acid | 819.5904 | MedChemExpress: HY-N1384 | Ambroxide | 1042.515 |
| MedChemExpress: HY-W009948 | Vanillin acetate | 737.3261 | MedChemExpress: HY-W017316 | Terpinen-4-ol | 904.3535 |
| MedChemExpress: HY-N7000 | Perillyl alcohol | 1014.188 | MedChemExpress: HY-W015879 | 2-Heptanol | 1139.117 |
| MedChemExpress: HY-W017212 | Methyl cinnamate | 944.3607 | MedChemExpress: HY-W015912 | 2-Acetylfuran | 775.2638 |
| MedChemExpress: HY-101036 | Choline (bitartrate) | 1263.191 | MedChemExpress: HY-W016715 | L-Cysteine (hydrochloride hydrate) | 1046.57 |
| MedChemExpress: HY-Y0073 | 4-Hydroxyacetophenone | 724.0191 | MedChemExpress: HY-N0294 | Protocatechuic acid | 981.5941 |
| MedChemExpress: HY-N0198 | Nordihydroguaiaretic acid | 879.1514 | MedChemExpress: HY-Y0546 | Benzophenone | 1112.103 |
| MedChemExpress: HY-W040948 | 2-Ethylpyrazine | 787.4299 | MedChemExpress: HY-N7063 | Nerol | 1033.533 |
| MedChemExpress: HY-N2071 | Cedrol | 993.211 | MedChemExpress: HY-N6948 | Linalyl acetate | 753.0162 |
| MedChemExpress: HY-77490A | 1,3-Butanediol | 1167.529 | MedChemExpress: HY-N3075 | Phytol | 1207.906 |
| MedChemExpress: HY-Y1069 | (S)-Malic acid | 1015.072 | MedChemExpress: HY-W012922 | 2-Methyl-4-pentenoic Acid | 842.8124 |
| MedChemExpress: HY-D0259 | Erythrosine B | 836.3958 | MedChemExpress: HY-W015342 | Methyl anisate | 1101.708 |
| MedChemExpress: HY-N0060A | Ferulic acid (sodium) | 842.3693 | MedChemExpress: HY-B1173 | (+)-Camphor | 881.1343 |
| MedChemExpress: HY-107832 | Ketoisophorone | 818.3204 | MedChemExpress: HY-N0830 | Palmitic acid | 1053.18 |
| MedChemExpress: HY-N2004 | Isoborneol | 1130.476 | MedChemExpress: HY-W012595 | Benzylideneacetone | 1109.291 |
| MedChemExpress: HY-N0445 | 2-Hydroxy-4-methoxybenzaldehyde | 932.9902 | MedChemExpress: HY-B0302 | Etidronic acid | 958.9943 |
| MedChemExpress: HY-D0307A | Amaranth | 987.0531 | MedChemExpress: HY-Y0682 | Ethylenediaminetetraacetic acid | 838.2328 |
| MedChemExpress: HY-B0167 | Salicylic acid | 1390.025 | MedChemExpress: HY-N6810 | Thymol | 1327.554 |
| MedChemExpress: HY-10448 | Capsaicin | 1060.242 | MedChemExpress: HY-N0148A | Rutin (hydrate) | 841.1375 |
| MedChemExpress: HY-14621 | Zingerone | 802.7858 | MedChemExpress: HY-N1423 | Glycocholic acid | 868.0625 |
| MedChemExpress: HY-N7125 | Cinnamyl acetate | 1082.491 | MedChemExpress: HY-B1788 | Taurocholic acid | 949.1523 |
| MedChemExpress: HY-B1751 | Quinidine | 1032.063 | MedChemExpress: HY-Y0293 | L-Tartaric acid | 840.2751 |
| MedChemExpress: HY-B2201 | Citric acid (trisodium) | 1189.911 | MedChemExpress: HY-N0420 | Succinic acid | 982.6487 |
| MedChemExpress: HY-Y1093 | Ethyl acetoacetate | 1035.068 | MedChemExpress: HY-B0315 | Vitamin B12 | 592.449 |
| MedChemExpress: HY-76225 | Ammonium glycyrrhizinate | 918.7261 | MedChemExpress: HY-B0167A | Sodium Salicylate | 847.8959 |
| MedChemExpress: HY-W017370 | Carveol | 1221.384 | MedChemExpress: HY-B0166 | L-Ascorbic acid | 707.8035 |
| MedChemExpress: HY-34487 | 1,3-Dimethoxybenzene | 847.2749 | MedChemExpress: HY-N0378 | D-Mannitol | 962.9718 |
| MedChemExpress: HY-N0060 | Ferulic acid | 828.4832 | MedChemExpress: HY-Y0781 | Pyruvic acid | 1026.646 |
| MedChemExpress: HY-W010607 | cis-3-Hexen-1-ol | 854.7889 | MedChemExpress: HY-N1420 | Rhamnose | 816.2993 |
| MedChemExpress: HY-W015969 | 1-Aminopropan-2-ol | 1021.874 | MedChemExpress: HY-W001132 | Indole | 1011.328 |
| MedChemExpress: HY-W009516 | Dibenzyl disulfide | 1113.399 | MedChemExpress: HY-Y0479 | L-Lactic acid | 1144.294 |
| MedChemExpress: HY-W012634 | Benzothiazole | 1007.749 | MedChemExpress: HY-B0511 | Biotin | 1165.648 |
| MedChemExpress: HY-W015695 | 4-Methyl-5-thiazoleethanol | 986.4381 | MedChemExpress: HY-16637 | Folic acid | 1089.591 |
| MedChemExpress: HY-B2123 | Lactose | 1013.361 | MedChemExpress: HY-B2223 | Thiamine nitrate | 1094.609 |

TABLE 5-continued

Screened Compounds from the Food Additive Library for lipase inhibition activity on stored human milk samples.
Food Additive Library

| Library Code | Compound | Lipase (RFU) | Library Code | Compound | Lipase (RFU) |
|---|---|---|---|---|---|
| MedChemExpress: HY-B1278 | D-α-Tocopherol acetate | 1194.717 | MedChemExpress: HY-N0623 | L-Tryptophan | 1074.461 |
| MedChemExpress: HY-128467 | Dehydroacetic acid (sodium) | 813.8679 | MedChemExpress: HY-N0593A | Deoxycholic acid sodium salt | 807.5513 |
| MedChemExpress: HY-N2439 | Methyl isoeugenol | 813.2954 | MedChemExpress: HY-B0143 | Niacin | 937.0411 |
| MedChemExpress: HY-B0940 | Ethylvanillin | 949.6167 | MedChemExpress: HY-W014612 | Eugenol acetate | 1060.809 |
| MedChemExpress: HY-34465 | 5-Methyl-2-thiophenecarboxaldehyde | 884.2096 | MedChemExpress: HY-N0756A | (−)-Bornyl acetate | 964.4041 |
| MedChemExpress: HY-41417 | Octanoic acid | 962.4098 | MedChemExpress: HY-N0308 | Octyl acetate | 1146.859 |
| MedChemExpress: HY-N8016 | Nonanal | 935.1292 | MedChemExpress: HY-W015635 | Diallyl disulfide | 1000.398 |
| MedChemExpress: HY-N0154 | Neohesperidin dihydrochalcone | 917.1936 | MedChemExpress: HY-N7144A | Citronellyl acetate | 1072.293 |
| MedChemExpress: HY-N8015 | Octanal | 920.8484 | MedChemExpress: HY-N0349 | Methyl Paraben | 1162.988 |
| MedChemExpress: HY-N0324 | Cholic acid | 761.6522 | MedChemExpress: HY-W010201 | Citronellol | 1084.092 |
| MedChemExpress: HY-N2045 | Musk ketone | 777.5201 | MedChemExpress: HY-W018653 | Cyclohexaneacetic acid | 958.7865 |
| MedChemExpress: HY-B1550 | Benzoin | 968.9971 | MedChemExpress: HY-17568 | Nonivamide | 911.9923 |
| MedChemExpress: HY-N0537 | Xylose | 894.2319 | MedChemExpress: HY-N0469 | L-Lysine | 881.5409 |
| MedChemExpress: HY-N1406 | 6-Methylcoumarin | 982.8899 | MedChemExpress: HY-N0142 | Phloretin | 1118.621 |
| MedChemExpress: HY-B0400 | D-Sorbitol | 781.4379 | MedChemExpress: HY-N0545 | Taurocholic acid (sodium) | 1062.302 |
| MedChemExpress: HY-W012531 | 2-Hydroxycinnamic acid | 929.9843 | MedChemExpress: HY-B0314 | Talc | 904.9897 |
| MedChemExpress: HY-N2362 | DL-Alanine | 848.8304 | MedChemExpress: HY-Z0478 | (−)-Limonene | 914.6466 |
| MedChemExpress: HY-W067358 | 2-Methylpyrazine | 718.4233 | MedChemExpress: HY-N0538 | Xylitol | 1016.558 |
| MedChemExpress: HY-Y0289 | 1-Dodecanol | 944.8837 | MedChemExpress: HY-B1695 | Methyl nicotinate | 1069.07 |
| MedChemExpress: HY-W013627 | trans, trans-2,4-Decadienal | 1141.703 | MedChemExpress: HY-N0681 | D-Pantothenic acid (hemicalcium salt) | 932.4036 |
| MedChemExpress: HY-W015307 | 4-Ethyloctanoic acid | 904.8141 | MedChemExpress: HY-N0626A | Potassium sorbate | 727.0693 |
| MedChemExpress: HY-B1431 | Butylparaben | 948.3985 | MedChemExpress: HY-B2227 | Lactate | 1249.686 |
| MedChemExpress: HY-B0361 | Aspartame | 1041.59 | MedChemExpress: HY-15337 | Hesperidin | 595.5734 |
| MedChemExpress: HY-Y0248A | Farnesol | 1017.943 | MedChemExpress: HY-N0148 | Rutin | 752.0518 |
| MedChemExpress: HY-N0368 | Linalool | 1079.408 | MedChemExpress: HY-Y0836 | Diethyl succinate | 730.8022 |
| MedChemExpress: HY-128389 | 1-Furfurylpyrrole | 746.6053 | MedChemExpress: HY-W013807 | Dibutyl sebacate | 630.2081 |
| MedChemExpress: HY-W016979 | δ-Decalactone | 852.5744 | MedChemExpress: HY-N1426 | Raspberry ketone | 944.1144 |
| MedChemExpress: HY-N2086 | Ethyl palmitate | 965.2005 | MedChemExpress: HY-N3025 | Zinc sulfate (heptahydrate) | 892.8586 |
| MedChemExpress: HY-W040226 | Indigo carmine | 862.5624 | MedChemExpress: HY-W011602 | Triethyl citrate | 1099.976 |
| MedChemExpress: HY-Y0989 | Acetophenone | 1002.631 | MedChemExpress: HY-B0133 | Natamycin | 1110.851 |
| MedChemExpress: HY-D0143 | Quinine | 1166.375 | MedChemExpress: HY-W009708 | Bis(2-methyl-3-furyl)disulfide | 1036.712 |
| MedChemExpress: HY-N2195 | Nootkatone | 1252.835 | MedChemExpress: HY-N0163 | Magnolol | 941.9616 |
| MedChemExpress: HY-W013605A | 4-Methoxycinnamaldehyde | 845.4305 | MedChemExpress: HY-N0679 | Retinyl acetate | 989.0064 |
| MedChemExpress: HY-W017522 | Adipic acid | 793.5413 | MedChemExpress: HY-B0433A | Quinine (hydrochloride dihydrate) | 1081.551 |
| MedChemExpress: HY-B1465 | 1-Hexadecanol | 1083.165 | MedChemExpress: HY-N7136 | α-Terpinyl acetate | 820.1053 |
| MedChemExpress: HY-Y0078 | Cinnamyl Alcohol | 1000.49 | MedChemExpress: HY-N7079 | Erythorbic acid | 1131.679 |
| MedChemExpress: HY-B1211 | Dehydroacetic acid | 929.701 | MedChemExpress: HY-W015618 | 2',4'-Dimethylacetophenone | 702.504 |

TABLE 5-continued

Screened Compounds from the Food Additive Library for lipase inhibition activity on stored human milk samples.
Food Additive Library

| Library Code | Compound | Lipase (RFU) | Library Code | Compound | Lipase (RFU) |
|---|---|---|---|---|---|
| MedChemExpress: HY-10448A | Capsaicinoid | 989.3706 | MedChemExpress: HY-W010476 | 2,3,5-Trimethylpyrazine | 869.7604 |
| MedChemExpress: HY-76705 | Methyl N-methylanthranilate | 860.2221 | MedChemExpress: HY-W005327 | 1-Hydroxy-2-butanone | 1156.145 |
| MedChemExpress: HY-N7083 | Citral | 1048.78 | MedChemExpress: HY-W020183 | γ-Terpinene | 918.7096 |
| MedChemExpress: HY-14617 | Paradol | 1060.26 | MedChemExpress: HY-N7103 | Ethyl oleate | 988.2104 |
| MedChemExpress: HY-W012732 | Isoquinoline | 697.4802 | MedChemExpress: HY-W127442 | Etzadroxil | 1099.896 |
| MedChemExpress: HY-W007704 | Methyl cyclohexanecarboxylate | 1098.735 | MedChemExpress: HY-W011053 | Neotame | 994.7737 |
| MedChemExpress: HY-124082 | Dodecyl gallate | 869.3552 | MedChemExpress: HY-W007692 | Acetylpyrazine | 840.2329 |
| MedChemExpress: HY-W004286 | Methyl laurate | 1102.654 | MedChemExpress: HY-W004298 | 10-Undecen-1-ol | 785.5597 |
| MedChemExpress: HY-N2041 | Myristic acid | 851.218 | MedChemExpress: HY-W032013 | 1-Octanol | 1158.636 |
| MedChemExpress: HY-N0610A | Cinnamic acid | 737.0173 | MedChemExpress: HY-113063 | 3-Methyl-2-oxovaleric acid | 1424.933 |
| MedChemExpress: HY-W012575 | 2,4-Dihydroxybenzoic acid | 1064.046 | MedChemExpress: HY-N0337 | Eugenol | 927.4764 |
| MedChemExpress: HY-B1066 | Butylhydroxyanisole | 816.8865 | MedChemExpress: HY-N7117 | 1,4-Cineole | 770.6625 |
| MedChemExpress: HY-N7126 | Citronellal | 1007.694 | MedChemExpress: HY-13211 | (E)-2-Decenoic acid | 763.8796 |
| MedChemExpress: HY-B1391 | D-Panthenol | 659.466 | MedChemExpress: HY-Y0271 | Urea | 934.3458 |
| MedChemExpress: HY-B1941 | 4-tert-Octylphenol | 868.4892 | MedChemExpress: HY-N0708 | Vanillic acid | 1052.276 |
| MedChemExpress: HY-W013075 | Rutin (trihydrate) | 1121.068 | MedChemExpress: HY-128454 | Dimethyl trisulfide | 894.0785 |
| MedChemExpress: HY-Y0537 | Potassium chloride, AR, 99.5% | 813.3167 | MedChemExpress: HY-N0682 | Pyridoxine (hydrochloride) | 911.6428 |
| MedChemExpress: HY-W014325 | TRPM8 agonist WS-3 | 1137.691 | MedChemExpress: HY-W007355 | Skatole | 735.1893 |
| MedChemExpress: HY-N9502 | Linalool oxide | 1175.974 | MedChemExpress: HY-B1328 | Pyridoxine | 1095.782 |
| MedChemExpress: HY-B0896 | Triacetin | 821.4356 | MedChemExpress: HY-B2219 | Stearic acid | 808.9347 |
| MedChemExpress: HY-W105970 | Disodium pyrophosphate | 1213.966 | MedChemExpress: HY-B1008 | 4-Aminobenzoic acid | 1082.936 |
| MedChemExpress: HY-Y0172 | Butylated hydroxytoluene | 1194.072 | MedChemExpress: HY-B0456 | Riboflavin | 837.9833 |
| MedChemExpress: HY-N7090 | Benzyl cinnamate | 969.7584 | MedChemExpress: HY-W015913 | Sodium 2-oxopropanoate | 683.8023 |
| MedChemExpress: HY-W010608 | 2-Methyltetrahydrofuran-3-one | 1091.025 | MedChemExpress: HY-N0216 | Benzoic acid | 1115.708 |
| MedChemExpress: HY-N0119 | Naringin Dihydrochalcone | 688.775 | MedChemExpress: HY-B2136 | Tannic acid | 1033.049 |
| MedChemExpress: HY-B0430 | D-Pantothenic acid | 1032.25 | MedChemExpress: HY-N1420A | Rhamnose (monohydrate) | 978.8722 |
| MedChemExpress: HY-Y1426 | 2'-Hydroxyacetophenone | 1043.491 | MedChemExpress: HY-W018772 | D-Ribose(mixture of isomers) | 963.0743 |
| MedChemExpress: HY-N0709 | Coumarin | 880.5184 | MedChemExpress: HY-N1944 | Nerolidol | 1068.015 |
| MedChemExpress: HY-B0935 | Benzyl benzoate | 984.2536 | MedChemExpress: HY-N0184 | Glycyrrhizic acid | 824.0531 |
| MedChemExpress: HY-B0892 | Benzyl alcohol | 818.7648 | MedChemExpress: HY-N0680 | Thiamine (hydrochloride) | 1314.57 |
| MedChemExpress: HY-N7079A | Sodium erythorbate | 904.5416 | MedChemExpress: HY-W046353 | 2-Methoxycinnamaldehyde | 806.8366 |
| MedChemExpress: HY-W040971 | Creosol | 835.9293 | MedChemExpress: HY-121222 | alpha-Bisabolol | 653.6185 |
| MedChemExpress: HY-W007888 | 2-Hydroxy-4-methylbenzaldehyde | 1333.344 | MedChemExpress: HY-N7093 | Furaneol | 916.5799 |
| MedChemExpress: HY-N0614 | Sucralose | 919.3825 | MedChemExpress: HY-N1952 | Isoeugenol | 1084.439 |
| MedChemExpress: HY-N0711 | Carvacrol | 695.2525 | MedChemExpress: HY-W012998 | 2,3-Pentanedione | 655.8408 |
| MedChemExpress: HY-B1411 | i-Inositol | 1026.636 | MedChemExpress: HY-Y0932 | Isophorone | 775.739 |
| MedChemExpress: HY-W013035 | 3-Methyl-2-buten-1-ol | 1025.112 | MedChemExpress: HY-Y0949 | Methyl 2-furoate | 964.8008 |

TABLE 5-continued

Screened Compounds from the Food Additive Library for lipase inhibition activity on stored human milk samples.
Food Additive Library

| Library Code | Compound | Lipase (RFU) | Library Code | Compound | Lipase (RFU) |
|---|---|---|---|---|---|
| MedChemExpress: HY-N1446 | Oleic acid | 1171.133 | MedChemExpress: HY-34439 | 2,5-Dimethylpyrazine | 915.4387 |
| MedChemExpress: HY-128371 | 2-Methylhexanoic acid | 923.3324 | MedChemExpress: HY-N0152 | Myricitrin | 1120.21 |
| MedChemExpress: HY-Y0121 | Ethyl cinnamate | 954.8666 | MedChemExpress: HY-W012835 | 4-Methylanisole | 864.3612 |
| MedChemExpress: HY-Y0313 | p-Hydroxybenzaldehyde | 1010.339 | MedChemExpress: HY-W012701 | Ethyl 3-hydroxybutyrate | 923.9504 |
| MedChemExpress: HY-B1812 | 1,2-Dimethoxybenzene | 1094.378 | MedChemExpress: HY-W004292 | 1-Undecanol | 1096.918 |
| MedChemExpress: HY-W012788 | Maltol | 1223.32 | MedChemExpress: HY-N1423A | Glycocholic acid (sodium) | 1089.709 |
| MedChemExpress: HY-W009417 | Cedryl acetate | 1088.309 | MedChemExpress: HY-W010549 | 2-Methylcyclohexanone | 810.41 |
| MedChemExpress: HY-W004283 | Pentadecanoic acid | 930.9364 | MedChemExpress: HY-116084 | Trimethylamine N-oxide | 948.4231 |
| MedChemExpress: HY-N1428 | Citric acid | 1240.795 | MedChemExpress: HY-Y1718 | Tridecanoic acid | 833.6958 |
| MedChemExpress: HY-W087919 | 5-Methyl-2-furanmethanol | 971.233 | MedChemExpress: HY-W012658 | 2-Methylacetophenone | 673.2268 |
| MedChemExpress: HY-N6996 | Methyl Eugenol | 982.6143 | MedChemExpress: HY-W015780 | 1,4-Dimethoxybenzene | 995.997 |
| MedChemExpress: HY-129623 | Ethyl nonanoate | 888.9878 | MedChemExpress: HY-W010516 | 2-Methylvaleric acid | 913.3585 |
| MedChemExpress: HY-N0626 | Sorbic acid | 913.5254 | MedChemExpress: HY-N7070 | Geranyl acetate | 968.4874 |
| MedChemExpress: HY-N5060 | Estragole | 655.6447 | MedChemExpress: HY-128733 | Phenyl acetate | 681.5677 |
| MedChemExpress: HY-W015309 | Decanoic acid | 948.693 | MedChemExpress: HY-W008270 | 2(5H)-Furanone | 1095.726 |
| MedChemExpress: HY-W041301 | (+)-Dihydroactinidiolide | 951.3124 | MedChemExpress: HY-B1729 | Phenoxyethanol | 1022.676 |
| MedChemExpress: HY-W012653 | 4'-Methylacetophenone | 1064.978 | MedChemExpress: HY-D0846 | Diethyl pyrocarbonate | 886.6617 |
| MedChemExpress: HY-N7436 | Methyl propyl disulfide | 1006.279 | MedChemExpress: HY-B0647 | Butylphthalide | 989.7778 |
| MedChemExpress: HY-119309 | Sucrose octaacetate | 903.444 | MedChemExpress: HY-I0501 | 2'-Aminoacetophenone | 970.2571 |
| MedChemExpress: HY-W012956 | 2-Acetylpyrrole | 989.2956 | MedChemExpress: HY-W010562 | 2-Methoxypyrazine | 1328.477 |
| MedChemExpress: HY-N3544 | Caryophyllene oxide | 891.7497 | MedChemExpress: HY-N0325 | DL-Methionine | 957.9009 |
| MedChemExpress: HY-B1556 | Benzyl salicylate | 910.7358 | MedChemExpress: HY-Y0267 | Phenoxyacetic acid | 872.4796 |
| MedChemExpress: HY-W013014 | 3-Methyl-2-cyclopenten-1-one | 888.5186 | MedChemExpress: HY-W041470 | 4-Methyl-1-phenyl-2-pentanone | 457.7348 |
| MedChemExpress: HY-117235 | Diallyl Trisulfide | 1075.357 | MedChemExpress: HY-N1393 | 2-Methoxybenzoic acid | 739.8823 |
| MedChemExpress: HY-N2543 | Damascenone | 912.4849 | MedChemExpress: HY-N0098 | Vanillin | 958.5749 |
| MedChemExpress: HY-N7084 | Methyl dihydrojasmonate | 1041.908 | MedChemExpress: HY-N1390 | Syringaldehyde | 938.0511 |
| MedChemExpress: HY-N5142 | α-Terpineol | 711.7435 | MedChemExpress: HY-N0666 | L-Aspartic acid | 484.6137 |
| MedChemExpress: HY-N0467 | Rebaudioside C | 1048.24 | MedChemExpress: HY-N0524 | Propyl gallate | 1159.407 |
| MedChemExpress: HY-Y0839 | Levulinic acid | 1112.446 | MedChemExpress: HY-W040240 | (3S,4R,5S)-1,3,4,5,6-Pentahydroxyhexan-2-one | 1079.288 |
| MedChemExpress: HY-N0466 | Rebaudioside A | 1278.993 | MedChemExpress: HY-N1096 | Veratraldehyde | 898.3756 |
| MedChemExpress: HY-N7057 | Nonanoic acid | 1267.202 | MedChemExpress: HY-N1500 | Pulegone | 791.7693 |
| MedChemExpress: HY-Y0946 | Acetamide | 918.0344 | MedChemExpress: HY-W010611 | 3-Methylbut-2-enoic acid | 818.9086 |
| MedChemExpress: HY-Y0335 | 1,3-Dihydroxyacetone | 952.8488 | MedChemExpress: HY-B0430A | D-Pantothenic acid (sodium) | 959.6656 |
| MedChemExpress: HY-N0633 | Muscone | 696.5228 | MedChemExpress: HY-N0666B | Aspartic acid (calcium) | 952.0587 |
| MedChemExpress: HY-W017140 | 2-Sec-butyl-3-methoxypyrazine | 1126.838 | MedChemExpress: HY-B0399 | L-Carnitine | 1039.732 |
| MedChemExpress: HY-B1425 | Ethoxyquin | 1095.72 | MedChemExpress: HY-N0390 | L-Glutamine | 1107.2 |
| MedChemExpress: HY-W040790 | 2,6-Dimethylpyrazine | 824.3061 | MedChemExpress: HY-N0666C | L-Aspartic aicd (sodium) | 708.7772 |

TABLE 5-continued

Screened Compounds from the Food Additive Library for lipase inhibition activity on stored human milk samples.
Food Additive Library

| Library Code | Compound | Lipase (RFU) | Library Code | Compound | Lipase (RFU) |
|---|---|---|---|---|---|
| MedChemExpress: HY-N1415 | β-Caryophyllene | 881.1948 | MedChemExpress: HY-B1092A | Gluconate (sodium) | 1019.914 |
| MedChemExpress: HY-D0195 | Acesulfame (potassium) | 1443.891 | MedChemExpress: HY-N0771 | L-Isoleucine | 804.7165 |
| MedChemExpress: HY-Y1373 | Cyclohexanecarboxylic acid | 985.8444 | MedChemExpress: HY-B1092 | Gluconate (Calcium) | 840.1946 |
| MedChemExpress: HY-N7560 | Safranal | 1026.753 | MedChemExpress: HY-D0915 | Brilliant Blue FCF | 652.1115 |
| MedChemExpress: HY-B1384 | Retinyl palmitate | 1094.036 | MedChemExpress: HY-14608A | L-Glutamic acid (monosodium salt) | 1153.122 |
| MedChemExpress: HY-77813 | Benzyl isothiocyanate | 729.6809 | MedChemExpress: HY-N1446B | Sodium oleate | 985.0339 |
| MedChemExpress: HY-B0150 | Nicotinamide | 948.4821 | MedChemExpress: HY-B0351 | Taurine | 1067.763 |
| MedChemExpress: HY-Y1311 | Malic acid | 1029.253 | MedChemExpress: HY-B1718 | Choline theophyllinate | 839.2518 |
| MedChemExpress: HY-N0144 | Piperine | 954.6134 | MedChemExpress: HY-D0249 | Sunset Yellow FCF | 868.5434 |
| MedChemExpress: HY-N8407 | Carminic acid | 820.6641 | MedChemExpress: HY-N0667 | L-Asparagine | 743.0703 |
| MedChemExpress: HY-B1337 | Choline (chloride) | 1154.409 | MedChemExpress: HY-N0184A | Dipotassium glycyrrhizinate | 813.8172 |
| MedChemExpress: HY-N0756 | Bornyl acetate | 1013.418 | MedChemExpress: HY-N0650 | L-Serine | 814.6528 |
| MedChemExpress: HY-N6805 | Isoeugenol acetate | 756.3358 | MedChemExpress: HY-W014102 | L-Alanyl-L-glutamine | 945.4172 |
| MedChemExpress: HY-Y0543 | 5-Methylfurfural | 1073.657 | MedChemExpress: HY-N1132 | D-(+)-Trehalose | 893.2005 |
| MedChemExpress: HY-N0593 | Deoxycholic acid | 994.4872 | MedChemExpress: HY-40135 | L-Hydroxyproline, BioReagent, suitable for cell culture | 1306.794 |
| MedChemExpress: HY-W019940 | 2-Methoxy-4-vinylphenol | 992.1727 | MedChemExpress: HY-N2024 | Maltose | 938.2213 |
| MedChemExpress: HY-W018501 | Methyl p-tert-butylphenylacetate | 1050.221 | MedChemExpress: HY-113013 | Hydroxypyruvic acid | 1051.111 |
| MedChemExpress: HY-N5132 | (−)-Fenchone | 812.4614 | MedChemExpress: HY-N0229 | L-Alanine | 889.2151 |
| MedChemExpress: HY-I0301 | D-(+)-Glucono-1,5-lactone | 1105.401 | MedChemExpress: HY-N2024A | Maltose monohydrate | 1066.26 |
| MedChemExpress: HY-W027751 | 2-Methylanisole | 800.3148 | MedChemExpress: HY-B2226 | Sodium copper chlorophyllin B | 772.4849 |
| MedChemExpress: HY-N0803 | Myrcene | 1129.48 | MedChemExpress: HY-B0964 | Riboflavin (phosphate sodium) | 1091.899 |
| MedChemExpress: HY-Y0272 | Saccharin | 1019.642 | MedChemExpress: HY-W013573 | S-Allyl-L-cysteine | 780.4627 |
| MedChemExpress: HY-124190 | Isopropyl myristate | 1091.869 | MedChemExpress: HY-N0324A | Cholic acid (sodium) | 828.0633 |
| MedChemExpress: HY-W046906 | (E)-Oct-2-enoic acid | 890.5954 | MedChemExpress: HY-D0887 | Disodium 5'-inosinate | 1040.853 |
| MedChemExpress: HY-22167 | Methyl 2-hydroxy-4-methylvalerate | 1043.833 | MedChemExpress: HY-D0914 | Fast Green FCF | 896.2144 |
| MedChemExpress: HY-W010513 | 3-Methylvaleric Acid | 862.3239 | MedChemExpress: HY-N7092 | D-Fructose | 1344.653 |
| MedChemExpress: HY-W027872 | Piperonyl acetone | 718.0889 | MedChemExpress: HY-107201 | β-Cyclodextrin | 886.2621 |
| MedChemExpress: HY-W100681 | 2'-Hydroxy-5'-methylacetophenone | 953.8722 | MedChemExpress: HY-N0215 | L-Phenylalanine | 811.2971 |
| MedChemExpress: HY-N2067 | Vanillyl alcohol | 1046.308 | MedChemExpress: HY-B0166A | L-Ascorbic acid (sodium salt) | 1247.113 |
| MedChemExpress: HY-N7398 | 2-Pentylfuran | 858.2494 | MedChemExpress: HY-N0832 | L-Histidine | 830.4988 |
| MedChemExpress: HY-Y1177 | Diphenyl disulfide | 815.9417 | MedChemExpress: HY-W015410 | Disodium succinate | 1168.659 |
| MedChemExpress: HY-W014118 | α-Hexylcinnamaldehyde | 915.619 | MedChemExpress: HY-N0486 | L-Leucine | 951.993 |
| MedChemExpress: HY-N0230 | β-Alanine | 882.8696 | MedChemExpress: HY-N0717 | L-Valine | 731.7445 |
| MedChemExpress: HY-Y1362 | Ethyl pyruvate | 1178.631 | MedChemExpress: HY-N0658 | L-Threonine | 824.5923 |
| MedChemExpress: HY-W007606 | Tyramine | 955.4062 | MedChemExpress: HY-N1132A | D-(+)-Trehalose dihydrate | 1007.247 |
| MedChemExpress: HY-115684 | 2-Undecanol | 927.5465 | MedChemExpress: HY-N0326 | L-Methionine | 1119.509 |
| MedChemExpress: HY-N3097 | Pellitorine | 785.2318 | MedChemExpress: HY-B1352 | L-Ornithine | 988.6197 |

TABLE 5-continued

Screened Compounds from the Food Additive Library for lipase inhibition activity on stored human milk samples.
Food Additive Library

| Library Code | Compound | Lipase (RFU) | Library Code | Compound | Lipase (RFU) |
|---|---|---|---|---|---|
| MedChemExpress: HY-N4100 | Trilobatin | 813.3377 | MedChemExpress: HY-W017018 | L-Ornithine (hydrochloride) | 897.3284 |
| MedChemExpress: HY-N0129 | Sclareolide | 845.6458 | MedChemExpress: HY-Y0337 | L-Cysteine | 860.7165 |
| MedChemExpress: HY-N2026 | Propylparaben | 846.3629 | MedChemExpress: HY-Y0966 | Glycine | 886.9361 |
| MedChemExpress: HY-W038287 | 2-Methylbenzoxazole | 887.776 | MedChemExpress: HY-Y1088 | Hydrocinnamic acid | 919.1729 |
| MedChemExpress: HY-W012570 | Decyl aldehyde | 807.9785 | MedChemExpress: HY-D0850 | Tartaric acid (disodium dihydrate) | 855.0017 |
| MedChemExpress: HY-W015611 | L-(+)-Arabinose | 756.6986 | MedChemExpress: HY-A0100 | Thiamine monochloride | 1054.494 |
| MedChemExpress: HY-N6952 | Geraniol | 1028.31 | MedChemExpress: HY-N0470 | L-Lysine hydrochloride | 1184.747 |
| MedChemExpress: HY-W012980 | Isovaleric acid | 1027.954 | MedChemExpress: HY-Y0252 | L-Proline | 765.3953 |
| MedChemExpress: HY-W015786 | 4-Ethoxyphenol | 783.4549 | MedChemExpress: HY-W009156 | Hydroxycitric acid (tripotassium hydrate) | 1053.487 |
| MedChemExpress: HY-B0914 | 10-Undecenoic acid | 1048.253 | MedChemExpress: HY-Y0337A | L-Cysteine (hydrochloride) | 936.4597 |
| MedChemExpress: HY-W017141 | 2-Isobutyl-3-methoxypyrazine | 933.7926 | MedChemExpress: HY-N7107 | Fenchyl alcohol | 1153.434 |
| MedChemExpress: HY-W015820 | Phthalide | 1150.138 | MedChemExpress: HY-Y0189 | Methyl Salicylate | 1262.516 |
| MedChemExpress: HY-W010435 | Sulcatone | 1011.422 | MedChemExpress: HY-W032022 | 1-Hexanol | 1054.453 |
| MedChemExpress: HY-W038786 | 2,4,6-Trimethylphenol | 941.1667 | MedChemExpress: HY-Y0569C | Potassium Gluconate | 966.4096 |
| MedChemExpress: HY-N0367 | Trans-Anethole | 967.4121 | MedChemExpress: HY-N6677 | β-Apo-8'-carotenal | 958.4764 |
| MedChemExpress: HY-Y0035 | 4,4-Dimethoxy-2-butanone | 1003.039 | MedChemExpress: HY-Y0760 | 3-Methoxybenzoic acid | 1182.162 |
| MedChemExpress: HY-W012499 | N-Acetyl-L-methionine | 878.6459 | MedChemExpress: HY-B2235 | Lecithin | 973.2056 |
| MedChemExpress: HY-N6947 | Lutein | 823.7529 | MedChemExpress: HY-N0473 | L-Tyrosine | 1278 |
| MedChemExpress: HY-W039157 | 2-Acetyl-3-ethylpyrazine | 1004.158 | MedChemExpress: HY-17599 | Piperazine (citrate) | 986.285 |
| MedChemExpress: HY-W015883 | Fumaric acid | 762.3929 | MedChemExpress: HY-14608 | L-Glutamic acid | 859.3798 |
| MedChemExpress: HY-W012722 | 4-Methyl-2-oxopentanoic acid | 713.9034 | MedChemExpress: HY-N1925 | Tea polyphenol | 869.1319 |
| MedChemExpress: HY-Y0624 | 4-Pentenoic acid | 813.3186 | MedChemExpress: HY-131166 | Curdlan | 1056.896 |
| MedChemExpress: HY-Y1809 | 1-Hydroxyoctadecane | 866.8281 | MedChemExpress: HY-111830 | Lignin | 786.7843 |
| MedChemExpress: HY-B0987 | Ascorbyl palmitate | 1048.408 | MedChemExpress: HY-A0104 | Hypromellose | 843.4838 |
| MedChemExpress: HY-100489 | TBHQ | 1011.503 | MedChemExpress: HY-B1131 | Taurocholic acid (sodium salt hydrate) | 1148.675 |
| MedChemExpress: HY-W012657 | 4-Ethylbenzaldehyde | 1140.945 | MedChemExpress: HY-107846 | Xylan | 852.6949 |
| MedChemExpress: HY-Y0264 | 4-Hydroxybenzoic acid | 863.955 | MedChemExpress: HY-B2118 | Pancreatin | 1048.576 |
| MedChemExpress: HY-34544 | 2-Hexylthiophene | 1164.229 | MedChemExpress: HY-N0814A | Phytic acid (dodecasodium hydrate) | 1018.084 |
| MedChemExpress: HY-W007926 | 2-Oxobutanoic acid | 965.1993 | MedChemExpress: HY-B2228 | Proteinase | 864.6017 |
| MedChemExpress: HY-W020182 | α-Terpinene | 1101.898 | MedChemExpress: HY-B2237 | Lysozyme from chicken egg white | 739.4473 |
| MedChemExpress: HY-W004282 | Undecanoic acid | 946.4563 | | | |

TABLE 6

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N2027 | Taurochenodeoxycholic acid | 1012.659 | MedChemExpress: HY-N0628 | Kaempferitrin | 782.5682 |
| MedChemExpress: HY-W017140 | 2-Sec-butyl-3-methoxypyrazine | 978.4568 | MedChemExpress: HY-Y1750 | β-Aminopropionitrile | 985.2024 |
| MedChemExpress: HY-N2247 | Guaiacin | 808.3575 | MedChemExpress: HY-W015967 | Glycolic acid | 963.164 |
| MedChemExpress: HY-N0112 | Dihydromyricetin | 745.901 | MedChemExpress: HY-N3018 | Isomaltose | 1074.051 |
| MedChemExpress: HY-N0918 | Desmethoxyyangonin | 803.6896 | MedChemExpress: HY-34740 | Ethylmalonic acid | 894.7235 |
| MedChemExpress: HY-W100681 | 2'-Hydroxy-5'-methylacetophenone | 991.3689 | MedChemExpress: HY-N0271 | Echinocystic acid | 1071.984 |
| MedChemExpress: HY-W020183 | γ-Terpinene | 992.3969 | MedChemExpress: HY-W005178 | Octadecanedioic acid | 1032.871 |
| MedChemExpress: HY-N0487 | Glucosamine (sulfate) | 1020.123 | MedChemExpress: HY-N5119 | Kaempferol-3-O-(2"-O-β-D-glucopyl)-β-D-rutinoside | 1136.885 |
| MedChemExpress: HY-N6966 | Ethyl Caffeate | 657.5589 | MedChemExpress: HY-N7916 | (−)-Menthone | 1263.606 |
| MedChemExpress: HY-N2394 | Emodin-1-O-β-D-glucopyranoside | 964.8621 | MedChemExpress: HY-113114 | Tetrahydrocortisone | 1073.109 |
| MedChemExpress: HY-N7103 | Ethyl oleate | 757.6955 | MedChemExpress: HY-123100 | Ganoderic acid N | 866.924 |
| MedChemExpress: HY-113057 | 3-Hydroxycapric acid | 1000.822 | MedChemExpress: HY-N0140 | Ursolic acid | 930.763 |
| MedChemExpress: HY-W009708 | Bis(2-methyl-3-furyl)disulfide | 927.3282 | MedChemExpress: HY-12316 | 20(S)-Hydroxycholesterol | 855.1702 |
| MedChemExpress: HY-N0337 | Eugenol | 856.7049 | MedChemExpress: HY-18733 | Lipoic acid | 1146.052 |
| MedChemExpress: HY-N7063 | Nerol | 971.722 | MedChemExpress: HY-107494A | all-trans-4-Oxoretinoic acid | 984.8749 |
| MedChemExpress: HY-N2922 | β-Amyrin | 1183.423 | MedChemExpress: HY-N2009 | 3-O-Methylgallic acid | 1048.003 |
| MedChemExpress: HY-124422 | Pentacosanoic acid | 1024.524 | MedChemExpress: HY-N0420 | Succinic acid | 955.5962 |
| MedChemExpress: HY-N0393 | Glabridin | 1140.497 | MedChemExpress: HY-N0804 | Narirutin | 1017.626 |
| MedChemExpress: HY-N6600 | Octadecane | 747.4529 | MedChemExpress: HY-W015695 | 4-Methyl-5-thiazoleethanol | 661.8364 |
| MedChemExpress: HY-B1399 | 3-Methylsalicylic acid | 944.1858 | MedChemExpress: HY-W044764 | 2-Benzylsuccinic acid | 967.0684 |
| MedChemExpress: HY-103638 | 3-Methoxytyramine (hydrochloride) | 963.841 | MedChemExpress: HY-W017524 | 2-Methylpentanedioic acid | 820.8759 |
| MedChemExpress: HY-N0019 | Daidzein | 801.527 | MedChemExpress: HY-N4075 | O-Desmethylangolensin | 864.3847 |
| MedChemExpress: HY-W015635 | Diallyl disulfide | 1055.55 | MedChemExpress: HY-W007686 | Imidazoleacetic acid (hydrochloride) | 807.4109 |
| MedChemExpress: HY-N7028 | Withanolide A | 840.7696 | MedChemExpress: HY-100551 | meso-Erythritol | 838.849 |
| MedChemExpress: HY-W017523 | 5-Methoxy-5-oxopentanoic acid | 869.6454 | MedChemExpress: HY-W013075 | Rutin (trihydrate) | 857.0232 |
| MedChemExpress: HY-N7144A | Citronellyl acetate | 921.8428 | MedChemExpress: HY-Y0289 | 1-Dodecanol | 805.8412 |
| MedChemExpress: HY-N0621 | Morin | 1341.194 | MedChemExpress: HY-14617 | Paradol | 1109.933 |
| MedChemExpress: HY-N0728 | α-Linolenic acid | 956.2015 | MedChemExpress: HY-N0414 | Trigonelline | 673.9213 |
| MedChemExpress: HY-N0528 | Linarin | 989.9197 | MedChemExpress: HY-N0132A | Synephrine (hydrochloride) | 1044.914 |
| MedChemExpress: HY-Y0272 | Saccharin | 680.3791 | MedChemExpress: HY-Y0479 | L-Lactic acid | 920.3879 |
| MedChemExpress: HY-N2093 | Vicine | 957.7102 | MedChemExpress: HY-113314 | AFMK | 883.4169 |
| MedChemExpress: HY-N2458 | Ganoderic acid G | 1034.631 | MedChemExpress: HY-W040948 | 2-Ethylpyrazine | 1094.703 |
| MedChemExpress: HY-N8210 | Homoeriodictyol | 1005.645 | MedChemExpress: HY-N0570 | Hydroxytyrosol | 1147.317 |
| MedChemExpress: HY-13407 | Gossypol | 619.3244 | MedChemExpress: HY-B0801A | Fexofenadine (hydrochloride) | 862.3057 |
| MedChemExpress: HY-N6082 | Rhein 8-Glucoside | 942.9082 | MedChemExpress: HY-B1643 | Ethyl Vanillate | 981.4431 |
| MedChemExpress: HY-N4090 | Vicenin 3 | 1057.755 | MedChemExpress: HY-W012570 | Decyl aldehyde | 682.2968 |
| MedChemExpress: HY-N1063 | Xanthoxylin | 1097.486 | MedChemExpress: HY-N8599 | Cichoriin | 714.076 |

TABLE 6-continued

Screened Compounds from the Food-Sourced Compound Library for lipase inhibition activity on stored human milk samples.

Food-Sourced Compound Library

| Library Code | Compound | Lipase (RFU) | Library Code | Compound | Lipase (RFU) |
|---|---|---|---|---|---|
| MedChemExpress: HY-N7398 | 2-Pentylfuran | 981.4298 | MedChemExpress: HY-14621 | Zingerone | 703.613 |
| MedChemExpress: HY-N2259 | Curcumenol | 1037.652 | MedChemExpress: HY-W005327 | 1-Hydroxy-2-butanone | 1125.065 |
| MedChemExpress: HY-W004486 | Gallic aldehyde | 942.9255 | MedChemExpress: HY-113212 | Ursocholic acid | 879.9608 |
| MedChemExpress: HY-N1964 | Gibberellic acid | 979.2317 | MedChemExpress: HY-W015611 | L-(+)-Arabinose | 947.2089 |
| MedChemExpress: HY-N7117 | 1,4-Cineole | 1018.049 | MedChemExpress: HY-N0274 | Caffeic acid phenethyl ester | 1272.457 |
| MedChemExpress: HY-13211 | (E)-2-Decenoic acid | 1014.478 | MedChemExpress: HY-113410 | 3-Methylglutaric acid | 1057.628 |
| MedChemExpress: HY-N3995 | 5B-Dihydrocortisol | 863.8472 | MedChemExpress: HY-76705 | Methyl N-methylanthranilate | 1078.649 |
| MedChemExpress: HY-77641 | Cinnamoylglycine | 1081.32 | MedChemExpress: HY-I0096 | Indole-2-carboxylic acid | 815.0646 |
| MedChemExpress: HY-W009300 | 4-Hydroxyestrone | 1068.255 | MedChemExpress: HY-W011527 | Xanthosine | 845.1383 |
| MedChemExpress: HY-N1354 | Reynoutrin | 1009.396 | MedChemExpress: HY-W012480 | DL-Tryptophan | 935.3545 |
| MedChemExpress: HY-113134 | 25-Hydroxycholesterol | 1115.331 | MedChemExpress: HY-W016715 | L-Cysteine (hydrochloride hydrate) | 977.564 |
| MedChemExpress: HY-Y0836 | Diethyl succinate | 714.0182 | MedChemExpress: HY-N7494 | Pentacosane | 955.6782 |
| MedChemExpress: HY-W015912 | 2-Acetylfuran | 1061.408 | MedChemExpress: HY-W016562 | Hippuric acid | 835.5521 |
| MedChemExpress: HY-N0718 | Valepotriate | 1081.823 | MedChemExpress: HY-N1423 | Glycocholic acid | 987.2974 |
| MedChemExpress: HY-113293B | Estrone sulfate (sodium) | 1144.149 | MedChemExpress: HY-113283 | Homogentisic acid | 711.7148 |
| MedChemExpress: HY-N0128 | Sclareol | 1171.756 | MedChemExpress: HY-133865 | Diacetoxy-6-gingerdiol | 1196.031 |
| MedChemExpress: HY-Y1315 | DL-Tartaric acid | 1079.017 | MedChemExpress: HY-137940 | β-Gentiobiose | 997.1115 |
| MedChemExpress: HY-N0382 | Galangin | 839.6171 | MedChemExpress: HY-N3686 | D-Arabitol | 986.8626 |
| MedChemExpress: HY-N1477 | Dencichine | 1365.261 | MedChemExpress: HY-W009216 | 2'-Deoxycytidine-5'-monophosphoric acid | 767.1036 |
| MedChemExpress: HY-N0190 | Amygdalin | 736.6201 | MedChemExpress: HY-128699 | D-Desthiobiotin | 791.1157 |
| MedChemExpress: HY-116807 | Dihydrolipoic Acid | 784.6969 | MedChemExpress: HY-122381 | Kyotorphin | 988.5967 |
| MedChemExpress: HY-D0868 | Bicine | 1070.519 | MedChemExpress: HY-107850 | Pregnanediol | 852.1426 |
| MedChemExpress: HY-14546 | Aripiprazole | 987.2829 | MedChemExpress: HY-N0537 | Xylose | 1048.999 |
| MedChemExpress: HY-N0294 | Protocatechuic acid | 972.5566 | MedChemExpress: HY-100807 | Quinolinic acid | 839.222 |
| MedChemExpress: HY-N0486 | L-Leucine | 998.3595 | MedChemExpress: HY-N7000 | Perillyl alcohol | 948.8265 |
| MedChemExpress: HY-N6069 | Raspberry ketone glucoside | 1167.769 | MedChemExpress: HY-D0186 | 2'-Deoxyuridine | 616.2559 |
| MedChemExpress: HY-33900 | Dihydrofuran-3(2H)-one | 841.5384 | MedChemExpress: HY-B2219 | Stearic acid | 978.7495 |
| MedChemExpress: HY-W007524 | 2-Aminoquinoline | 758.5761 | MedChemExpress: HY-N2371 | 27-Hydroxycholesterol | 925.2515 |
| MedChemExpress: HY-N2006 | Ganoderic acid B | 879.1619 | MedChemExpress: HY-107826 | 5α-Cholestan-3-one | 1037.534 |
| MedChemExpress: HY-W018643 | Ferulic acid methyl ester | 1058.235 | MedChemExpress: HY-41417 | Octanoic acid | 1070.209 |
| MedChemExpress: HY-N3097 | Pellitorine | 741.5651 | MedChemExpress: HY-113219 | Hydroxyphenyllactic acid | 914.2115 |
| MedChemExpress: HY-Z0478 | (−)-Limonene | 836.6929 | MedChemExpress: HY-N0830 | Palmitic acid | 631.1364 |
| MedChemExpress: HY-N2597 | Prunetin | 865.5495 | MedChemExpress: HY-N1424 | Glycoursodeoxycholic acid | 921.9041 |
| MedChemExpress: HY-W016887 | H-Gly-Pro-OH | 952.5324 | MedChemExpress: HY-U00462 | D-Mannoheptulose | 864.02 |
| MedChemExpress: HY-41094 | cis-Isolimonenol | 930.1567 | MedChemExpress: HY-113061 | Pseudouridine | 887.2674 |
| MedChemExpress: HY-N0640 | Kuromanin (chloride) | 1192.7 | MedChemExpress: HY-I0626 | Cytosine | 1088.961 |
| MedChemExpress: HY-N1380 | Guaiacol | 900.9799 | MedChemExpress: HY-B1357 | Digitoxin | 1074.946 |

TABLE 6-continued

Screened Compounds from the Food-Sourced Compound Library for lipase inhibition activity on stored human milk samples.

Food-Sourced Compound Library

| Library Code | Compound | Lipase (RFU) | Library Code | Compound | Lipase (RFU) |
| --- | --- | --- | --- | --- | --- |
| MedChemExpress: HY-N2587 | Irigenin | 1075.446 | MedChemExpress: HY-N0144 | Piperine | 945.5475 |
| MedChemExpress: HY-N0156 | Oleanolic Acid | 884.9245 | MedChemExpress: HY-W012123 | 3,4,5-Trimethoxycinnamic acid | 1076.789 |
| MedChemExpress: HY-N0349 | Methyl Paraben | 1047.6 | MedChemExpress: HY-B0747 | Eicosapentaenoic acid ethyl ester | 905.1133 |
| MedChemExpress: HY-N0607 | Ginsenoside Ro | 1082.912 | MedChemExpress: HY-W012575 | 2,4-Dihydroxybenzoic acid | 1099.538 |
| MedChemExpress: HY-N0549 | (−)-α-Pinene | 1066.876 | MedChemExpress: HY-B0704 | Azelaic acid | 796.7244 |
| MedChemExpress: HY-N1507 | Tracheloside | 940.7065 | MedChemExpress: HY-N0170 | Indole-3-carbinol | 1082.489 |
| MedChemExpress: HY-113098 | 2-Oxovaleric acid | 860.4923 | MedChemExpress: HY-10448 | Capsaicin | 873.6777 |
| MedChemExpress: HY-107207 | Kaempferol 3-neohesperidoside | 1019.446 | MedChemExpress: HY-W010155 | Tryptophol | 874.5122 |
| MedChemExpress: HY-100580 | Asaraldehyde | 982.6997 | MedChemExpress: HY-W012382 | N-Acetyl-L-tyrosine | 964.6192 |
| MedChemExpress: HY-N2232 | N-Feruloyloctopamine | 893.4142 | MedChemExpress: HY-101409 | O-Acetylserine | 979.2127 |
| MedChemExpress: HY-112790 | Adenosylcobalamin | 817.3471 | MedChemExpress: HY-113315 | 3b-Hydroxy-5-cholenoic acid | 800.217 |
| MedChemExpress: HY-N1425 | Tiliroside | 935.6565 | MedChemExpress: HY-111914A | Ferroheme | 787.0749 |
| MedChemExpress: HY-W001909 | Myosmine | 909.737 | MedChemExpress: HY-113253A | N8-Acetylspermidine dihydrochloride | 781.9265 |
| MedChemExpress: HY-W015326 | 3-Hydroxymandelic Acid | 1154.326 | MedChemExpress: HY-113099 | Indolelactic acid | 641.0066 |
| MedChemExpress: HY-W015560 | 3,5-Dihydroxybenzoic acid | 877.2004 1014.5 | MedChemExpress: HY-N6952 | Geraniol | 774.1061 819.09 |
| MedChemExpress: HY-N0043 | Ginsenoside Rd | 571020.7 | MedChemExpress: HY-113295 | Salicyluric acid | 071064.5 |
| MedChemExpress: HY-N7632 | 5-Desmethylsinensetin | 4932.71 | MedChemExpress: HY-101988 | Prostaglandin D2 | 51779.58 |
| MedChemExpress: HY-N1414 | (E)-3',6-Disinapoylsucrose | 921072.7 | MedChemExpress: HY-113004 | 3-Hydroxyvaleric acid | 49949.15 |
| MedChemExpress: HY-N0439 | Asiaticoside | 71863.70 | MedChemExpress: HY-111806 | 3,7,4'-Trihydroxyflavone | 12749.34 |
| MedChemExpress: HY-W015820 | Phthalide | 23844.01 | MedChemExpress: HY-B0152 | Adenine | 66945.52 |
| MedChemExpress: HY-66004 | 4-Acetamidophenyl acetate | 51703.24 | MedChemExpress: HY-Y0946 | Acetamide | 051281.5 |
| MedChemExpress: HY-112103 | 6-(γ,γ-Dimethylallylamino)purine | 34 | MedChemExpress: HY-W012814 | 4-Methylcatechol | 79 |
| MedChemExpress: HY-B0220 | Erythromycin | 738.7764 | MedChemExpress: HY-W040141 | L-Arabinitol | 867.2111 |
| MedChemExpress: HY-N1481 | Methyl linoleate | 1007.907 | MedChemExpress: HY-W011683 | 2'-Deoxyadenosine monohydrate | 945.7798 |
| MedChemExpress: HY-17510 | Gossypol (acetic acid) | 1068.352 | MedChemExpress: HY-112175 | N-Acetylhistamine | 713.7829 |
| MedChemExpress: HY-77995 | 2-Methoxybenzaldehyde | 1092.329 | MedChemExpress: HY-N7057 | Nonanoic acid | 1195.086 |
| MedChemExpress: HY-N0053 | Psoralen | 835.4611 | MedChemExpress: HY-17552 | sn-Glycero-3-phosphocholine | 1145.818 |
| MedChemExpress: HY-N6947 | Lutein | 956.7385 | MedChemExpress: HY-W012499 | N-Acetyl-L-methionine | 1152.339 |
| MedChemExpress: HY-N0230 | β-Alanine | 1205.931 | MedChemExpress: HY-B1000A | L-SelenoMethionine | 868.52 |
| MedChemExpress: HY-N6253 | Pinoresinol | 1253.681 | MedChemExpress: HY-W012722 | 4-Methyl-2-oxopentanoic acid | 1250.711 |
| MedChemExpress: HY-N0649 | Narcissin | 984.9958 | MedChemExpress: HY-17556 | Folinic acid | 949.4803 |
| MedChemExpress: HY-113381 | 2-Hydroxybutyric acid | 782.3064 | MedChemExpress: HY-122942 | Moracin M | 1014.515 |
| MedChemExpress: HY-N0178 | Diosmin | 855.1156 | MedChemExpress: HY-A0181 | Adenosine monophosphate | 1065.218 |
| MedChemExpress: HY-B0055 | Azulene | 921.6906 | MedChemExpress: HY-Y0418 | Dulcite | 1020.567 |
| MedChemExpress: HY-N0063 | Punicalagin | 646.9241 | MedChemExpress: HY-113529 | Stachyose (tetrahydrate) | 648.6527 |
| MedChemExpress: HY-N0615 | Notoginsenoside R1 | 899.6021 | MedChemExpress: HY-N2071 | Cedrol | 840.0929 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
| --- | --- | --- | --- | --- | --- |
| MedChemExpress: HY-N2038 | 3,5,6,7,8,3',4'-Heptemthoxyflavone | 779.4168 | MedChemExpress: HY-113357 | m-Coumaric acid | 1376.759 |
| MedChemExpress: HY-N0769 | Isopimpinellin | 768.9132 | MedChemExpress: HY-77490A | 1,3-Butanediol | 890.8559 |
| MedChemExpress: HY-B1024 | DL-Panthenol | 1054.902 | MedChemExpress: HY-108943 | Sabinene | 770.6129 |
| MedChemExpress: HY-N4100 | Trilobatin | 1211.862 | MedChemExpress: HY-Y1809 | 1-Hydroxyoctadecane | 970.6325 |
| MedChemExpress: HY-N1950 | Hispidulin | 914.8964 | MedChemExpress: HY-129630 | Tetrahydrocortisol | 1127.321 |
| MedChemExpress: HY-N2325 | D-(+)-Cellobiose | 821.3157 | MedChemExpress: HY-129440 | N-(p-Coumaroyl) Serotonin | 829.8155 |
| MedChemExpress: HY-N2007 | Veratric acid | 944.3491 | MedChemExpress: HY-N0322 | Cholesterol | 888.5135 |
| MedChemExpress: HY-N4296 | Isosakuranin | 864.5248 | MedChemExpress: HY-N0681 | D-Pantothenic acid (hemicalcium salt) | 1142.509 |
| MedChemExpress: HY-W011209 | N6-Isopentenyladenosine | 693.6322 | MedChemExpress: HY-18085 | Quercetin | 1267.188 |
| MedChemExpress: HY-B2188 | S-Methyl-L-cysteine | 1147.173 | MedChemExpress: HY-14595 | Biochanin A | 955.1221 |
| MedChemExpress: HY-N1957 | Gamma-Mangostin | 1083.745 | MedChemExpress: HY-W047187 | Lavandoside | 896.9108 |
| MedChemExpress: HY-N6070A | Ricinoleic acid (purity ≥99%) | 811.6074 | MedChemExpress: HY-W007355 | Skatole | 599.6554 |
| MedChemExpress: HY-N1420 | Rhamnose | 1253.305 | MedChemExpress: HY-W012531 | 2-Hydroxycinnamic acid | 1034.319 |
| MedChemExpress: HY-N2258 | Poncirin | 825.1983 | MedChemExpress: HY-113068 | (rel)-β-Tocopherol | 1146.301 |
| MedChemExpress: HY-N3244 | Moracin O | 899.9132 | MedChemExpress: HY-W010435 | Sulcatone | 1082.02 |
| MedChemExpress: HY-N0284 | Esculetin | 1195.727 | MedChemExpress: HY-B1306 | 4-Aminohippuric acid | 1022.001 |
| MedChemExpress: HY-N2073 | Ethyl linolenate | 965.6033 | MedChemExpress: HY-W011404 | Tributyrin | 977.9217 |
| MedChemExpress: HY-N0540 | Cynaroside | 1111.46 | MedChemExpress: HY-113414 | Deoxycorticosterone | 992.8813 |
| MedChemExpress: HY-N1475 | Nicotiflorin | 810.1075 | MedChemExpress: HY-W019940 | 2-Methoxy-4-vinylphenol | 1118.577 |
| MedChemExpress: HY-N2547 | Steviolbioside | 1061.907 | MedChemExpress: HY-135072 | N,N',N''-Triacetylchitotriose | 1143.03 |
| MedChemExpress: HY-N1549 | Prunin | 943.8763 | MedChemExpress: HY-18569 | 3-Indoleacetic acid | 655.6328 |
| MedChemExpress: HY-N2465 | Methylsticin | 1261.171 | MedChemExpress: HY-104026 | L-Kynurenine | 761.0277 |
| MedChemExpress: HY-N5083 | Saponarin | 1114.078 | MedChemExpress: HY-W014125 | Undecanedioic acid | 918.4481 |
| MedChemExpress: HY-N0484 | Liensinine | 913.5826 | MedChemExpress: HY-P1067 | Enterostatin(human, mouse,rat) | 691.9199 |
| MedChemExpress: HY-W040193 | 1,2-Distearoyl-sn-glycero-3-phosphorylcholine | 996.7364 | MedChemExpress: HY-B0228 | Adenosine | 1059.232 |
| MedChemExpress: HY-B0923 | Danthron | 1143.413 | MedChemExpress: HY-128743 | 12-Hydroxydodecanoic acid | 778.3097 |
| MedChemExpress: HY-N4151 | Chrysophanein | 930.3874 | MedChemExpress: HY-75247 | Coumaran | 980.2989 |
| MedChemExpress: HY-N2068 | Didymin | 1064.164 | MedChemExpress: HY-N0060A | Ferulic acid (sodium) | 976.1221 |
| MedChemExpress: HY-N1447 | Ganoderic acid A | 685.8921 | MedChemExpress: HY-B0332 | Menadione | 952.3854 |
| MedChemExpress: HY-N1426 | Raspberry ketone | 976.3098 | MedChemExpress: HY-110399 | Cirsiliol | 1223.564 |
| MedChemExpress: HY-111832 | 1,2,3,6-Tetragalloylglucose | 907.5615 | MedChemExpress: HY-128447 | Allyl methyl sulfide | 1073.618 |
| MedChemExpress: HY-N3847 | Eriodictyol-7-O-glucoside | 982.3042 | MedChemExpress: HY-Y0172 | Butylated hydroxytoluene | 941.2951 |
| MedChemExpress: HY-A0167 | Gadopentetate (dimeglumine) | 908.3801 | MedChemExpress: HY-B2130A | Uric acid (sodium) | 855.3809 |
| MedChemExpress: HY-42937 | Transcrocetin meglumine salt | 689.6296 | MedChemExpress: HY-75954 | 2-Hydroxyhexanoic acid | 1119.554 |
| MedChemExpress: HY-N0929 | Hexahydrocurcumin | 885.5407 | MedChemExpress: HY-B1411 | i-Inositol | 1128.491 |
| MedChemExpress: HY-N0362 | Columbianadin | 1110.248 | MedChemExpress: HY-Y0366 | Lauric acid | 872.9332 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N6051 | (−)-Maackiain | 983.6284 | MedChemExpress: HY-113308A | Taurolithocholic acid (sodium salt) | 708.6926 |
| MedChemExpress: HY-N6771 | Cyclopiazonic acid | 1001.954 | MedChemExpress: HY-B1776 | Spermidine | 640.2934 |
| MedChemExpress: HY-N7128 | Flavanone | 938.5485 | MedChemExpress: HY-W012956 | 2-Acetylpyrrole | 566.1925 |
| MedChemExpress: HY-N0342 | Scopoletin | 824.4533 | MedChemExpress: HY-101406 | Thyroxine sulfate | 954.5159 |
| MedChemExpress: HY-B0522A | Ampicillin (sodium) | 844.0223 | MedChemExpress: HY-B1618 | Corticosterone | 830.884 |
| MedChemExpress: HY-N0936 | Coixol | 932.1251 | MedChemExpress: HY-113100 | N-Acetylputrescine hydrochloride | 992.3874 |
| MedChemExpress: HY-N2821 | (+)-Afzelechin | 1063.84 | MedChemExpress: HY-W040329 | 2′-Deoxyadenosine | 1045.051 |
| MedChemExpress: HY-W015969 | 1-Aminopropan-2-ol | 806.2549 | MedChemExpress: HY-W010066 | 4-(1,2-Dihydroxyethyl)benzene-1,2-diol | 1092.3 |
| MedChemExpress: HY-B0941 | 6-Benzylaminopurine | 921.693 | MedChemExpress: HY-N0351 | p-Coumaric acid | 834.0169 |
| MedChemExpress: HY-N8193 | Brassicin | 1089.017 | MedChemExpress: HY-N4290 | 3-Epioleanolic acid | 1064.911 |
| MedChemExpress: HY-N2435 | [8]-Shogaol | 933.5956 | MedChemExpress: HY-17389 | Genipin | 825.627 |
| MedChemExpress: HY-113159 | Docosapentaenoic acid (22n-3) | 931.501 | MedChemExpress: HY-126410 | Petunidin (chloride) | 1018.887 |
| MedChemExpress: HY-113262 | 8-Hydroxyguanosine | 1197.388 | MedChemExpress: HY-B2012 | Flusilazole | 827.044 |
| MedChemExpress: HY-A0122 | Plicamycin | 972.1661 | MedChemExpress: HY-W019670 | N4-Acetylcytidine | 931.34 |
| MedChemExpress: HY-N0712 | Typhaneoside | 1108.454 | MedChemExpress: HY-W013035 | 3-Methyl-2-buten-1-ol | 835.6739 |
| MedChemExpress: HY-N0548 | α-Angelica lactone | 1137.248 | MedChemExpress: HY-B2156 | Menaquinone-4 | 987.2266 |
| MedChemExpress: HY-W017613 | (Ethoxymethyl)benzene | 1086.51 | MedChemExpress: HY-W010381 | 2-Methylsuccinic acid | 708.5042 |
| MedChemExpress: HY-N0297 | Sinensetin | 799.3118 | MedChemExpress: HY-113126 | 3-Hydroxyisobutyric acid | 735.5649 |
| MedChemExpress: HY-N0216 | Benzoic acid | 946.6732 | MedChemExpress: HY-N7645 | Prunetrin | 979.5191 |
| MedChemExpress: HY-15097 | Myricetin | 222.8862 | MedChemExpress: HY-77956 | Thyminose | 811.3551 |
| MedChemExpress: HY-N0671 | Rhapontin | 1196.44 | MedChemExpress: HY-W004066 | Ac-Ala-OH | 1189.332 |
| MedChemExpress: HY-B0399 | L-Carnitine | 918.6734 | MedChemExpress: HY-B0519 | Tylosin (tartrate) | 942.0391 |
| MedChemExpress: HY-N2010 | Methyl gallate | 806.2028 | MedChemExpress: HY-N5060 | Estragole | 832.8206 |
| MedChemExpress: HY-N1067 | Xanthohumol | 903.5789 | MedChemExpress: HY-113404 | DL-Dopa | 819.29 |
| MedChemExpress: HY-N1369 | Menthol | 792.1836 | MedChemExpress: HY-15494 | Picropodophyllin | 1107.68 |
| MedChemExpress: HY-122778 | δ-Tocotrienol | 1061.05 | MedChemExpress: HY-113328 | Aminoadipic acid | 1118.253 |
| MedChemExpress: HY-N0070 | Solasonine | 758.2452 | MedChemExpress: HY-113080 | N-Acetylornithine | 1010.663 |
| MedChemExpress: HY-N0060B | (E)-Ferulic acid | 789.2386 | MedChemExpress: HY-W017511 | 5,6-Dimethyl-1H-benzo[d]imidazole | 887.4746 |
| MedChemExpress: HY-N0077 | Ginkgolic Acid | 924.5734 | MedChemExpress: HY-B2167 | Docosahexaenoic acid | 837.8923 |
| MedChemExpress: HY-14589 | Chrysin | 627.2626 | MedChemExpress: HY-W010697 | Cholesteryl linoleate | 922.3562 |
| MedChemExpress: HY-N4119 | Neoeriocitrin | 1015.344 | MedChemExpress: HY-B0141 | Estradiol | 1017.364 |
| MedChemExpress: HY-W014504 | 2-Amino-4-(2-aminophenyl)-4-oxobutanoic acid | 1061.789 | MedChemExpress: HY-B2223 | Thiamine nitrate | 1092.499 |
| MedChemExpress: HY-N1510 | Kaempferol 3-O-gentiobioside | 1150.858 | MedChemExpress: HY-N1387 | 4-Methoxycinnamic acid | 913.6569 |
| MedChemExpress: HY-Y0055 | Phenothiazine | 725.1361 | MedChemExpress: HY-N0593A | Deoxycholic acid sodium salt | 1024.147 |
| MedChemExpress: HY-N4126 | 6-Demethoxytangeretin | 818.2248 | MedChemExpress: HY-B1465 | 1-Hexadecanol | 753.7353 |
| MedChemExpress: HY-W087943 | Methyl octanoate | 833.0134 | MedChemExpress: HY-127170 | 3-Hydroxycoumarin | 989.6323 |

TABLE 6-continued

Screened Compounds from the Food-Sourced Compound Library for lipase inhibition activity on stored human milk samples.

Food-Sourced Compound Library

| Library Code | Compound | Lipase (RFU) | Library Code | Compound | Lipase (RFU) |
|---|---|---|---|---|---|
| MedChemExpress: HY-107824 | D-Melibiose | 747.8737 | MedChemExpress: HY-N0437 | Progesterone | 888.409 |
| MedChemExpress: HY-N2375 | L-Quebrachitol | 1100.612 | MedChemExpress: HY-126114 | Lupeol acetate | 966.2407 |
| MedChemExpress: HY-N0626A | Potassium sorbate | 1055.671 | MedChemExpress: HY-B1811 | Vasopressin | 1150.397 |
| MedChemExpress: HY-N1677 | 2,6-Dimethoxy-1,4-benzoquinone | 934.6959 | MedChemExpress: HY-W015309 | Decanoic acid | 1088.24 |
| MedChemExpress: HY-B1173 | (+)-Camphor | 771.7121 | MedChemExpress: HY-N3544 | Caryophyllene oxide | 923.1149 |
| MedChemExpress: HY-N4314 | Scutellarein tetramethyl ether | 810.1721 | MedChemExpress: HY-B2194 | γ-Oryzanol | 1128.852 |
| MedChemExpress: HY-N6940 | Prosapogenin A | 965.3667 | MedChemExpress: HY-B1745 | Pyridoxylamine | 896.0428 |
| MedChemExpress: HY-N8305 | Gentianose | 1100.387 | MedChemExpress: HY-B1328 | Pyridoxine | 903.6468 |
| MedChemExpress: HY-16558 | Butein | 908.8653 | MedChemExpress: HY-17411 | Limonin | 893.2798 |
| MedChemExpress: HY-N7098 | Dihydrojasmone | 884.3631 | MedChemExpress: HY-N0733 | Glucosamine (hydrochloride) | 924.114 |
| MedChemExpress: HY-N0264 | Ligustrazine | 861.558 | MedChemExpress: HY-W051723 | (R)-3-Hydroxybutanoic acid | 979.6895 |
| MedChemExpress: HY-N0142 | Phloretin | 971.4055 | MedChemExpress: HY-107198 | (2S)-6-Prenylnaringenin | 749.9366 |
| MedChemExpress: HY-N0308 | Octyl acetate | 871.0555 | MedChemExpress: HY-W001179 | 2,5-Dihydroxybenzoic acid | 903.7525 |
| MedChemExpress: HY-135190 | (−)-Cedrene | 843.2764 | MedChemExpress: HY-B0075 | Melatonin | 1003.97 |
| MedChemExpress: HY-10201 | Sorafenib | 1102.67 | MedChemExpress: HY-N8015 | Octanal | 1107.101 |
| MedChemExpress: HY-N6022 | Byakangelicin | 1102.372 | MedChemExpress: HY-W010594 | Tetrahydrothiophen-3-one | 1226.937 |
| MedChemExpress: HY-N5038 | Mauritianin | 860.4015 | MedChemExpress: HY-B1178 | Cotinine | 1149.788 |
| MedChemExpress: HY-13605A | Cytarabine (hydrochloride) | 955.4107 | MedChemExpress: HY-D0184 | 2'-Deoxycytidine | 905.6198 |
| MedChemExpress: HY-N0361 | Dihydrocapsaicin | 1011.634 | MedChemExpress: HY-B0896 | Triacetin | 1200.566 |
| MedChemExpress: HY-N2566 | Euscaphic acid | 1043.164 | MedChemExpress: HY-113362 | Petroselinic acid | 886.6723 |
| MedChemExpress: HY-N2070 | Acevaltrate | 1018.164 | MedChemExpress: HY-B0143 | Niacin | 1042.332 |
| MedChemExpress: HY-118093 | N-benzoyl-L-aspartic acid | 825.8968 | MedChemExpress: HY-113342 | 7-Ketocholesterol | 1145.06 |
| MedChemExpress: HY-Y0790 | Cuminaldehyde | 940.2204 | MedChemExpress: HY-102015 | 6-Biopterin | 1286.983 |
| MedChemExpress: HY-N9397 | Quercetin 3-O-(6'-O-malonyl)-β-D-glucoside | 862.2573 | MedChemExpress: HY-D0837 | Imidazole | 968.1662 |
| MedChemExpress: HY-N0848 | Epibrassinolide | 830.2794 | MedChemExpress: HY-128454 | Dimethyl trisulfide | 766.709 |
| MedChemExpress: HY-N3029 | Noreugenin | 1008.555 | MedChemExpress: HY-B1419 | Salicyl alcohol | 1103.211 |
| MedChemExpress: HY-41461 | 5-Amino-3H-imidazole-4-Carboxamide | 1029.817 | MedChemExpress: HY-W012653 | 4'-Methylacetophenone | 942.4466 |
| MedChemExpress: HY-N2040 | (20R)-Protopanaxadiol | 1067.282 | MedChemExpress: HY-15762 | Valdecoxib | 908.3431 |
| MedChemExpress: HY-13605 | Cytarabine | 865.755 | MedChemExpress: HY-Y0740 | 4-Methoxybenzaldehyde | 982.7865 |
| MedChemExpress: HY-B0542 | Ouabain (Octahydrate) | 901.7077 | MedChemExpress: HY-B1671 | (+)-Kavain | 895.974 |
| MedChemExpress: HY-N3460 | Isorhoifolin | 895.5364 | MedChemExpress: HY-W012846 | D-Threitol | 1239.099 |
| MedChemExpress: HY-N0747 | Oxypeucedanin | 1002.808 | MedChemExpress: HY-B0456 | Riboflavin | 1068.403 |
| MedChemExpress: HY-N0364 | Falcarindiol | 827.8455 | MedChemExpress: HY-N2526 | Nervonic acid | 1038.139 |
| MedChemExpress: HY-113047 | 5,6-Dihydrouridine | 814.3906 | MedChemExpress: HY-B0430 | D-Pantothenic acid | 1167.67 |
| MedChemExpress: HY-B0225B | Methyldopa (hydrate) | 593.4552 | MedChemExpress: HY-40161 | Indole-3-carboxylic acid | 1280.98 |
| MedChemExpress: HY-N0637 | Eriodictyol | 1083.012 | MedChemExpress: HY-N5142 | α-Terpineol | 979.4019 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-103252 | Monomethyl fumarate | 956.5258 | MedChemExpress: HY-107832 | Ketoisophorone | 1086.358 |
| MedChemExpress: HY-N2344 | Procyanidin A1 | 1206.886 | MedChemExpress: HY-79334 | (S)-(+)-1,2-Propanediol | 1392.598 |
| MedChemExpress: HY-N2057 | Steviol | 947.4845 | MedChemExpress: HY-Y1781 | 1,4-Diaminobutane (dihydrochloride) | 865.534 |
| MedChemExpress: HY-B0167A | Sodium Salicylate | 820.8026 | MedChemExpress: HY-12956 | Dinoprost | 941.406 |
| MedChemExpress: HY-113252 | 2-Methoxyestrone | 970.0321 | MedChemExpress: HY-128378 | 16-Dehydroprogesterone | 1000.658 |
| MedChemExpress: HY-33351 | Eugenin | 718.1053 | MedChemExpress: HY-133860 | Chrysoobtusin | 794.9062 |
| MedChemExpress: HY-113274A | Pi-Methylimidazoleacetic acid (hydrochloride) | 851.1978 | MedChemExpress: HY-N0097 | Guanosine | 1074.246 |
| MedChemExpress: HY-N0616 | Trifolirhizin | 1131.275 | MedChemExpress: HY-B1804 | Tricaprilin | 1005.715 |
| MedChemExpress: HY-N4113 | Glycycoumarin | 840.3785 | MedChemExpress: HY-W053787 | 1-Methylhistamine (dihydrochloride) | 793.5717 |
| MedChemExpress: HY-N6038 | Gartanin | 880.9887 | MedChemExpress: HY-I0960 | Uracil | 1012.242 |
| MedChemExpress: HY-113416 | Dehydroepiandrosterone sulfate | 1079.305 | MedChemExpress: HY-113137 | N2,N2-Dimethylguanosine | 984.7947 |
| MedChemExpress: HY-113094 | Paullinic acid | 1192.519 | MedChemExpress: HY-W050026 | Phenylacetylglutamine | 993.2227 |
| MedChemExpress: HY-N0244 | Theaflavin-3'-gallate | 780.4384 | MedChemExpress: HY-W012241 | Dodecanedioic acid | 1033.631 |
| MedChemExpress: HY-N0708 | Vanillic acid | 1079.136 | MedChemExpress: HY-101036 | Choline (bitartrate) | 1046.984 |
| MedChemExpress: HY-N2999 | Ganoderic acid I | 969.9191 | MedChemExpress: HY-30152 | Xanthotoxol | 1117.591 |
| MedChemExpress: HY-21088 | 3-Amino-2-piperidinone | 957.2779 | MedChemExpress: HY-N2406 | Dihydrocaffeic acid | 986.8459 |
| MedChemExpress: HY-59125 | (R,R)-(+)-Hydrobenzoin | 1248.549 | MedChemExpress: HY-113232 | 3-Methylcrotonylglycine | 876.7208 |
| MedChemExpress: HY-N0785 | Ginkgolide C | 1234.872 | MedChemExpress: HY-B0166 | L-Ascorbic acid | 853.946 |
| MedChemExpress: HY-Y0678 | 1,3,5-Trimethoxybenzene | 856.4568 | MedChemExpress: HY-W017158 | Melilotic acid | 726.9906 |
| MedChemExpress: HY-15337 | Hesperidin | 766.088 | MedChemExpress: HY-W014410 | Mucic acid | 735.2726 |
| MedChemExpress: HY-N0828 | Pterostilbene | 842.2443 | MedChemExpress: HY-113121 | Vanillylmandelic acid | 1046.012 |
| MedChemExpress: HY-N8377 | Capsiate | 1078.823 | MedChemExpress: HY-N6979 | Crustecdysone | 968.6821 |
| MedChemExpress: HY-10529 | Betulinic acid | 900.2831 | MedChemExpress: HY-W016498 | Paraxanthine | 922.4198 |
| MedChemExpress: HY-107284 | Officinalisinin I | 937.9671 | MedChemExpress: HY-113261 | Oleoylcarnitine | 870.8673 |
| MedChemExpress: HY-N2160 | 6'''-Feruloylspinosin | 1032.366 | MedChemExpress: HY-77817 | Pyrrole-2-carboxaldehyde | 882.4774 |
| MedChemExpress: HY-W017316 | Terpinen-4-ol | 1005.461 | MedChemExpress: HY-33212 | D-N-Acetylgalactosamine | 878.6816 |
| MedChemExpress: HY-N5011 | 5,7-Dimethoxyflavone | 726.3093 | MedChemExpress: HY-113303 | FAPy-adenine | 1007.987 |
| MedChemExpress: HY-Y0543 | 5-Methylfurfural | 761.8702 | MedChemExpress: HY-75625 | 2-Hydroxy-4-methoxybenzoic acid | 1079.882 |
| MedChemExpress: HY-N1438 | Hydroxygenkwanin | 874.9866 | MedChemExpress: HY-W012530 | Phenylpyruvic acid | 1069.476 |
| MedChemExpress: HY-107324 | β-Elemene | 1099.979 | MedChemExpress: HY-N0565B | Doxycycline (hyclate) | 757.6717 |
| MedChemExpress: HY-N1127 | Tricin | 691.2218 | MedChemExpress: HY-N0770 | Isoliensinine | 931.4037 |
| MedChemExpress: HY-101981 | Uridine 5'-monophosphate | 909.2349 | MedChemExpress: HY-17461 | Cortisone | 1233.864 |
| MedChemExpress: HY-W032013 | 1-Octanol | 882.5398 | MedChemExpress: HY-Y0202 | Pyrocatechuic acid | 896.9439 |
| MedChemExpress: HY-N0373 | Licochalcone B | 567.6775 | MedChemExpress: HY-N8469 | cis-5-Dodecenoic acid | 1164.987 |
| MedChemExpress: HY-I0400 | N-Acetylneuraminic acid | 885.1668 | MedChemExpress: HY-N0709 | Coumarin | 764.4235 |
| MedChemExpress: HY-113085 | 3-Hydroxyhippuric acid | 1051.773 | MedChemExpress: HY-113340 | 2-Furoylglycine | 1120.063 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N9334 | Tetrahydroxymethoxychalcone | 977.7534 | MedChemExpress: HY-W018197 | 2-Phenylacetamide | 955.8815 |
| MedChemExpress: HY-N6937 | (R,R)-Secoisolariciresinol diglucoside | 753.2228 | MedChemExpress: HY-B1812 | 1,2-Dimethoxybenzene | 752.9866 |
| MedChemExpress: HY-134452 | MeAIB | 1061.964 | MedChemExpress: HY-122524 | 7-Methylguanosine | 974.6149 |
| MedChemExpress: HY-N0054 | Osthole | 882.1912 | MedChemExpress: HY-D0185 | 2'-Deoxyguanosine monohydrate | 782.4513 |
| MedChemExpress: HY-B0334 | Sulbactam | 759.2536 | MedChemExpress: HY-N0091 | Hypoxanthine | 873.1255 |
| MedChemExpress: HY-129380A | Fructosyl-lysine (dihydrochloride) | 896.0522 | MedChemExpress: HY-N0573 | Umbelliferone | 953.7167 |
| MedChemExpress: HY-N1214 | Squalene | 649.3812 | MedChemExpress: HY-101884 | Biocytin | 807.0879 |
| MedChemExpress: HY-111431A | p-Cresyl sulfate (potassium) | 825.569 | MedChemExpress: HY-17571A | Oxytocin (acetate) | 989.617 |
| MedChemExpress: HY-N6636 | Valencene | 980.1668 | MedChemExpress: HY-N2115 | Araloside A | 938.5227 |
| MedChemExpress: HY-B1934 | Methyl stearate | 703.0323 | MedChemExpress: HY-N0711 | Carvacrol | 1199.593 |
| MedChemExpress: HY-111024 | 2,2,5,7,8-Pentamethyl-6-Chromanol | 702.5358 | MedChemExpress: HY-B0152A | Adenine (hydrochloride) | 1024.914 |
| MedChemExpress: HY-N1039A | Manool | 923.6944 | MedChemExpress: HY-I0508 | Phthalic acid | 833.0888 |
| MedChemExpress: HY-N6247 | Fuscaxanthone C | 819.3619 | MedChemExpress: HY-W014993 | 1,3-Dimethyluric acid | 1032.608 |
| MedChemExpress: HY-N4137 | Tormentic acid | 1010.8 | MedChemExpress: HY-Y1426 | 2'-Hydroxyacetophenone | 996.0333 |
| MedChemExpress: HY-N2122 | Neoisoliquiritin | 789.3461 | MedChemExpress: HY-Y0248A | Farnesol | 943.3285 |
| MedChemExpress: HY-43470 | 3α, 12β-Dihydroxycholanoic acid | 1371.736 | MedChemExpress: HY-B0234 | Estrone | 1034.634 |
| MedChemExpress: HY-N4149 | Quercetagetin | 891.7095 | MedChemExpress: HY-B0167 | Salicylic acid | 913.3925 |
| MedChemExpress: HY-106353 | Smilagenin | 790.1194 | MedChemExpress: HY-Y0313 | p-Hydroxybenzaldehyde | 1153.175 |
| MedChemExpress: HY-B0334A | Sulbactam (sodium) | 1191.707 | MedChemExpress: HY-N7140 | Gamma-Linolenic acid | 1191.013 |
| MedChemExpress: HY-107825 | Flavonol | 970.3297 | MedChemExpress: HY-N7615 | Momordin IIc | 948.8059 |
| MedChemExpress: HY-30216 | (R)-Leucic acid | 843.5188 | MedChemExpress: HY-N7015 | Zerumbone | 1013.106 |
| MedChemExpress: HY-W011175 | Batilol | 925.7955 | MedChemExpress: HY-N0377 | Liquiritigenin | 960.588 |
| MedChemExpress: HY-N0143 | Phlorizin | 1023.253 | MedChemExpress: HY-N2144 | 7,4'-Di-O-methylapigenin | 1207.774 |
| MedChemExpress: HY-N0006 | Demethoxycurcumin | 1050.381 | MedChemExpress: HY-N0448 | 10-Gingerol | 817.7781 |
| MedChemExpress: HY-B0467B | Amoxicillin (trihydrate) | 799.9167 | MedChemExpress: HY-N0576 | Solanesol | 985.7418 |
| MedChemExpress: HY-N0055 | Chlorogenic acid | 1086.622 | MedChemExpress: HY-N0831 | Jaceosidin | 614.7008 |
| MedChemExpress: HY-113478 | 3β-Ursodeoxycholic acid | 1080.499 | MedChemExpress: HY-N2041 | Myristic acid | 651.4175 |
| MedChemExpress: HY-N6986 | Liquiritigenin-7-O-β-D-glucopyranosyl-(1→2)-β-D-apiofuranoside | 1016.093 | MedChemExpress: HY-101371 | Hesperin | 970.1921 |
| MedChemExpress: HY-N0655 | D-Pinitol | 870.9454 | MedChemExpress: HY-N2554 | Osthenol | 798.6222 |
| MedChemExpress: HY-N7636 | Persicogenin | 1028.526 | MedChemExpress: HY-W015806 | 3-Pyridineacetic acid | 1126.224 |
| MedChemExpress: HY-N1403 | Tigogenin | 941.2026 | MedChemExpress: HY-W012941 | 2-Thiophenecarboxaldehyde | 1123.269 |
| MedChemExpress: HY-W015882 | 4-Methylpentanoic acid | 1032.496 | MedChemExpress: HY-N1353 | Rhamnocitrin | 1081.157 |
| MedChemExpress: HY-113046 | 5-Methyltetrahydrofolic acid | 789.455 | MedChemExpress: HY-114464 | 11-Beta-hydroxyandrostenedione | 1190.299 |
| MedChemExpress: HY-111896 | 7-Methoxyrosmanol | 945.9196 | MedChemExpress: HY-B1695 | Methyl nicotinate | 773.2703 |

TABLE 6-continued

Screened Compounds from the Food-Sourced Compound Library for lipase inhibition activity on stored human milk samples.

Food-Sourced Compound Library

| Library Code | Compound | Lipase (RFU) | Library Code | Compound | Lipase (RFU) |
| --- | --- | --- | --- | --- | --- |
| MedChemExpress: HY-N4068 | Glucoraphanin | 983.9092 | MedChemExpress: HY-W007856 | 5-Methoxysalicylic acid | 1161.761 |
| MedChemExpress: HY-115684 | 2-Undecanol | 884.4571 | MedChemExpress: HY-124489 | 2-Hydroxyestradiol | 1214.209 |
| MedChemExpress: HY-W105272 | 2'-Deoxyadenosine 5'-monophosphate (disodium) | 809.6834 | MedChemExpress: HY-N0280 | Corosolic acid | 531.6244 |
| MedChemExpress: HY-N3057 | Pinostrobin chalcone | 969.4657 | MedChemExpress: HY-W017163 | 7-Methylxanthine | 1165.906 |
| MedChemExpress: HY-107738 | Guggulsterone | 543.7847 | MedChemExpress: HY-W028393 | Indole-3-pyruvic acid | 1137.343 |
| MedChemExpress: HY-14398 | Celecoxib | 1010.573 | MedChemExpress: HY-N0086 | N6-Methyladenosine | 942.3254 |
| MedChemExpress: HY-N2221 | Ganoderal A | 1025.687 | MedChemExpress: HY-N0173 | Cinchonidine | 926.9454 |
| MedChemExpress: HY-B0220D | Erythromycin (thiocyanate) | 755.418 | MedChemExpress: HY-N2533 | Cyanidin 3-sambubioside (chloride) | 1041.931 |
| MedChemExpress: HY-N4089 | Quercetin 3-gentiobioside | 676.8795 | MedChemExpress: HY-125556 | Tetragastrin | 846.343 |
| MedChemExpress: HY-N0188 | Esculin | 1207.652 | MedChemExpress: HY-W018512 | 7-Ketolithocholic acid | 991.8245 |
| MedChemExpress: HY-N0898 | Catechin | 945.7654 | MedChemExpress: HY-N0285 | Imperatorin | 869.597 |
| MedChemExpress: HY-N0793 | Protopine | 1075.914 | MedChemExpress: HY-Y0110 | 2-Naphthol | 889.3481 |
| MedChemExpress: HY-W011428 | Olomoucine | 856.9445 | MedChemExpress: HY-N6779 | Patulin | 1145.028 |
| MedChemExpress: HY-113474 | 3,4-Dihydroxymandelic acid | 1180.518 | MedChemExpress: HY-N0162 | Luteolin | 847.9918 |
| MedChemExpress: HY-N7271 | Solanidine | 983.7822 | MedChemExpress: HY-N2591 | Isocorydine | 1161.22 |
| MedChemExpress: HY-126562 | Piperlonguminine | 1257.297 | MedChemExpress: HY-N1415 | B-Caryophyllene | 1086.484 |
| MedChemExpress: HY-N2086 | Ethyl palmitate | 981.7069 | MedChemExpress: HY-W010382 | Oxaloacetic acid | 753.0147 |
| MedChemExpress: HY-W077292 | 2,4,6-Trihydroxybenzoic acid | 800.681 | MedChemExpress: HY-N2395 | Chrysophanol 8-O-glucoside | 988.4419 |
| MedChemExpress: HY-N0044 | Ginsenoside Re | 1153.114 | MedChemExpress: HY-W016482 | 3-(3-Methoxyphenyl)propionic acid | 811.0214 |
| MedChemExpress: HY-N6009 | 8-Deoxygartanin | 1168.142 | MedChemExpress: HY-17563 | 2'-Deoxyguanosine | 729.2303 |
| MedChemExpress: HY-N2020 | Anacardic Acid | 908.2535 | MedChemExpress: HY-121238 | Hyocholic Acid | 675.2244 |
| MedChemExpress: HY-N1981 | Triolein | 728.6705 | MedChemExpress: HY-N0767 | Isoorientin | 891.8217 |
| MedChemExpress: HY-N0038 | Alantolactone | 900.1725 | MedChemExpress: HY-N0449 | Nordihydrocapsaicin | 817.8614 |
| MedChemExpress: HY-N0441 | Neferine | 821.4853 | MedChemExpress: HY-N7387 | 3-Oxocholic acid | 734.9475 |
| MedChemExpress: HY-N6825 | Hydroxy-α-sanshool | 984.0163 | MedChemExpress: HY-N0509 | Astilbin | 974.9424 |
| MedChemExpress: HY-108496 | Sphingosine-1-phosphate | 948.7889 | MedChemExpress: HY-14616 | Shogaol | 1056.701 |
| MedChemExpress: HY-W008566 | Norharmane | 960.1337 | MedChemExpress: HY-N2004 | Isoborneol | 812.855 |
| MedChemExpress: HY-113341 | 7β-Hydroxycholesterol | 1051.894 | MedChemExpress: HY-N6818 | 5,7,4'-Trimethoxyflavone | 1124.995 |
| MedChemExpress: HY-N1458 | Isoschaftoside | 949.6414 | MedChemExpress: HY-N0196 | Baicalein | 972.118 |
| MedChemExpress: HY-B1205 | Atropine | 1104.016 | MedChemExpress: HY-B0504 | Creatinine | 860.4385 |
| MedChemExpress: HY-N6948 | Linalyl acetate | 717.2876 | MedChemExpress: HY-116374 | Glycolithocholic acid | 1103.978 |
| MedChemExpress: HY-N0799 | Protodioscin | 714.1871 | MedChemExpress: HY-N0545 | Taurocholic acid (sodium) | 748.8784 |
| MedChemExpress: HY-N0375 | 18α-Glycyrrhetinic acid | 794.4219 | MedChemExpress: HY-N0700 | alpha-Asarone | 956.156 |
| MedChemExpress: HY-108694 | γ-Tocotrienol | 703.9438 | MedChemExpress: HY-13067 | Tripterin | 952.6128 |
| MedChemExpress: HY-N1461 | Dihydrodaidzein | 682.5875 | MedChemExpress: HY-14654 | Aspirin | 931.313 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N0309 | Soyasaponin Ba | 874.6708 | MedChemExpress: HY-N0057 | 3,4-Dicaffeoylquinic acid | 721.4239 |
| MedChemExpress: HY-N7085 | Citropten | 740.4201 | MedChemExpress: HY-N7126 | Citronellal | 691.2023 |
| MedChemExpress: HY-W002587 | 4-Hydroxy-3-methylbenzoic acid | 1179.556 | MedChemExpress: HY-W011819 | Tetradecanedioic acid | 1153.654 |
| MedChemExpress: HY-N7628 | Cassiaside C | 979.0974 | MedChemExpress: HY-16637 | Folic acid | 859.4776 |
| MedChemExpress: HY-N0593 | Deoxycholic acid | 782.4231 | MedChemExpress: HY-N2454 | B-Elemonic acid | 761.1896 |
| MedChemExpress: HY-103447 | Zearalenone | 758.7174 | MedChemExpress: HY-N4072 | 6"-O-Acetylglycitin | 1051.963 |
| MedChemExpress: HY-B1157 | Trioxsalen | 1036.024 | MedChemExpress: HY-N1942 | 5-O-Demethylnobiletin | 860.071 |
| MedChemExpress: HY-128973 | Pyropheophorbide-a | 1205.079 | MedChemExpress: HY-N8573 | B-Phellandrene | 1123.484 |
| MedChemExpress: HY-Y1311 | Malic acid | 1119.405 | MedChemExpress: HY-W010450 | Thymine | 997.0221 |
| MedChemExpress: HY-N0777 | Isorhamnetin-3-O-glucoside | 973.8664 | MedChemExpress: HY-N0313 | Euphol | 1219.223 |
| MedChemExpress: HY-21075 | 3-Furanoic acid | 724.8014 | MedChemExpress: HY-W010040 | 4-Hydroxyphenylpyruvic acid | 1190.775 |
| MedChemExpress: HY-W009732 | Sinapinic acid | 1040.338 | MedChemExpress: HY-W017141 | 2-Isobutyl-3-methoxypyrazine | 784.3908 |
| MedChemExpress: HY-15449 | Kaempferide | 976.5709 | MedChemExpress: HY-78086 | m-Tolualdehyde | 859.0901 |
| MedChemExpress: HY-B0519A | Tylosin | 853.4211 | MedChemExpress: HY-Y0892 | 4-Hydroxybenzyl alcohol | 785.9167 |
| MedChemExpress: HY-N7058 | cis-Jasmone | 1015.76 | MedChemExpress: HY-W016009 | 2'-Deoxyadenosine-5'-monophosphate | 697.8236 |
| MedChemExpress: HY-N0207 | Patchouli alcohol | 953.9213 | MedChemExpress: HY-B0762 | Acetyl-L-carnitine (hydrochloride) | 1004.353 |
| MedChemExpress: HY-N2605 | Camelliaside B | 927.4235 | MedChemExpress: HY-Y0839 | Levulinic acid | 1004.211 |
| MedChemExpress: HY-W011474 | Geranylgeraniol | 879.184 | MedChemExpress: HY-N6856 | 4-Hydroxycoumarin | 929.4704 |
| MedChemExpress: HY-N2572 | Nepetin | 666.0077 | MedChemExpress: HY-12956A | Dinoprost (tromethamine salt) | 793.4099 |
| MedChemExpress: HY-N0124 | Dioscin | 921.9885 | MedChemExpress: HY-N2230 | N-p-trans-Coumaroyltyramine | 1082.731 |
| MedChemExpress: HY-N2488 | Demethylsuberosin | 917.5135 | MedChemExpress: HY-N3945 | Glaucine | 922.5844 |
| MedChemExpress: HY-B2230 | Hinokitiol | 824.3878 | MedChemExpress: HY-N0809 | Sesamolin | 1064.678 |
| MedChemExpress: HY-N0453 | Hypericin | 1074.188 | MedChemExpress: HY-N2110 | Phellopterin | 1020.742 |
| MedChemExpress: HY-N2014 | Verbenalin | 1051.385 | MedChemExpress: HY-N0021 | Verbascoside | 986.2671 |
| MedChemExpress: HY-W097899 | Vanillylamine | 862.9003 | MedChemExpress: HY-113493 | 4-Pyridoxic acid | 952.6793 |
| MedChemExpress: HY-17568 | Nonivamide | 1070.28 | MedChemExpress: HY-Y0335 | 1,3-Dihydroxyacetone | 895.0199 |
| MedChemExpress: HY-N0365 | Sennoside A | 1002.323 | MedChemExpress: HY-113524 | N-Acetyl-L-aspartic acid | 1401.955 |
| MedChemExpress: HY-W052144 | (±) Anabasine | 1022.058 | MedChemExpress: HY-N0298 | Stachydrine | 1061.585 |
| MedChemExpress: HY-N5082 | Homodihydrocapsaicin I | 809.0763 | MedChemExpress: HY-N6810 | Thymol | 943.6199 |
| MedChemExpress: HY-N6010 | 8-Hydroxybergapten | 800.3718 | MedChemExpress: HY-N1312 | Sinapaldehyde | 948.4265 |
| MedChemExpress: HY-N0015 | Astragalin | 939.0582 | MedChemExpress: HY-41324 | 7-keto-Deoxycholic acid | 890.8412 |
| MedChemExpress: HY-N0243 | Theaflavin | 942.727 | MedChemExpress: HY-W015342 | Methyl anisate | 911.2014 |
| MedChemExpress: HY-N6929 | Angelic acid | 797.217 | MedChemExpress: HY-Y0293 | L-Tartaric acid | 844.2003 |
| MedChemExpress: HY-N6954 | Garcinone C | 921.9256 | MedChemExpress: HY-N2362 | DL-Alanine | 1113.829 |
| MedChemExpress: HY-N0892 | AKBA | 1066.269 | MedChemExpress: HY-W040790 | 2,6-Dimethylpyrazine | 1041.613 |
| MedChemExpress: HY-W041489 | Chelidonic acid | 1086.871 | MedChemExpress: HY-W007539 | 2,4-Dihydroxybenzaldehyde | 757.6099 |
| MedChemExpress: HY-30215 | (S)-Leucic acid | 837.4815 | MedChemExpress: HY-W015913 | Sodium 2-oxopropanoate | 1018.546 |

TABLE 6-continued

Screened Compounds from the Food-Sourced Compound Library for lipase inhibition activity on stored human milk samples.

Food-Sourced Compound Library

| Library Code | Compound | Lipase (RFU) | Library Code | Compound | Lipase (RFU) |
|---|---|---|---|---|---|
| MedChemExpress: HY-Y1787 | Dimethyl malonate | 779.5785 | MedChemExpress: HY-N0626 | Sorbic acid | 1006.66 |
| MedChemExpress: HY-N0306 | Hederasaponin B | 619.4985 | MedChemExpress: HY-B0935 | Benzyl benzoate | 1033.663 |
| MedChemExpress: HY-N0919 | Yangonin | 1087.76 | MedChemExpress: HY-77839 | Cortodoxone | 986.4276 |
| MedChemExpress: HY-N0315 | Allicin | 932.7951 | MedChemExpress: HY-W015618 | 2',4'-Dimethylacetophenone | 1191.818 |
| MedChemExpress: HY-N6904 | Crocetin | 1212.833 | MedChemExpress: HY-W010255 | Phenylglyoxylic acid | 753.3091 |
| MedChemExpress: HY-N0553 | Gypenoside XVII | 1170.386 | MedChemExpress: HY-W012836 | 4-Ethylphenol | 812.3292 |
| MedChemExpress: HY-P0201 | Substance P | 965.5158 | MedChemExpress: HY-W005241 | 5-Hydroxymethyl-2-furancarboxylic acid | 797.6396 |
| MedChemExpress: HY-N5124 | Meloside A | 811.3753 | MedChemExpress: HY-19696B | Tauroursodeoxycholate (dihydrate) | 1204.528 |
| MedChemExpress: HY-N2815 | Ursolic acid acetate | 811.3971 | MedChemExpress: HY-N1150 | Thymidine | 1087.549 |
| MedChemExpress: HY-B0891 | 17α-Hydroxyprogesterone | 867.6703 | MedChemExpress: HY-113517 | Normetanephrine | 767.4796 |
| MedChemExpress: HY-W091784 | 3'-O-Methylguanosine | 1153.54 | MedChemExpress: HY-N1429 | Taurochenodeoxycholic acid (sodium) | 1047.423 |
| MedChemExpress: HY-W071746 | Linolelaidic acid | 831.2921 | MedChemExpress: HY-N0092 | Inosine | 1062.74 |
| MedChemExpress: HY-113016 | Elaidic acid | 1124.883 | MedChemExpress: HY-107512 | Kynurenic acid (sodium) | 1100.682 |
| MedChemExpress: HY-100560 | Abscisic acid | 1087.943 | MedChemExpress: HY-113130 | Eicosadienoic acid | 795.3404 |
| MedChemExpress: HY-107569 | Garcinol | 1302.854 | MedChemExpress: HY-117235 | Diallyl Trisulfide | 894.565 |
| MedChemExpress: HY-13425 | Deguelin | 955.3932 | MedChemExpress: HY-W015851 | (R)-3-Hydroxybutanoic acid (sodium) | 966.5744 |
| MedChemExpress: HY-N0155 | Nobiletin | 1006.281 | MedChemExpress: HY-N0036 | Costunolide | 733.2698 |
| MedChemExpress: HY-N0042 | Ginsenoside Rc | 931.8497 | MedChemExpress: HY-116934 | 5-Pentadecylresorcinol | 785.6552 |
| MedChemExpress: HY-W018758 | 1-Phenylpropane-1,2-dione | 1078.742 | MedChemExpress: HY-N0466 | Rebaudioside A | 1078.827 |
| MedChemExpress: HY-N2998 | Ganoderenic acid A | 908.5828 | MedChemExpress: HY-B2209B | Hydroxocobalamin (acetate) | 812.6703 |
| MedChemExpress: HY-N6845 | 3-Isomangostin | 1135.455 | MedChemExpress: HY-W001080 | 3,4-Dihydroxybenzeneacetic acid | 1407.378 |
| MedChemExpress: HY-N0632 | Esculentoside A | 755.0304 | MedChemExpress: HY-N0139 | Troxerutin | 1163.942 |
| MedChemExpress: HY-N3617 | Coniferin | 664.4172 | MedChemExpress: HY-N7032 | Uridine 5'-diphosphoglucose (disodium salt) | 956.5622 |
| MedChemExpress: HY-N0040 | Ginsenoside Rb2 | 872.7793 | MedChemExpress: HY-W010476 | 2,3,5-Trimethylpyrazine | 1182.955 |
| MedChemExpress: HY-W004288 | Methyl myristate | 820.1329 | MedChemExpress: HY-N7560 | Safranal | 1118.736 |
| MedChemExpress: HY-N0012 | Glycitin | 799.4163 | MedChemExpress: HY-B1008 | 4-Aminobenzoic acid | 1122.847 |
| MedChemExpress: HY-N0752 | Scutellarein | 915.5866 | MedChemExpress: HY-77173 | Demethoxyencecalin | 1050.951 |
| MedChemExpress: HY-N1181 | Tamarixetin | 1029.35 | MedChemExpress: HY-N0384 | Homovanillic acid | 934.4466 |
| MedChemExpress: HY-N0148A | Rutin (hydrate) | 907.5223 | MedChemExpress: HY-B1756 | Rotenone | 542.204 |
| MedChemExpress: HY-N0290 | Mangiferin | 1013.784 | MedChemExpress: HY-Y0442 | 2-Methylbenzaldehyde | 859.065 |
| MedChemExpress: HY-107854 | N-Acetyl-5-hydroxytryptamine | 1040.161 | MedChemExpress: HY-113161 | L-Octanoylcarnitine | 1071.191 |
| MedChemExpress: HY-N6807 | Elemicin | 1009.834 | MedChemExpress: HY-W011540 | 8-Hydroxy-2'-deoxyguanosine | 909.8926 |
| MedChemExpress: HY-107383 | Tetrahydrobiopterin | 1212.888 | MedChemExpress: HY-W008091 | 5-Methylcytosine | 1207.487 |
| MedChemExpress: HY-N0893 | Tetrahydrocurcumin | 1132.427 | MedChemExpress: HY-N0001 | (−)-Epicatechin | 927.1089 |
| MedChemExpress: HY-N7819 | Pristane | 951.6867 | MedChemExpress: HY-N7084 | Methyl dihydrojasmonate | 916.1332 |
| MedChemExpress: HY-N2224 | Guaijaverin | 1052.008 | MedChemExpress: HY-W012788 | Maltol | 1013.539 |
| MedChemExpress: HY-Y0739 | (1R)-α-Pinene | 933.6802 | MedChemExpress: HY-W012479 | H-D-Trp-OH | 1163.569 |

TABLE 6-continued

Screened Compounds from the Food-Sourced Compound Library for lipase inhibition activity on stored human milk samples.

Food-Sourced Compound Library

| Library Code | Compound | Lipase (RFU) | Library Code | Compound | Lipase (RFU) |
|---|---|---|---|---|---|
| MedChemExpress: HY-N2262 | 8-Geranyloxypsoralen | 922.8975 | MedChemExpress: HY-113353 | Nicotinuric acid | 1009.118 |
| MedChemExpress: HY-N6967 | Levomenol | 1094.539 | MedChemExpress: HY-75161 | (−)-Menthol | 1023.319 |
| MedChemExpress: HY-N4093 | Astringin | 1052.825 | MedChemExpress: HY-B0172 | Lithocholic acid | 922.1704 |
| MedChemExpress: HY-N6073 | Soyasapogenol A | 1098.785 | MedChemExpress: HY-B0511 | Biotin | 1070.542 |
| MedChemExpress: HY-N3026 | Soyasaponin Ab | 976.6301 | MedChemExpress: HY-N0523 | Gallic acid | 7096.454 |
| MedChemExpress: HY-N0605 | Ginsenoside Rh2 | 1009.972 | MedChemExpress: HY-110189 | Pregnenolone monosulfate (sodium) | 649.264 |
| MedChemExpress: HY-N2421 | Sequoyitol | 997.9244 | MedChemExpress: HY-N0636 | Eriocitrin | 1094.778 |
| MedChemExpress: HY-N6612 | D-Glucuronic acid | 949.8156 | MedChemExpress: HY-W000800 | cis,cis-Muconic acid | 988.7628 |
| MedChemExpress: HY-N3354 | Lupiwighteone | 1206.447 | MedChemExpress: HY-N0245 | Theaflavin-3-gallate | 1159.07 |
| MedChemExpress: HY-N2117 | Isoginkgetin | 123.0363 | MedChemExpress: HY-113320 | Etiocholanolone | 868.806 |
| MedChemExpress: HY-W012980 | Isovaleric acid | 970.7058 | MedChemExpress: HY-10448A | Capsaicinoid | 1112.777 |
| MedChemExpress: HY-W046906 | (E)-Oct-2-enoic acid | 900.5366 | MedChemExpress: HY-B2227 | Lactate | 970.5105 |
| MedChemExpress: HY-N1346 | Robinin | 959.7555 | MedChemExpress: HY-I0352 | Epiandrosterone | 760.9004 |
| MedChemExpress: HY-N0550 | β-Pinene | 851.1223 | MedChemExpress: HY-W007566 | 5-Methoxyindole-3-acetic acid | 1104.988 |
| MedChemExpress: HY-N0148 | Rutin | 932.6246 | MedChemExpress: HY-W008449 | 1-Methylxanthine | 907.9205 |
| MedChemExpress: HY-W004283 | Pentadecanoic acid | 941.0256 | MedChemExpress: HY-W015495 | L-Dihydroorotic acid | 1002.656 |
| MedChemExpress: HY-N2067 | Vanillyl alcohol | 883.0853 | MedChemExpress: HY-N0198 | Nordihydroguaiaretic acid | 893.7445 |
| MedChemExpress: HY-N0129 | Sclareolide | 1006.312 | MedChemExpress: HY-133068 | 5-Hydroxyferulic acid | 919.0657 |
| MedChemExpress: HY-W017092 | 1,2,3-Trimethoxybenzene | 941.4367 | MedChemExpress: HY-119358 | Traumatic Acid | 917.3568 |
| MedChemExpress: HY-N0603 | 20(S)-Ginsenoside Rg3 | 979.4673 | MedChemExpress: HY-W012998 | 2,3-Pentanedione | 909.3841 |
| MedChemExpress: HY-N0039 | Ginsenoside Rb1 | 830.8489 | MedChemExpress: HY-N1944 | Nerolidol | 977.6047 |
| MedChemExpress: HY-N0310 | Soyasaponin Bb | 1155.27 | MedChemExpress: HY-N0680 | Thiamine (hydrochloride) | 858.6987 |
| MedChemExpress: HY-N2342 | Procyanidin C1 | 962.3906 | MedChemExpress: HY-Y0068 | N-Acetyl-L-phenylalanine | 895.4408 |
| MedChemExpress: HY-N0182 | Fisetin | 1046.219 | MedChemExpress: HY-N2334A | Glycochenodeoxycholic acid (sodium salt) | 1042.644 |
| MedChemExpress: HY-W012815 | 3-Methylcatechol | 1052.094 | MedChemExpress: HY-W010611 | 3-Methylbut-2-enoic acid | 995.2617 |
| MedChemExpress: HY-N0578 | Apigenin 7-glucoside | 1209.986 | MedChemExpress: HY-W014666 | Xanthurenic acid | 1023.37 |
| MedChemExpress: HY-N0367 | Trans-Anethole | 979.1165 | MedChemExpress: HY-Y0267 | Phenoxyacetic acid | 824.9859 |
| MedChemExpress: HY-W017194 | 2-Phenylbutanoic acid | 918.4902 | MedChemExpress: HY-W012657 | 4-Ethylbenzaldehyde | 703.4998 |
| MedChemExpress: HY-120140 | Ganoderic acid DM | 1077.482 | MedChemExpress: HY-N0379 | D-Mannose | 1071.425 |
| MedChemExpress: HY-129997 | Luteolinidin (chloride) | 933.7809 | MedChemExpress: HY-B0430A | D-Pantothenic acid (sodium) | 969.811 |
| MedChemExpress: HY-125112 | Vicenin-1 | 1046.904 | MedChemExpress: HY-14596 | Genistein | 921.4345 |
| MedChemExpress: HY-Y1298 | Methyl acetylacetate | 884.646 | MedChemExpress: HY-N2497 | Isoliquiritin apioside | 821.8958 |
| MedChemExpress: HY-113293A | Estrone sulfate (potassium) | 961.3154 | MedChemExpress: HY-N0002 | (−)-Epicatechin gallate | 982.8268 |
| MedChemExpress: HY-W038786 | 2,4,6-Trimethylphenol | 912.9048 | MedChemExpress: HY-113373 | Guanidinosuccinic acid | 698.8303 |
| MedChemExpress: HY-N6962 | α-Spinasterol | 801.8088 | MedChemExpress: HY-W010184 | 4,6-Dioxoheptanoic acid | 821.8451 |
| MedChemExpress: HY-N0803 | Myrcene | 870.9314 | MedChemExpress: HY-W012860 | p-Tolualdehyde | 1029.761 |
| MedChemExpress: HY-N2391 | p-Hydroxycinnamic acid | 963.4234 | MedChemExpress: HY-N3074 | Hexahydrofarnesyl acetone | 878.1319 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-B1449 | Uridine | 908.1209 | MedChemExpress: HY-119580 | Leucocyanidin | 957.6226 |
| MedChemExpress: HY-N0270 | Ononin | 1187.518 | MedChemExpress: HY-N0521A | (+)-Gallocatechin | 1096.904 |
| MedChemExpress: HY-N0783 | Eupatilin | 1007.039 | MedChemExpress: HY-N0088 | Apocynin | 1043.43 |
| MedChemExpress: HY-N0698 | Crocin II | 1325.975 | MedChemExpress: HY-B1107 | Naftidrofuryl (oxalate) | 1022.029 |
| MedChemExpress: HY-W004295 | 1-Pentadecanol | 991.3473 | MedChemExpress: HY-Y1366 | Hydroxyacetone | 837.357 |
| MedChemExpress: HY-N0418 | Quercitrin | 1128.617 | MedChemExpress: HY-N2938 | Biorobin | 791.185 |
| MedChemExpress: HY-N1467 | (−)-α-Terpineol | 1163.345 | MedChemExpress: HY-N2166 | Tomatine | 635.5707 |
| MedChemExpress: HY-Y1031 | 3-Ethoxy-3-oxopropanoic acid | 1065.464 | MedChemExpress: HY-N1096 | Veratraldehyde | 979.6116 |
| MedChemExpress: HY-N0534 | Vitexin-2″-O-rhamnoside | 747.1181 | MedChemExpress: HY-N3006 | Sakuranetin | 675.5882 |
| MedChemExpress: HY-N1445 | Isoquercetin | 1104.47 | MedChemExpress: HY-N7204 | 4-Hydroxyderricin | 842.4877 |
| MedChemExpress: HY-N2388 | Auraptene | 1034.562 | MedChemExpress: HY-N2424 | Flavone | 1069.524 |
| MedChemExpress: HY-N3312 | Matairesinol | 851.161 | MedChemExpress: HY-13585 | Carmustine | 1282.739 |
| MedChemExpress: HY-N0035 | Arctigenin | 811.3139 | MedChemExpress: HY-N0569 | Madecassic acid | 813.8427 |
| MedChemExpress: HY-N0078 | Ginkgolic Acid (C13:0) | 844.1046 | MedChemExpress: HY-N0034 | Arctiin | 645.9765 |
| MedChemExpress: HY-N7693 | Polyporusterone B | 1175.382 | MedChemExpress: HY-N0157 | Orotic acid | 826.427 |
| MedChemExpress: HY-N6071 | Secoisolariciresinol | 1112.005 | MedChemExpress: HY-N0499 | Cyanidin (Chloride) | 1061.561 |
| MedChemExpress: HY-N3308 | Medicarpin | 622.3141 | MedChemExpress: HY-N0547 | Nomilin | 989.5541 |
| MedChemExpress: HY-Y0135 | Tropinone | 856.4439 | MedChemExpress: HY-N1365 | Isoscopoletin | 898.933 |
| MedChemExpress: HY-N0058 | 4,5-Dicaffeoylquinic acid | 1065.884 | MedChemExpress: HY-118341 | Clitocine | 1144.133 |
| MedChemExpress: HY-N6036 | Ganoderic acid F | 791.7198 | MedChemExpress: HY-B1072 | Phenothrin | 903.222 |
| MedChemExpress: HY-30151 | Methoxsalen | 1482.513 | MedChemExpress: HY-59132 | 2-Amino-1-phenylethanol | 1076.654 |
| MedChemExpress: HY-N0104 | Curcumol | 1045.93 | MedChemExpress: HY-101416 | Vanilpyruvic acid | 1086.418 |
| MedChemExpress: HY-N3075 | Phytol | 715.6019 | MedChemExpress: HY-W017189 | 3-Phenylbutyric acid | 798.5304 |
| MedChemExpress: HY-B1028 | Pantethine | 689.7686 | MedChemExpress: HY-N0586 | Norisoboldine | 812.7907 |
| MedChemExpress: HY-W010128 | 6-(Dimethylamino)purine | 877.529 | MedChemExpress: HY-N0598 | Ginsenoside F1 | 975.1974 |
| MedChemExpress: HY-N1986 | Cucurbitacin D | 937.0398 | MedChemExpress: HY-B0900 | Anethole | 829.3991 |
| MedChemExpress: HY-N0583 | Hydrocortisone | 893.9008 | MedChemExpress: HY-N0889 | Ginkgetin | 232.343 |
| MedChemExpress: HY-N1454 | Apigenin-7-glucuronide | 991.8672 | MedChemExpress: HY-N0098 | Vanillin | 832.4473 |
| MedChemExpress: HY-B0561 | Spironolactone | 827.8345 | MedChemExpress: HY-Z0283 | Benzamide | 1097.474 |
| MedChemExpress: HY-107811 | Harmol | 844.253 | MedChemExpress: HY-N2429 | Sphondin | 913.6372 |
| MedChemExpress: HY-W015823 | 4-Hydroxybenzyl cyanide | 1050.204 | MedChemExpress: HY-W015608 | 2-Phenylpropionic acid | 1253.073 |
| MedChemExpress: HY-N3389 | Licoisoflavone A | 942.2476 | MedChemExpress: HY-N0761 | Isoferulic acid | 918.062 |
| MedChemExpress: HY-128851 | Coenzyme A | 1090.874 | MedChemExpress: HY-N0101 | Neohesperidin | 774.0784 |
| MedChemExpress: HY-N2419 | Erythrodiol | 872.6485 | MedChemExpress: HY-N0153 | Naringin | 1050.76 |
| MedChemExpress: HY-N0180 | 18β-Glycyrrhetinic acid | 736.3555 | MedChemExpress: HY-N0353 | Curdione | 1005.209 |
| MedChemExpress: HY-N2625A | Harmalol (hydrochloride) | 757.8125 | MedChemExpress: HY-N0524 | Propyl gallate | 650.6526 |
| MedChemExpress: HY-N0166 | Gramine | 1014.177 | MedChemExpress: HY-W088037 | Tridecane | 970.7382 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N7432 | DIMBOA | 910.6705 | MedChemExpress: HY-121618 | α-Thujone | 659.4321 |
| MedChemExpress: HY-N2410 | N-trans-Feruloyltyramine | 1056.278 | MedChemExpress: HY-B0216 | Ethynyl Estradiol | 1110.911 |
| MedChemExpress: HY-W014612 | Eugenol acetate | 1041.765 | MedChemExpress: HY-N0824 | Syringin | 935.9617 |
| MedChemExpress: HY-N0069 | Solamargine | 912.2193 | MedChemExpress: HY-N0013 | Vitexin | 1063.73 |
| MedChemExpress: HY-N6615 | Aflatoxin B1 | 860.4301 | MedChemExpress: HY-N6070 | Ricinoleic acid | 1165.621 |
| MedChemExpress: HY-Y0084 | 3,4,5-Trimethoxybenzoic acid | 1121.402 | MedChemExpress: HY-W004305 | Hexadecanal | 882.5139 |
| MedChemExpress: HY-N0311 | Emodin-8-glucoside | 1174.326 | MedChemExpress: HY-B0467A | Amoxicillin | 971.1374 |
| MedChemExpress: HY-N7030 | 5,7,3',4'-Tetramethoxyflavone | 1023.427 | MedChemExpress: HY-N1390 | Syringaldehyde | 949.8732 |
| MedChemExpress: HY-W009811 | 2-Tridecanone | 1003.44 | MedChemExpress: HY-W004206 | 2-(4-Methoxyphenyl)acetic acid | 919.1732 |
| MedChemExpress: HY-N0056 | Isochlorogenic acid A | 827.6093 | MedChemExpress: HY-121883 | Lignoceric acid | 1102.31 |
| MedChemExpress: HY-N2420 | Flavokawain A | 893.4961 | MedChemExpress: HY-Y0051 | 5-Hydroxymethylfurfural | 1038.27 |
| MedChemExpress: HY-N1234 | Smyrindioloside | 1066.572 | MedChemExpress: HY-N1366 | Herniarin | 690.7558 |
| MedChemExpress: HY-102040 | Hispidol | 982.9374 | MedChemExpress: HY-N2484 | Methylnissolin | 940.1869 |
| MedChemExpress: HY-B0722 | Histamine (dihydrochloride) | 1022.007 | MedChemExpress: HY-N3755 | Dihydroresveratrol | 1085.793 |
| MedChemExpress: HY-W017434 | 3,4-Dimethylbenzoic acid | 971.2489 | MedChemExpress: HY-N0184 | Glycyrrhizic acid | 851.4319 |
| MedChemExpress: HY-N1547 | Prudomestin | 894.1495 | MedChemExpress: HY-N4261 | Dehydronuciferine | 1046.98 |
| MedChemExpress: HY-14592 | Tectochrysin | 890.4365 | MedChemExpress: HY-Y0949 | Methyl 2-furoate | 943.7295 |
| MedChemExpress: HY-N0222 | Avicularin | 919.2158 | MedChemExpress: HY-B0172A | Isoallolithocholic acid | 881.405 |
| MedChemExpress: HY-N4177 | Rubrofusarin gentiobioside | 1035.17 | MedChemExpress: HY-128421 | Tridecanedioic acid | 1127.183 |
| MedChemExpress: HY-W001963 | Pyrrole-2-carboxylic acid | 799.649 | MedChemExpress: HY-W015892 | γ-Hexalactone | 1020.576 |
| MedChemExpress: HY-N0429 | Diosbulbin B | 951.5417 | MedChemExpress: HY-B0528A | Octopamine (hydrochloride) | 809.8041 |
| MedChemExpress: HY-N4192 | Toringin | 1102.623 | MedChemExpress: HY-W016798 | (S)-2-acetamido-4-amino-4-oxobutanoic acid | 1045.166 |
| MedChemExpress: HY-W004284 | Heptadecanoic acid | 1070.95 | MedChemExpress: HY-N0778 | Isorhamnetin-3-O-neohespeidoside | 971.4582 |
| MedChemExpress: HY-N2409 | Delphinidin (chloride) | 816.1782 | MedChemExpress: HY-14590 | Kaempferol | 845.5437 |
| MedChemExpress: HY-N0419 | Quercimeritrin | 857.409 | MedChemExpress: HY-N6895 | Violanthin | 684.1202 |
| MedChemExpress: HY-N0730 | Diosgenin glucoside | 1057.302 | MedChemExpress: HY-125848 | Ginsenoside F2 | 926.1742 |
| MedChemExpress: HY-N3017 | Artemitin | 957.1424 | MedChemExpress: HY-50723 | 3-Methylxanthine | 838.8506 |
| MedChemExpress: HY-B0519B | Tylosin (phosphate) | 1132.19 | MedChemExpress: HY-N1500 | Pulegone | 1146.187 |
| MedChemExpress: HY-N0120A | Polydatin | 998.3778 | MedChemExpress: HY-W015060 | 2-(2-Methylbenzamido)acetic acid | 1362.377 |
| MedChemExpress: HY-N8290 | Lactupicrin | 995.7975 | MedChemExpress: HY-B1745A | Pyridoxylamine (dihydrochloride) | 1154.431 |
| MedChemExpress: HY-N0764 | Isobergapten | 1247.074 | MedChemExpress: HY-N0452 | Hyperoside | 826.3697 |
| MedChemExpress: HY-N6973 | Boldine | 931.6237 | MedChemExpress: HY-N2518 | Agnuside | 1066.467 |
| MedChemExpress: HY-W015464 | N-Isovaleroylglycine | 940.2255 | MedChemExpress: HY-N2593 | Isorhapontigenin | 862.0442 |
| MedChemExpress: HY-N2897 | Dihydrokaempferol | 748.4559 | MedChemExpress: HY-W004924 | 5-Hydroxymethyluracil | 848.2073 |
| MedChemExpress: HY-N1673 | 2,5-Dihydroxybenzaldehyde | 921.2732 | MedChemExpress: HY-N0125 | Diosmetin | 1074.336 |
| MedChemExpress: HY-128975 | m-Tyramine (hydrobromide) | 946.0018 | MedChemExpress: HY-N1778A | (E)-3,4-Dimethoxycinnamic acid | 953.2591 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N6258 | Kahweol | 608.7131 | MedChemExpress: HY-N2263 | Skimmin | 1029.943 |
| MedChemExpress: HY-N8151 | Sanguisorbigenin | 795.9736 | MedChemExpress: HY-Y0264 | 4-Hydroxybenzoic acid | 969.0471 |
| MedChemExpress: HY-N2584 | (2S)-Isoxanthohumol | 876.9959 | MedChemExpress: HY-34439 | 2,5-Dimethylpyrazine | 1051.204 |
| MedChemExpress: HY-128387 | 2,3-Butanediol | 772.4441 | MedChemExpress: HY-111664A | (S)-(−)-Citronellal | 948.1042 |
| MedChemExpress: HY-113107 | 3-Hydroxydodecanoic acid | 1000.694 | MedChemExpress: HY-19696A | Tauroursodeoxycholate (sodium) | 939.6362 |
| MedChemExpress: HY-N0541 | Pseudoginsenoside F11 | 810.4484 | MedChemExpress: HY-N6879 | DiosMetin 7-O-B-D-Glucuronide | 1021.464 |
| MedChemExpress: HY-N0538 | Xylitol | 890.051 | MedChemExpress: HY-N2510 | Myristicin | 960.4671 |
| MedChemExpress: HY-14393 | Emodin | 865.2266 | MedChemExpress: HY-W007426 | N-Methylbenzylamine | 1178.371 |
| MedChemExpress: HY-B1189 | Meglutol | 965.3573 | MedChemExpress: HY-N0765 | Isoliquiritin | 737.1918 |
| MedChemExpress: HY-100583 | (−)-(S)-Equol | 1162.823 | MedChemExpress: HY-76316 | Bergaptol | 1060.003 |
| MedChemExpress: HY-N3556 | Caulilexin C | 998.4752 | MedChemExpress: HY-N6850 | Calenduloside E | 1034.138 |
| MedChemExpress: HY-N8321 | 5-O-Caffeoylshikimic acid | 1072.132 | MedChemExpress: HY-N1902 | 4-Hydroxyphenylacetic acid | 750.2216 |
| MedChemExpress: HY-N2229 | Rhapontigenin | 965.1731 | MedChemExpress: HY-119502 | Camalexin | 1018.047 |
| MedChemExpress: HY-N2530 | Notoginsenoside Fa | 1075.493 | MedChemExpress: HY-101417 | Diethyl phosphate | 1033.984 |
| MedChemExpress: HY-W007894 | Dimethylmalonic acid | 890.7612 | MedChemExpress: HY-W015300 | Suberic acid | 904.1508 |
| MedChemExpress: HY-19700 | trans-Zeatin | 1016.786 | MedChemExpress: HY-N1382 | Asperuloside | 1045.558 |
| MedChemExpress: HY-N1441 | Afzelin | 898.8646 | MedChemExpress: HY-W040154 | Cyclic N-Acetyl-D-mannosamine | 868.6631 |
| MedChemExpress: HY-W042193 | 2-Piperidone | 734.5448 | MedChemExpress: HY-N0462 | Corilagin | 812.4075 |
| MedChemExpress: HY-N6660 | Trisdecanoin | 969.1379 | MedChemExpress: HY-N2531 | Notoginsenoside Fc | 1131.911 |
| MedChemExpress: HY-B1438 | Canrenone | 1049.986 | MedChemExpress: HY-30270 | Mequinol | 791.9775 |
| MedChemExpress: HY-N0447 | 8-Gingerol | 724.4815 | MedChemExpress: HY-W046353 | 2-Methoxycinnamaldehyde | 1103.02 |
| MedChemExpress: HY-N0359 | Cynarin | 1005.665 | MedChemExpress: HY-W004296 | 1-Heptadecanol | 803.2986 |
| MedChemExpress: HY-N1377 | Nevadensin | 1275.947 | MedChemExpress: HY-W020215 | Tricarballylic acid | 945.9568 |
| MedChemExpress: HY-N2165 | Vicenin 2 | 893.9745 | MedChemExpress: HY-N4139 | Protohypericin | 1160.467 |
| MedChemExpress: HY-W016393 | Dihydroconiferyl alcohol | 1331.121 | MedChemExpress: HY-N0074 | Byakangelicol | 925.1398 |
| MedChemExpress: HY-N7976 | Quercetin 3-O-neohesperidoside | 838.5308 | MedChemExpress: HY-N0907 | Ginsenoside Rg6 | 737.5989 |
| MedChemExpress: HY-W013571 | 4-Isopropylbenzoic acid | 857.7524 | MedChemExpress: HY-W015780 | 1,4-Dimethoxybenzene | 1097.393 |
| MedChemExpress: HY-N3431 | Kaempferol-7-O-rhamnoside | 963.8327 | MedChemExpress: HY-W010277 | (S)-2-(2-Aminopropanamido)acetic acid | 993.8076 |
| MedChemExpress: HY-124257 | (R)-Citronellol | 691.7924 | MedChemExpress: HY-N1393 | 2-Methoxybenzoic acid | 1090.701 |
| MedChemExpress: HY-N4127 | 3'-Demethylnobiletin | 794.5882 | MedChemExpress: HY-W087988 | 3-Pentanol | 647.4207 |
| MedChemExpress: HY-N7513 | Homovanillyl alcohol | 1114.77 | MedChemExpress: HY-50730 | Asparagusic acid | 934.8474 |
| MedChemExpress: HY-130237 | Cinnamtannin B-1 | 1061.374 | MedChemExpress: HY-116084 | Trimethylamine N-oxide | 1147.152 |
| MedChemExpress: HY-N7502 | 2-(Hydroxymethyl)anthraquinone | 723.6408 | MedChemExpress: HY-69014 | 2-O-Methylcytosine | 1109.623 |
| MedChemExpress: HY-14598 | Diethylstilbestrol | 701.5237 | MedChemExpress: HY-I0660 | PCL 016 | 1109.845 |
| MedChemExpress: HY-N4095 | Brevifolincarboxylic acid | 760.1752 | MedChemExpress: HY-101397 | Allopurinol riboside | 1079.701 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-W066890 | 4-Nitrocatechol | 1062.242 | MedChemExpress: HY-B1589A | Carbinoxamine maleate salt | 807.8179 |
| MedChemExpress: HY-B0554 | Norethindrone | 979.6645 | MedChemExpress: HY-N0121 | Sesamin | 1111.465 |
| MedChemExpress: HY-113139 | 1-Methylinosine | 1112.685 | MedChemExpress: HY-N2556 | Tirucallol | 1060.924 |
| MedChemExpress: HY-N0341 | Scopolin | 684.5208 | MedChemExpress: HY-107848 | DL-O-Tyrosine | 919.2122 |
| MedChemExpress: HY-N0232 | Psoralidin | 1084.87 | MedChemExpress: HY-B0400 | D-Sorbitol | 713.6691 |
| MedChemExpress: HY-N0796 | Procyanidin B2 | 808.3168 | MedChemExpress: HY-B1167 | Ajmaline | 916.1038 |
| MedChemExpress: HY-N3961 | Neoglycyrol | 923.0229 | MedChemExpress: HY-111664 | (R)-(+)-Citronellal | 796.6306 |
| MedChemExpress: HY-N4258 | Panasenoside | 1093.409 | MedChemExpress: HY-N6703 | ar-Turmerone | 1106.99 |
| MedChemExpress: HY-108052 | Delphinidin 3-glucoside (chloride) | 843.0852 | MedChemExpress: HY-W004874 | 2,6-Dimethylhydroquinone | 791.4555 |
| MedChemExpress: HY-126359 | 1-Stearoyl-2-linoleoyl-sn-glycero-3-phosphocholine | 1049.632 | MedChemExpress: HY-N1952 | Isoeugenol | 1139.306 |
| MedChemExpress: HY-N0167 | Gynostemma Extract | 1016.569 | MedChemExpress: HY-Y0932 | Isophorone | 1116.305 |
| MedChemExpress: HY-N2123 | Neoliquiritin | 772.4579 | MedChemExpress: HY-A0132 | N-Acetyl-D-glucosamine | 1246.653 |
| MedChemExpress: HY-N1434 | Methyl p-coumarate | 959.8824 | MedChemExpress: HY-N2353 | Arabinose | 1341.366 |
| MedChemExpress: HY-128393 | Trilinolein | 834.4039 | MedChemExpress: HY-N2334 | Glycochenodeoxycholic acid | 983.0896 |
| MedChemExpress: HY-W006057 | 3-Methyl-2-oxobutanoic acid | 878.2265 | MedChemExpress: HY-W015883 | Fumaric acid | 918.3772 |
| MedChemExpress: HY-N1941 | Isosinensetin | 1065.41 | MedChemExpress: HY-W012999 | Tiglic acid | 1059.35 |
| MedChemExpress: HY-F0001 | NADH (disodium salt) | 996.9696 | MedChemExpress: HY-W010516 | 2-Methylvaleric acid | 1241.438 |
| MedChemExpress: HY-N1201 | Apigenin | 930.6963 | MedChemExpress: HY-N0152 | Myricitrin | 903.7859 |
| MedChemExpress: HY-N1196 | Suberosin | 1003.25 | MedChemExpress: HY-109590 | Arachidonic acid | 1207.834 |
| MedChemExpress: HY-B0152B | Adenine (hemisulfate) | 842.2125 | MedChemExpress: HY-N1423A | Glycocholic acid (sodium) | 967.7025 |
| MedChemExpress: HY-W015444 | 2-Hydroxyoctanoic acid | 1089.353 | MedChemExpress: HY-N4136 | Lonicerin | 804.2399 |
| MedChemExpress: HY-N7259 | (+)-Isomenthone | 807.8808 | MedChemExpress: HY-N0713 | Diosmetin-7-O-β-D-glucopyranoside | 1122.568 |
| MedChemExpress: HY-W001189 | 1,3-Dithiane | 1179.502 | MedChemExpress: HY-N0064 | Macelignan | 621.9317 |
| MedChemExpress: HY-N0273 | Brassinolide | 945.8414 | MedChemExpress: HY-N8131 | Pangelin | 581.7367 |
| MedChemExpress: HY-15464A | (R)-(−)-Gossypol acetic acid | 580.7646 | MedChemExpress: HY-101410 | SDMA | 881.0961 |
| MedChemExpress: HY-N0756 | Bornyl acetate | 874.4759 | MedChemExpress: HY-N1951 | Miltirone | 1109.155 |
| MedChemExpress: HY-N2015 | Hastatoside | 738.976 | MedChemExpress: HY-N0647 | Silychristin | 921.666 |
| MedChemExpress: HY-N4122 | Neodiosmin | 928.3945 | MedChemExpress: HY-N0604 | Ginsenoside Rh1 | 665.2277 |
| MedChemExpress: HY-N0664 | Aucubin | 736.093 | MedChemExpress: HY-W012835 | 4-Methylanisole | 916.5396 |
| MedChemExpress: HY-N7109 | Erucic acid | 1149.145 | MedChemExpress: HY-N7093 | Furaneol | 1033.999 |
| MedChemExpress: HY-N7745 | Glucosylsphingosine | 955.6283 | MedChemExpress: HY-N7070 | Geranyl acetate | 953.9453 |
| MedChemExpress: HY-N0172 | Caffeic acid | 754.116 | MedChemExpress: HY-N0941 | beta-Mangostin | 828.6091 |
| MedChemExpress: HY-N5010 | Nepitrin | 1095.659 | MedChemExpress: HY-N0405 | Orientin | 715.9231 |
| MedChemExpress: HY-N0046 | Notoginsenoside Fe | 902.3283 | MedChemExpress: HY-W015591 | Mandelic acid | 715.2042 |
| MedChemExpress: HY-N2118 | Bilobetin | 1104.88 | MedChemExpress: HY-W049970 | Carvacrol methyl ether | 880.5361 |
| MedChemExpress: HY-W015490 | 1,4-Naphthoquinone | 822.1115 | MedChemExpress: HY-N6074 | Soyasapogenol B | 1146.412 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-B0467 | Amoxicillin (sodium) | 1082.26 | MedChemExpress: HY-N0328 | alpha-Mangostin | 1061.941 |
| MedChemExpress: HY-N0568 | Madecassoside | 934.5314 | MedChemExpress: HY-N2194 | Bergamottin | 795.0103 |
| MedChemExpress: HY-118824A | N-Feruloylserotonin | 1060.876 | MedChemExpress: HY-N1992 | Theaflavin 3,3'-digallate | 933.3624 |
| MedChemExpress: HY-N0525 | Ethyl gallate | 1017.803 | MedChemExpress: HY-N7088 | Raffinose | 676.4373 |
| MedChemExpress: HY-N7501 | Isoformononetin | 1355.098 | MedChemExpress: HY-N0428 | Obacunone | 1116.692 |
| MedChemExpress: HY-Y0801 | 2,6-Dihydroxybenzoic acid | 658.0243 | MedChemExpress: HY-N6018 | Beta-Eudesmol | 776.3619 |
| MedChemExpress: HY-B1389 | Lactitol (monohydrate) | 1005.084 | MedChemExpress: HY-N3266 | Methyl rosmarinate | 1056.902 |
| MedChemExpress: HY-N0493 | Pectolinarigenin | 920.1312 | MedChemExpress: HY-N2055 | Kaempferol 3-O-sophoroside | 867.3846 |
| MedChemExpress: HY-N2131 | Isosakuranetin | 637.2462 | MedChemExpress: HY-N2853 | D-α-Tocopherylquinone | 598.2224 |
| MedChemExpress: HY-59291 | N-Acetyl-L-leucine | 636.9347 | MedChemExpress: HY-W035362 | ω-Pentadecalactone | 959.0542 |
| MedChemExpress: HY-N6257 | Cafestol | 1003.112 | MedChemExpress: HY-W015229 | 3-Indolepropionic acid | 1063.564 |
| MedChemExpress: HY-N7176 | Kaempferol 3-O-β-D-glucuronide | 1023.998 | MedChemExpress: HY-N1141 | Torachrysone-8-O-b-D-glucoside | 1039.734 |
| MedChemExpress: HY-N4289 | 3-Epiursolic Acid | 968.3096 | MedChemExpress: HY-N4114 | Picrocrocin | 633.2514 |
| MedChemExpress: HY-113020 | 21-Hydroxypregnenolone | 955.7541 | MedChemExpress: HY-N3513 | Mulberrin | 1221.946 |
| MedChemExpress: HY-N0629 | Maslinic acid | 1120.923 | MedChemExpress: HY-B0223 | Albendazole | 1007.384 |
| MedChemExpress: HY-N0087 | Gambogic Acid | 1063.766 | MedChemExpress: HY-N0183 | Formononetin | 982.4601 |
| MedChemExpress: HY-W050145 | Levoglucosan | 572.1788 | MedChemExpress: HY-B1761 | Santonin | 895.7689 |
| MedChemExpress: HY-W010098 | Terephthalic acid | 866.3788 | MedChemExpress: HY-W006405 | Isoflavone | 913.1429 |
| MedChemExpress: HY-N7036 | Rhamnetin | 1025.752 | MedChemExpress: HY-W001171 | 3-Hydroxyanthranilic acid | 696.0713 |
| MedChemExpress: HY-N6951 | Guaiazulene | 999.8541 | MedChemExpress: HY-W002292 | L-Homoserine | 1281.161 |
| MedChemExpress: HY-113332 | Myristoleic acid | 1060.378 | MedChemExpress: HY-W017389 | Xanthine | 1038.12 |
| MedChemExpress: HY-113299 | Metanephrine | 993.9043 | MedChemExpress: HY-N0577 | Apiin | 1106.584 |
| MedChemExpress: HY-N2372 | Fraxinol | 772.0122 | MedChemExpress: HY-N2340 | D-(+)-Melezitose | 886.4563 |
| MedChemExpress: HY-N0007A | Bisdemethoxycurcumin | 967.3982 | MedChemExpress: HY-W008150 | 2-Hydroxy-3-methylbutanoic acid | 798.7467 |
| MedChemExpress: HY-Y0078 | Cinnamyl Alcohol | 740.7814 | MedChemExpress: HY-N6597 | 3'-Methoxyapiin | 871.6016 |
| MedChemExpress: HY-N0682 | Pyridoxine (hydrochloride) | 799.8007 | MedChemExpress: HY-N2075 | 3-Acetyl-beta-boswellic acid | 752.9436 |
| MedChemExpress: HY-113285 | Ureidopropionic acid | 1035.138 | MedChemExpress: HY-W004260 | Arachidic acid | 966.5559 |
| MedChemExpress: HY-B0099 | Edaravone | 1086.284 | MedChemExpress: HY-W016969 | 2-Undecanone | 1119.854 |
| MedChemExpress: HY-14579 | (+)-Isolariciresinol | 830.6093 | MedChemExpress: HY-W017212 | Methyl cinnamate | 1068.136 |
| MedChemExpress: HY-N0763 | Angelicin | 963.0213 | MedChemExpress: HY-W010607 | cis-3-Hexen-1-ol | 1097.087 |
| MedChemExpress: HY-W001187 | Tempo | 1061.203 | MedChemExpress: HY-N1970 | 5,7-Dihydroxychromone | 1093.907 |
| MedChemExpress: HY-124124 | N-Methylnicotinamide | 996.1346 | MedChemExpress: HY-W004292 | 1-Undecanol | 1074.886 |
| MedChemExpress: HY-N0440 | Germacrone | 974.0245 | MedChemExpress: HY-N2132 | Flavokawain B | 921.0596 |
| MedChemExpress: HY-111646 | N6-Etheno 2'-deoxyadenosine | 965.3692 | MedChemExpress: HY-33893 | Indole-3-methanamine | 774.4333 |
| MedChemExpress: HY-W016647 | For-Met-OH | 819.8295 | MedChemExpress: HY-D0803 | Thymoquinone | 1249.473 |
| MedChemExpress: HY-W007606 | Tyramine | 1128.759 | MedChemExpress: HY-W007926 | 2-Oxobutanoic acid | 658.9715 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-W012078 | 5-Methyl-2'-deoxycytidine | 961.9903 | MedChemExpress: HY-100806 | Kynurenic acid | 718.2388 |
| MedChemExpress: HY-N2450 | Sulforaphene | 749.5491 | MedChemExpress: HY-113027 | p-Hydroxymandelic acid | 1340.37 |
| MedChemExpress: HY-113291 | 5'-Deoxyadenosine | 899.0073 | MedChemExpress: HY-125934 | Allocholic acid | 1000.774 |
| MedChemExpress: HY-N3027 | Soyasaponin Aa | 889.7611 | MedChemExpress: HY-113527 | TRIA-662 | 1140.39 |
| MedChemExpress: HY-W010452 | 3-Hydroxybutyric acid (sodium) | 894.0672 | MedChemExpress: HY-113263 | 17a-Hydroxypregnenolone | 861.6395 |
| MedChemExpress: HY-N1463 | Luteolin 7-O-glucuronide | 995.7867 | MedChemExpress: HY-W015874 | 2-Hydroxy-2-methylbutanoic acid | 1032.358 |
| MedChemExpress: HY-N2374 | Eupatorin | 858.1529 | MedChemExpress: HY-113221 | Isovalerylcarnitine | 737.2804 |
| MedChemExpress: HY-N0661 | Alliin | 782.3552 | MedChemExpress: HY-113247 | trans-trans-Muconic acid | 1096.606 |
| MedChemExpress: HY-W040055 | Neopterin | 959.9653 | MedChemExpress: HY-41982 | D-Glucuronic acid lactone | 1111.254 |
| MedChemExpress: HY-N0141 | Parthenolide | 537.4596 | MedChemExpress: HY-113382 | N-Methylhydantoin | 973.8439 |
| MedChemExpress: HY-W015818 | 2-Benzoxazolinone | 985.9488 | MedChemExpress: HY-N1420A | Rhamnose (monohydrate) | 922.0222 |
| MedChemExpress: HY-103395 | Methylmalonic acid | 883.2913 | MedChemExpress: HY-76691 | D-Ribonolactone | 702.8507 |
| MedChemExpress: HY-N0417 | Cucurbitacin E | 641.6726 | MedChemExpress: HY-N0186 | Indole-3-butyric acid | 1084.211 |
| MedChemExpress: HY-W013495 | Porphobilinogen | 1154.849 | MedChemExpress: HY-113081 | 1-Methyladenosine | 849.3773 |
| MedChemExpress: HY-19528 | SAH | 641.7279 | MedChemExpress: HY-B1514 | Allantoic acid | 639.3876 |
| MedChemExpress: HY-N1482 | Methyl palmitate | 907.9799 | MedChemExpress: HY-W018772 | D-Ribose(mixture of isomers) | 919.6217 |
| MedChemExpress: HY-113165A | Isobutyryl-L-carnitine (chloride) | 1069.653 | MedChemExpress: HY-125731 | Glycodeoxycholic Acid | 959.2681 |
| MedChemExpress: HY-N0485 | Liensinine (Diperchlorate) | 826.0249 | MedChemExpress: HY-N0305 | 5-Aminolevulinic acid (hydrochloride) | 643.3591 |
| MedChemExpress: HY-N0784 | Ginkgolide B | 1094.796 | MedChemExpress: HY-N8253 | Spiraeoside | 861.8613 |
| MedChemExpress: HY-B0809 | Theophylline | 818.706 | MedChemExpress: HY-16938 | 5'-Methylthioadenosine | 714.8649 |
| MedChemExpress: HY-113008 | Urocanic acid | 1101.226 | MedChemExpress: HY-113123 | LysoPC(14:0/0:0) | 1043.126 |
| MedChemExpress: HY-N0780 | Isoalantolactone | 1089.165 | MedChemExpress: HY-41700 | D-Alanine | 947.5344 |
| MedChemExpress: HY-W011151 | trans-Zeatinriboside | 823.084 | MedChemExpress: HY-B0660 | Eicosapentaenoic Acid | 950.1181 |
| MedChemExpress: HY-B1788 | Taurocholic acid | 900.9931 | MedChemExpress: HY-A0070A | Liothyronine | 924.5631 |
| MedChemExpress: HY-B1777 | Spermine | 968.6677 | MedChemExpress: HY-113136 | 1-Methylguanosine | 1196.894 |
| MedChemExpress: HY-113144 | L-Hexanoylcarnitine | 948.6206 | MedChemExpress: HY-113135 | 5-Methylcytidine | 1079.212 |
| MedChemExpress: HY-113063 | 3-Methyl-2-oxovaleric acid | 984.6358 | MedChemExpress: HY-N2350 | Cynaropicrin | 1182.791 |
| MedChemExpress: HY-12033 | 2-Methoxyestradiol | 884.0231 | MedChemExpress: HY-N2434 | [10]-Shogaol | 1308.714 |
| MedChemExpress: HY-N0018 | Daidzin | 828.0829 | MedChemExpress: HY-Y1718 | Tridecanoic acid | 946.5476 |
| MedChemExpress: HY-113071A | Mevalonic acid (lithium salt) | 1179.591 | MedChemExpress: HY-N2579 | 1-Kestose | 1115.168 |
| MedChemExpress: HY-77591 | Cysteamine (hydrochloride) | 1088.921 | MedChemExpress: HY-113083 | Acetaminophen glucuronide | 719.1638 |
| MedChemExpress: HY-N1394 | p-Anisic acid | 1003.08 | MedChemExpress: HY-N9182 | Zeaxanthin dipalmitate | 873.6162 |
| MedChemExpress: HY-N1417 | Sesamol | 995.7089 | MedChemExpress: HY-W010562 | 2-Methoxypyrazine | 1228.173 |
| MedChemExpress: HY-N0438 | Pimpinellin | 815.023 | MedChemExpress: HY-W045271 | Imidazole-5-propionic acid | 1084.262 |
| MedChemExpress: HY-103638A | 3-Methoxytyramine | 821.2607 | MedChemExpress: HY-N1967 | Dihydrocurcumin | 1140.2 |
| MedChemExpress: HY-34431 | Purine | 1094.653 | MedChemExpress: HY-108693 | β-Tocotrienol | 668.6336 |
| MedChemExpress: HY-113371 | 2-Methylcitric acid | 1204.199 | MedChemExpress: HY-W016077 | Glycyl-L-leucine | 829.1827 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N0575 | Pinocembrin | 1308.016 | MedChemExpress: HY-W017007 | 3-Methyl-L-histidine | 961.0572 |
| MedChemExpress: HY-113440 | 5-Methoxytryptophol | 1031.531 | MedChemExpress: HY-Y0367 | Maleic Acid | 614.1141 |
| MedChemExpress: HY-107542 | Oleoylethanolamide | 1064.732 | MedChemExpress: HY-F0004 | B-Nicotinamide mononucleotide | 1007.822 |
| MedChemExpress: HY-B0412 | Estriol | 1058.345 | MedChemExpress: HY-110281 | Dehydroascorbic acid | 925.0304 |
| MedChemExpress: HY-W008343 | 1,3-Dimethyluracil | 1001.839 | MedChemExpress: HY-Y0520 | Itaconic acid | 944.0433 |
| MedChemExpress: HY-101047 | D-erythro-Sphingosine | 823.3956 | MedChemExpress: HY-W001959 | D-Allothreonine | 901.7798 |
| MedChemExpress: HY-I0301 | D-(+)-Glucono-1,5-lactone | 890.9945 | MedChemExpress: HY-N2024 | Maltose | 960.9183 |
| MedChemExpress: HY-N1480 | (−)-Fucose | 950.5714 | MedChemExpress: HY-Y0181 | D-Pipecolinic acid | 932.2114 |
| MedChemExpress: HY-N2116 | Ginkgolic acid C17:1 | 1164.31 | MedChemExpress: HY-N0326 | L-Methionine | 974.8047 |
| MedChemExpress: HY-113432 | Nudifloramide | 993.1021 | MedChemExpress: HY-D0850 | Tartaric acid (disodium dihydrate) | 912.6321 |
| MedChemExpress: HY-W053507 | m-Tolylacetic acid | 989.3046 | MedChemExpress: HY-N0324A | Cholic acid (sodium) | 816.2579 |
| MedChemExpress: HY-N4167 | 3-O-Methylgalangin | 819.4334 | MedChemExpress: HY-N7404 | Nε,Nε,Nε-Trimethyllysine (chloride) | 1143.924 |
| MedChemExpress: HY-30220 | (S)-2-Hydroxy-3-phenylpropanoic acid | 1131.39 | MedChemExpress: HY-N1914 | Ergothioneine | 1005.366 |
| MedChemExpress: HY-125323 | 6-Hydroxykaempferol 3,6-diglucoside | 1086.159 | MedChemExpress: HY-14608A | L-Glutamic acid (monosodium salt) | 1136.789 |
| MedChemExpress: HY-123033A | Nicotinamide riboside (chloride) | 991.823 | MedChemExpress: HY-N2468 | Xylobiose | 862.1511 |
| MedChemExpress: HY-N0755 | Rhoifolin | 1023.714 | MedChemExpress: HY-W010589 | H-Abu-OH | 993.6587 |
| MedChemExpress: HY-76847 | Chenodeoxycholic Acid | 1038.598 | MedChemExpress: HY-N0666B | Aspartic acid (calcium) | 1027.013 |
| MedChemExpress: HY-B0914 | 10-Undecenoic acid | 1056.535 | MedChemExpress: HY-100921 | Spaglumic Acid | 714.0463 |
| MedChemExpress: HY-W004282 | Undecanoic acid | 879.0934 | MedChemExpress: HY-W016781 | D-Arginine | 1215.288 |
| MedChemExpress: HY-N5114 | Isovitexin 2″-O-arabinoside | 1033.269 | MedChemExpress: HY-W050031 | (S)-3-Hydroxybutanoic acid | 979.3394 |
| MedChemExpress: HY-B1065 | Aceglutamide | 1263.47 | MedChemExpress: HY-100803 | Hypotaurine | 798.4494 |
| MedChemExpress: HY-N0192 | Arbutin | 1259.869 | MedChemExpress: HY-B2233B | Phosphorylcholine | 1107.376 |
| MedChemExpress: HY-113216 | Asymmetric dimethylarginine | 806.9828 | MedChemExpress: HY-B1352 | L-Ornithine | 1138.421 |
| MedChemExpress: HY-N4322 | Decursinol angelate | 819.0637 | MedChemExpress: HY-100973A | Adenosine 5′-diphosphoribose (sodium) | 1112.658 |
| MedChemExpress: HY-N0457A | L-Chicoric Acid | 1257.708 | MedChemExpress: HY-D0844 | Glutathione oxidized | 1015.041 |
| MedChemExpress: HY-N6037 | Gardenin B | 1121.926 | MedChemExpress: HY-101401 | 3-(Methylthio)propionic acid | 1259.269 |
| MedChemExpress: HY-N0136 | Taxifolin | 973.2161 | MedChemExpress: HY-101399 | γ-Glu-Phe | 1077.051 |
| MedChemExpress: HY-N2205 | Esculentoside H | 1175.483 | MedChemExpress: HY-113286 | 4-Guanidinobutanoic acid | 846.7738 |
| MedChemExpress: HY-W018161 | Hexadecanedioic acid | 818.4396 | MedChemExpress: HY-B0964 | Riboflavin (phosphate sodium) | 760.1592 |
| MedChemExpress: HY-N0336 | 3-Butylidenephthalide | 952.6722 | MedChemExpress: HY-W050044 | L-Azetidine-2-carboxylic acid | 953.3787 |
| MedChemExpress: HY-W016814 | (Z)-Aconitic acid | 921.627 | MedChemExpress: HY-W017018 | L-Ornithine (hydrochloride) | 843.6865 |
| MedChemExpress: HY-N0909 | Notoginsenoside R2 | 955.4855 | MedChemExpress: HY-112171 | γ-L-Glutamyl-L-alanine | 985.9057 |
| MedChemExpress: HY-N2327 | Oleamide | 1128.919 | MedChemExpress: HY-Y0771 | 3,4-Dimethoxyphenylacetic acid | 891.1594 |
| MedChemExpress: HY-N0005 | Curcumin | 907.8746 | MedChemExpress: HY-W008452 | H-Tyr(3-I)-OH | 847.3153 |
| MedChemExpress: HY-B0394 | Atropine (sulfate monohydrate) | 1099.713 | MedChemExpress: HY-N2024A | Maltose monohydrate | 979.8529 |
| MedChemExpress: HY-N0731 | Genkwanin | 1240.361 | MedChemExpress: HY-W017230 | L-Cysteinesulfinic acid (monohydrate) | 850.5229 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N0416 | Cucurbitacin B | 789.0588 | MedChemExpress: HY-40135 | L-Hydroxyproline, BioReagent, suitable for cell culture | 933.7083 |
| MedChemExpress: HY-B0892 | Benzyl alcohol | 918.5791 | MedChemExpress: HY-113411 | 3-Hydroxyglutaric acid | 1249.582 |
| MedChemExpress: HY-N0722 | Neochlorogenic acid | 1024.869 | MedChemExpress: HY-N0391 | L-Citrulline | 809.9531 |
| MedChemExpress: HY-B2209A | Hydroxocobalamin (monohydrochloride) | 964.0454 | MedChemExpress: HY-F0002 | NADP (sodium salt) | 1085.491 |
| MedChemExpress: HY-B1716 | L-5-Hydroxytryptophan | 950.5763 | MedChemExpress: HY-A0100 | Thiamine monochloride | 929.7058 |
| MedChemExpress: HY-113469A | Cyclic GMP (sodium) | 1109.907 | MedChemExpress: HY-W015410 | Disodium succinate | 874.998 |
| MedChemExpress: HY-N0370 | Bergapten | 815.5338 | MedChemExpress: HY-N0470 | L-Lysine hydrochloride | 890.5892 |
| MedChemExpress: HY-N0786 | Ginkgolide J | 851.9184 | MedChemExpress: HY-100804 | L-Cysteinesulfinic acid | 867.5137 |
| MedChemExpress: HY-N2896 | Arjunolic acid | 761.4994 | MedChemExpress: HY-N2559 | Maltohexaose | 977.7036 |
| MedChemExpress: HY-N2056 | 11-Keto-beta-boswellic acid | 826.4636 | MedChemExpress: HY-113380 | (S)-b-aminoisobutyric acid | 859.5436 |
| MedChemExpress: HY-N0643 | Carnosol | 1134.624 | MedChemExpress: HY-N0666C | L-Aspartic aicd (sodium) | 1026.622 |
| MedChemExpress: HY-W015641 | 2,2-Dimethylsuccinic acid | 994.432 | MedChemExpress: HY-N2514 | α-Lactose | 963.7922 |
| MedChemExpress: HY-N1860 | 3-O-Methylquercetin | 1189.372 | MedChemExpress: HY-113013 | Hydroxypyruvic acid | 1244.252 |
| MedChemExpress: HY-113239 | Hydroxycotinine | 802.5945 | MedChemExpress: HY-N0455A | L-Arginine (hydrochloride) | 1273.102 |
| MedChemExpress: HY-N2535 | Coniferaldehyde | 1169.824 | MedChemExpress: HY-N0464 | D-(−)-Quinic acid | 827.4863 |
| MedChemExpress: HY-113298 | Citraconic acid | 914.7322 | MedChemExpress: HY-N8461 | Reuterin | 1125.363 |
| MedChemExpress: HY-W014130 | N-Acetyl-L-arginine | 1043.684 | MedChemExpress: HY-Y0127 | D(−)-2-Aminobutyric acid | 841.3954 |
| MedChemExpress: HY-B0445 | NAD+ | 662.6014 | MedChemExpress: HY-N0390 | L-Glutamine | 692.9123 |
| MedChemExpress: HY-N0281 | Daphnetin | 1198.778 | MedChemExpress: HY-N0667 | L-Asparagine | 749.3036 |
| MedChemExpress: HY-B0522 | Ampicillin | 986.5094 | MedChemExpress: HY-D0845 | Nitrosoglutathione | 688.3783 |
| MedChemExpress: HY-77813 | Benzyl isothiocyanate | 910.0522 | MedChemExpress: HY-N0717 | L-Valine | 688.2338 |
| MedChemExpress: HY-113267 | Dihydrofolic acid | 1169.779 | MedChemExpress: HY-113056A | N1-Acetylspermidine (hydrochloride) | 749.526 |
| MedChemExpress: HY-N8055 | Bancroftinone | 1133.792 | MedChemExpress: HY-N0457 | Chicoric acid | 1008.153 |
| MedChemExpress: HY-113325 | NADP | 1113.421 | MedChemExpress: HY-111951 | D-Panose | 982.4149 |
| MedChemExpress: HY-101409A | O-Acetyl-L-serine (hydrochloride) | 1013.207 | MedChemExpress: HY-45609 | L-Cysteine S-sulfate (sodium hydrate) | 1159.859 |
| MedChemExpress: HY-N0738 | Stachydrine hydrochloride | 915.6673 | MedChemExpress: HY-W013573 | S-Allyl-L-cysteine | 686.1385 |
| MedChemExpress: HY-B0178A | Guanidine (hydrochloride) | 1252.71 | MedChemExpress: HY-P0186A | Endomorphin 2 (TFA) | 1181.104 |
| MedChemExpress: HY-W009081 | Tricosanoic acid | 1039.233 | MedChemExpress: HY-N0913A | Isomaltotriose | 897.0005 |
| MedChemExpress: HY-N0160 | Kinetin | 1069.815 | MedChemExpress: HY-34516 | D-Ornithine (hydrochloride) | 1116.395 |
| MedChemExpress: HY-N0225 | (−)-Epigallocatechin | 928.0708 | MedChemExpress: HY-113378 | 3-Hydroxybutyric acid | 1129.967 |
| MedChemExpress: HY-N0779 | Isosilybin | 921.7702 | MedChemExpress: HY-N0109 | Salidroside | 703.1377 |
| MedChemExpress: HY-N6963 | Choerospondin | 1121.626 | MedChemExpress: HY-N0184A | Dipotassium glycyrrhizinate | 1090.475 |
| MedChemExpress: HY-N1446 | Oleic acid | 831.6362 | MedChemExpress: HY-F0002A | NADP (disodium salt) | 762.8961 |
| MedChemExpress: HY-113427 | trans-Vaccenic acid | 932.0426 | MedChemExpress: HY-119543 | O-Succinyl-L-homoserine | 1010.481 |
| MedChemExpress: HY-N2472 | Medicagenic acid | 975.8957 | MedChemExpress: HY-B1744 | Pyridoxal phosphate | 900.7177 |
| MedChemExpress: HY-113289 | Brassicasterol | 931.4963 | MedChemExpress: HY-N1446B | Sodium oleate | 925.2134 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N0415 | Trigonelline (chloride) | 1012.372 | MedChemExpress: HY-116284 | Methyl β-D-glucopyranoside | 1077.056 |
| MedChemExpress: HY-113277 | 3-Methyladipic acid | 819.9749 | MedChemExpress: HY-B0631 | Alendronic acid | 1013.119 |
| MedChemExpress: HY-101952 | Prostaglandin E2 | 1264.564 | MedChemExpress: HY-14258A | Escitalopram (oxalate) | 1201.573 |
| MedChemExpress: HY-113026 | Delta-Tocopherol | 1328.881 | MedChemExpress: HY-B0522B | Ampicillin (trihydrate) | 846.9314 |
| MedChemExpress: HY-B1556 | Benzyl salicylate | 985.0357 | MedChemExpress: HY-N0404 | Sinigrin | 1002.884 |
| MedChemExpress: HY-76225 | Ammonium glycyrrhizinate | 1010.523 | MedChemExpress: HY-N0229 | L-Alanine | 643.8476 |
| MedChemExpress: HY-B0158 | Cytidine | 758.0709 | MedChemExpress: HY-15130 | DL-O-Phosphoserine | 728.85 |
| MedChemExpress: HY-113202 | Stearoylcarnitine | 900.7392 | MedChemExpress: HY-B0351 | Taurine | 842.028 |
| MedChemExpress: HY-N4142 | Cyanidin-3-O-galactoside (chloride) | 953.1035 | MedChemExpress: HY-40136 | cis-4-Hydroxy-L-proline | 944.0714 |
| MedChemExpress: HY-N0697 | Crocin | 1338.047 | MedChemExpress: HY-106950A | Fosfructose (trisodium) | 1022.707 |
| MedChemExpress: HY-W011956 | 6-Hydroxymelatonin | 976.0382 | MedChemExpress: HY-14860 | 1-Deoxynojirimycin | 1029.468 |
| MedChemExpress: HY-17462 | Adrenosterone | 757.5347 | MedChemExpress: HY-114245 | Se-Methylselenocysteine | 889.6084 |
| MedChemExpress: HY-B0150 | Nicotinamide | 940.3634 | MedChemExpress: HY-100808 | D-Serine | 996.7927 |
| MedChemExpress: HY-N0339 | Syringic acid | 793.4388 | MedChemExpress: HY-W010970 | 5'-Guanylic acid (disodium salt) | 910.9839 |
| MedChemExpress: HY-W004261 | Nonadecanoic acid | 591.1487 | MedChemExpress: HY-N0832 | L-Histidine | 782.5529 |
| MedChemExpress: HY-W002110 | Isohomovanillic acid | 1060.172 | MedChemExpress: HY-B1000 | Selenomethionine | 1007.239 |
| MedChemExpress: HY-N1469 | Kaurenoic acid | 863.4076 | MedChemExpress: HY-30004 | 1-Aminocyclopropane-1-carboxylic acid | 796.6717 |
| MedChemExpress: HY-N5077 | Sinapine | 1084.597 | MedChemExpress: HY-I1060 | L-Alloisoleucine | 1102.403 |
| MedChemExpress: HY-N5127 | Nonacosane | 1064.291 | MedChemExpress: HY-113402 | Gamma-glutamylcysteine | 653.5504 |
| MedChemExpress: HY-B1125 | Glucosamine | 724.886 | MedChemExpress: HY-Y0252 | L-Proline | 1004.063 |
| MedChemExpress: HY-N0358 | 1,4-Dicaffeoylquinic acid | 794.8464 | MedChemExpress: HY-B1204 | Histamine | 810.6531 |
| MedChemExpress: HY-N6667 | Glucovanillin | 819.6719 | MedChemExpress: HY-113075 | 1,5-Anhydrosorbitol | 1053.017 |
| MedChemExpress: HY-113110A | Cysteinylglycine (TFA) | 954.0897 | MedChemExpress: HY-A0181A | Adenosine 5'-monophosphate monohydrate | 920.9967 |
| MedChemExpress: HY-W015061 | Phenylacetylglycine | 709.6029 | MedChemExpress: HY-113066A | Guanosine 5'-diphosphate (disodium salt) | 957.0248 |
| MedChemExpress: HY-W008253 | 5-Hydroxyindole-3-acetic acid | 1051.332 | MedChemExpress: HY-N5034 | Phosphorylethanolamine | 919.5627 |
| MedChemExpress: HY-N0639 | Punicalin | 818.9774 | MedChemExpress: HY-128965 | N-Glycolylneuraminic acid | 1126.23 |
| MedChemExpress: HY-113344 | 16a-Hydroxyestrone | 1194.606 | MedChemExpress: HY-W009162 | Cytidine 5'-monophosphate | 829.445 |
| MedChemExpress: HY-N0703 | Schaftoside | 900.214 | MedChemExpress: HY-W012790 | Sodium 2-hydroxybutanoate | 851.898 |
| MedChemExpress: HY-N0169 | Hyodeoxycholic acid | 761.6081 | MedChemExpress: HY-W006371 | (2-Aminoethyl)phosphonic acid | 914.5342 |
| MedChemExpress: HY-N0378 | D-Mannitol | 894.6274 | MedChemExpress: HY-W011690 | L-Homocystine | 1056.037 |
| MedChemExpress: HY-N0113 | Hordenine | 1057.467 | MedChemExpress: HY-N0658 | L-Threonine | 1040.183 |
| MedChemExpress: HY-N0295 | Protocatechualdehyde | 988.7553 | MedChemExpress: HY-N0130 | Shikimic acid | 966.6083 |
| MedChemExpress: HY-N0106 | Danshensu (sodium salt) | 948.7665 | MedChemExpress: HY-W013673 | 2,3-Diaminopropionic acid hydrochloride | 1119.42 |
| MedChemExpress: HY-N0772 | Isomangiferin | 1007.875 | MedChemExpress: HY-128374 | D-Glucose 6-phosphate (disodium salt) | 1238.699 |
| MedChemExpress: HY-N3980 | Guaiol | 919.8918 | MedChemExpress: HY-113596 | Acetyl Coenzyme A (trisodium) | 1209.897 |
| MedChemExpress: HY-W011552 | 2'-O-Methyladenosine | 933.0337 | MedChemExpress: HY-108213 | Inosinic acid | 861.6618 |

TABLE 6-continued

Screened Compounds from the Food-Sourced Compound Library for lipase inhibition activity on stored human milk samples.

Food-Sourced Compound Library

| Library Code | Compound | Lipase (RFU) | Library Code | Compound | Lipase (RFU) |
|---|---|---|---|---|---|
| MedChemExpress: HY-W040971 | Creosol | 462.1743 | MedChemExpress: HY-W013093 | Uridine triphosphate (trisodium salt) | 1122.184 |
| MedChemExpress: HY-N7090 | Benzyl cinnamate | 938.2773 | MedChemExpress: HY-B0739A | Citicoline (sodium) | 965.9573 |
| MedChemExpress: HY-Y0069 | N-Acetylglycine | 915.7026 | MedChemExpress: HY-W008385 | H-HoArg-OH | 745.4822 |
| MedChemExpress: HY-W017162 | DL-3-Phenyllactic acid | 814.8931 | MedChemExpress: HY-N0469 | L-Lysine | 1310.906 |
| MedChemExpress: HY-N0774 | Isofraxidin | 929.2612 | MedChemExpress: HY-N0666 | L-Aspartic acid | 1047.068 |
| MedChemExpress: HY-W067358 | 2-Methylpyrazine | 1063.144 | MedChemExpress: HY-Y0124 | NSC 16590 | 754.9408 |
| MedChemExpress: HY-N0660 | Jujuboside B | 877.6814 | MedChemExpress: HY-113227 | Oxoadipic acid | 732.376 |
| MedChemExpress: HY-128389 | 1-Furfurylpyrrole | 885.6943 | MedChemExpress: HY-W016734 | 2-Amino-5-ureidopentanoic acid | 983.9261 |
| MedChemExpress: HY-N0474 | Tyrosol | 831.18 | MedChemExpress: HY-W040821 | DL-Homocysteine | 816.4846 |
| MedChemExpress: HY-N6601 | Pomolic acid | 813.0722 | MedChemExpress: HY-113076 | Thiamine pyrophosphate | 823.7716 |
| MedChemExpress: HY-W041019 | 5-Hydroxytryptophol | 681.6533 | MedChemExpress: HY-113011 | Maltotriose | 1104.158 |
| MedChemExpress: HY-N7436 | Methyl propyl disulfide | 867.7604 | MedChemExpress: HY-N0215 | L-Phenylalanine | 970.364 |
| MedChemExpress: HY-W008820 | Glutaric acid | 944.8681 | MedChemExpress: HY-Y0966 | Glycine | 862.6413 |
| MedChemExpress: HY-W009444 | 5-Methyluridine | 808.3751 | MedChemExpress: HY-N0455 | L-Arginine | 913.1858 |
| MedChemExpress: HY-N1471 | Liquiritin apioside | 875.5815 | MedChemExpress: HY-113093 | Ethyl glucuronide | 1053.076 |
| MedChemExpress: HY-W008638 | 2'-Deoxyinosine | 1081.215 | MedChemExpress: HY-W006057A | Sodium 3-methyl-2-oxobutanoate | 1025.486 |
| MedChemExpress: HY-Y0136 | 3-Indoleacetonitrile | 1163.227 | MedChemExpress: HY-W041171 | 3-Chloro-L-tyrosine | 1117.619 |
| MedChemExpress: HY-N6662 | (+)-Longifolene | 1228.195 | MedChemExpress: HY-W015878 | 5-Aminovaleric acid | 867.767 |
| MedChemExpress: HY-100582 | Ribitol | 769.1821 | MedChemExpress: HY-42068 | (−)-Aspartic acid | 911.1368 |
| MedChemExpress: HY-Y1069 | (S)-Malic acid | 818.4693 | MedChemExpress: HY-Y0511 | N-Methylsarcosine | 998.6616 |
| MedChemExpress: HY-W013014 | 3-Methyl-2-cyclopenten-1-one | 916.3953 | MedChemExpress: HY-D0885B | Phosphocreatine (disodium) | 1215.029 |
| MedChemExpress: HY-N0060 | Ferulic acid | 805.3139 | MedChemExpress: HY-N3021 | D-chiro-Inositol | 896.4132 |
| MedChemExpress: HY-N6829 | Retusin | 1044.45 | MedChemExpress: HY-W016628 | L-Gulono-1,4-lactone | 1139.877 |
| MedChemExpress: HY-121305A | L-Ribulose | 1193.604 | MedChemExpress: HY-125773 | β-cyano-L-Alanine | 869.3786 |
| MedChemExpress: HY-N1745 | 2'-O-Methylisoliquiritigenin | 1065.494 | MedChemExpress: HY-D0889 | Glycylglycine | 704.4034 |
| MedChemExpress: HY-W015224 | Methyl 2-(1H-indol-3-yl)acetate | 1039.458 | MedChemExpress: HY-113304A | (S)-3,4-Dihydroxybutyric acid (lithium hydrate) | 1007.624 |
| MedChemExpress: HY-N1428 | Citric acid | 762.2073 | MedChemExpress: HY-W013100 | Cytidine-5'-triphosphate (disodium) | 1141.901 |
| MedChemExpress: HY-N0451 | Acacetin | 763.9998 | MedChemExpress: HY-W012974 | 3-Amino-2-methylpropanoic acid | 1055.242 |
| MedChemExpress: HY-N0194 | Asiatic acid | 809.8605 | MedChemExpress: HY-N1132A | D-(+)-Trehalose dihydrate | 1045.976 |
| MedChemExpress: HY-101402A | Cyclo(his-pro) (TFA) | 956.1787 | MedChemExpress: HY-Y1088 | Hydrocinnamic acid | 949.1673 |
| MedChemExpress: HY-N0543 | Allantoin | 1073.817 | MedChemExpress: HY-W015114 | L-2-Hydroxyglutaric acid (disodium) | 928.8198 |
| MedChemExpress: HY-N0943 | (−)-Epiafzelechin | 915.141 | MedChemExpress: HY-Y0337 | L-Cysteine | 937.0882 |
| MedChemExpress: HY-13518 | Piceatannol | 1246.173 | MedChemExpress: HY-17564 | 2'-Deoxycytidine (hydrochloride) | 810.1072 |
| MedChemExpress: HY-W012732 | Isoquinoline | 1006.367 | MedChemExpress: HY-B0739 | Citicoline | 986.1863 |
| MedChemExpress: HY-W009948 | Vanillin acetate | 814.1248 | MedChemExpress: HY-113101 | 2-Hydroxyadipic acid | 1079.818 |
| MedChemExpress: HY-N1497 | Plumbagin | 841.9499 | MedChemExpress: HY-128744 | Phosphonoacetic acid | 1174.468 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N1926 | Dihydrocoumarin | 1173.676 | MedChemExpress: HY-N0650 | L-Serine | 1099.786 |
| MedChemExpress: HY-N7124 | Benzyl acetate | 947.1435 | MedChemExpress: HY-113334 | Turanose | 697.9672 |
| MedChemExpress: HY-N6602 | α-Solanine | 840.4474 | MedChemExpress: HY-113426 | Nepsilon-Acetyl-L-lysine | 1188.891 |
| MedChemExpress: HY-N0228 | Scoparone | 1169.704 | MedChemExpress: HY-113278 | Leucyl-phenylalanine | 1012.085 |
| MedChemExpress: HY-W013627 | trans, trans-2,4-Decadienal | 635.5627 | MedChemExpress: HY-N1495 | Maltopentaose | 907.876 |
| MedChemExpress: HY-W016979 | δ-Decalactone | 1070.795 | MedChemExpress: HY-B2233 | Phosphorylcholine (chloride) | 831.0181 |
| MedChemExpress: HY-W001083 | 3-Hydroxyphenylacetic acid | 1127.603 | MedChemExpress: HY-W013046 | Phosphoribosyl pyrophosphate (pentasodium) | 842.0022 |
| MedChemExpress: HY-Y1139 | Pimelic acid | 945.6384 | MedChemExpress: HY-B1776A | Spermidine (hydrochloride) | 1065.533 |
| MedChemExpress: HY-Y0989 | Acetophenone | 830.3825 | MedChemExpress: HY-N1132 | D-(+)-Trehalose | 909.0228 |
| MedChemExpress: HY-W015590 | 2-Hydroxyphenylacetic acid | 818.0796 | MedChemExpress: HY-112052 | Aminomalonic acid | 801.3808 |
| MedChemExpress: HY-W013812 | Ethyl linoleate | 1142.329 | MedChemExpress: HY-B0166A | L-Ascorbic acid (sodium salt) | 1100.764 |
| MedChemExpress: HY-N0787 | Cryptochlorogenic acid | 1264.679 | MedChemExpress: HY-W017006 | 1-Methyl-L-histidine | 1205.202 |
| MedChemExpress: HY-W010510 | DL-Norvaline | 939.3139 | MedChemExpress: HY-129380 | Fructosyl-lysine | 1233.156 |
| MedChemExpress: HY-N3307 | (+)-Medioresinol | 1166.732 | MedChemExpress: HY-W016813 | trans-Aconitic acid | 946.0721 |
| MedChemExpress: HY-N0445 | 2-Hydroxy-4-methoxybenzaldehyde | 1139.589 | MedChemExpress: HY-113143A | Galactose 1-phosphate Potassium salt | 1112.021 |
| MedChemExpress: HY-N0610 | trans-Cinnamic acid | 967.1549 | MedChemExpress: HY-113168 | Butyrylcarnitine | 646.7147 |
| MedChemExpress: HY-N0600 | Ginsenoside F3 | 878.0505 | MedChemExpress: HY-113128 | sn-Glycerol 3-phosphate | 1219.971 |
| MedChemExpress: HY-W017077 | 4-Methylbiphenyl | 986.6554 | MedChemExpress: HY-128746 | 2,6-Diaminoheptanedioic acid | 846.2971 |
| MedChemExpress: HY-W027555 | Ethoxyacetic acid | 998.8039 | MedChemExpress: HY-B2176A | ATP (disodium trihydrate) | 947.4309 |
| MedChemExpress: HY-W007376 | Indole-3-carboxaldehyde | 925.3793 | MedChemExpress: HY-N0771 | L-Isoleucine | 947.064 |
| MedChemExpress: HY-N2223 | Ganoderol B | 970.7443 | MedChemExpress: HY-125818 | Cytidine-5'-triphosphate | 509.7291 |
| MedChemExpress: HY-W006492 | 5a-Pregnane-3,20-dione | 1117.705 | MedChemExpress: HY-N2464 | Maltotetraose | 824.2713 |
| MedChemExpress: HY-113201 | Tetradecanoylcarnitine | 951.8251 | MedChemExpress: HY-W002105 | 2,5-Furandicarboxylic acid | 840.5751 |
| MedChemExpress: HY-N0595 | Genistin | 1023.483 | MedChemExpress: HY-111827 | S-1-Propenyl-L-cysteine | 971.5635 |
| MedChemExpress: HY-B1899A | Taurodeoxycholic acid (sodium hydrate) | 1000.218 | MedChemExpress: HY-136648A | 2'-Deoxyadenosine-5'-triphosphate (trisodium) | 787.6266 |
| MedChemExpress: HY-W012926 | Dihydrouracil | | MedChemExpress: HY-19696 | Tauroursodeoxycholate | |
| MedChemExpress: HY-126050 | (R)-Pantetheine | | MedChemExpress: HY-Y0017 | L-Norleucine | |
| MedChemExpress: HY-Y0073 | 4-Hydroxyacetophenone | | MedChemExpress: HY-Y0669 | Pipecolic acid | |
| MedChemExpress: HY-N0523A | Gallic acid (hydrate) | 709.0148 | MedChemExpress: HY-101411 | 4-Acetamidobutanoic acid | 1163.164 |
| MedChemExpress: HY-N2609 | 7,4'-Dihydroxyflavone | 997.8526 | MedChemExpress: HY-N0325 | DL-Methionine | 657.4944 |
| MedChemExpress: HY-W018392 | Phthalic acid mono-2-ethylhexyl ester | 998.7071 | MedChemExpress: HY-113354 | Anserine | 1023.923 |
| MedChemExpress: HY-W004049 | 3-Hydroxybenzoic acid | 901.3799 | MedChemExpress: HY-N0648 | Monotropein | 976.474 |
| MedChemExpress: HY-N0174 | Cryptotanshinone | 1132.442 | MedChemExpress: HY-W009390 | DL-Homocystine | 704.0257 |
| MedChemExpress: HY-N5091 | Physcion 8-O-β-D-glucopyranoside | 1118.232 | MedChemExpress: HY-15121 | L-Theanine | 866.4579 |
| MedChemExpress: HY-W015954 | (2R,3R)-Butane-2,3-diol | 932.5003 | MedChemExpress: HY-W010737 | Guanosine-5'-triphosphate (disodium salt) | 1164.099 |
| MedChemExpress: HY-N1427A | Glycodeoxycholic acid (monohydrate) | 1203.201 | MedChemExpress: HY-A0129 | Histamine (phosphate) | 856.2289 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-N0154 | Neohesperidin dihydrochalcone | 792.3552 | MedChemExpress: HY-100587 | D-Glutamine | 1027.219 |
| MedChemExpress: HY-W012634 | Benzothiazole | 822.2955 | MedChemExpress: HY-100542 | D-α-Hydroxyglutaric acid (disodium) | 895.488 |
| MedChemExpress: HY-113466 | 4-Hydroxynonenal | 827.4103 | MedChemExpress: HY-B1581A | L-Canavanine sulfate | 903.0256 |
| MedChemExpress: HY-N0512 | Loganin | 996.2712 | MedChemExpress: HY-W010104A | Methionine sulfoxide | 1067.927 |
| MedChemExpress: HY-N2506 | Ginsenoside Ra1 | 815.381 | MedChemExpress: HY-16502 | Transcrocetinate disodium | 971.7624 |
| MedChemExpress: HY-N5052 | Asiaticoside B | 842.3468 | MedChemExpress: HY-Y0337A | L-Cysteine (hydrochloride) | 1023.471 |
| MedChemExpress: HY-W001996 | 6-Hydroxynicotinic acid | 655.7069 | MedChemExpress: HY-Y1314 | Dimethyl sulfone | 871.2068 |
| MedChemExpress: HY-N6787 | 5,6-Dihydro-5-methyluracil | 1007.407 | MedChemExpress: HY-13694 | Methionine | 1064.048 |
| MedChemExpress: HY-Y0262 | Oxalic Acid | 839.6453 | MedChemExpress: HY-B1290 | 2-Phenylethanol | 949.3028 |
| MedChemExpress: HY-W019838 | D-Erythro-dihydrosphingosine | 1051.007 | MedChemExpress: HY-B1654A | Flavin adenine dinucleotide (disodium salt) | 1000.841 |
| MedChemExpress: HY-Y0781 | Pyruvic acid | 964.4253 | MedChemExpress: HY-N0067 | γ-Aminobutyric acid | 759.3982 |
| MedChemExpress: HY-N3243 | Moracin P | 751.9577 | MedChemExpress: HY-W010388 | Creatine | 1063.581 |
| MedChemExpress: HY-W015346 | Desaminotyrosine | 1140.163 | MedChemExpress: HY-75087 | (R)-pyrrolidine-2-carboxylic acid | 741.8848 |
| MedChemExpress: HY-N1579 | Pyrogallol | 896.8381 | MedChemExpress: HY-13005 | Fagomine | 1239.347 |
| MedChemExpress: HY-N1457 | Chrysosplenetin | 1129.025 | MedChemExpress: HY-W018004 | L-Homocitrulline | 822.9997 |
| MedChemExpress: HY-N8172 | (+)-Secoisolariciresinol | 1148.179 | MedChemExpress: HY-113329 | Guanidinoethyl sulfonate | 955.0282 |
| MedChemExpress: HY-W008646 | 7,8-Dihydro-L-biopterin | 1090.909 | MedChemExpress: HY-W010918 | Adenosine 5'-diphosphate | 861.1249 |
| MedChemExpress: HY-W007346 | m-Anisaldehyde | 1038.646 | MedChemExpress: HY-W040240 | (3S,4R,5S)-1,3,4,5,6-Pentahydroxyhexan-2-one | 1003.563 |
| MedChemExpress: HY-N2358 | Blumeatin | 847.8117 | MedChemExpress: HY-W012734 | L-Pipecolic acid | 928.0856 |
| MedChemExpress: HY-N0133 | Tangeretin | 1368.296 | MedChemExpress: HY-N7107 | Fenchyl alcohol | 896.4423 |
| MedChemExpress: HY-126477 | NNK | 875.4752 | MedChemExpress: HY-N1178 | Taraxasterol | 974.5848 |
| MedChemExpress: HY-Y0271 | Urea | 864.3039 | MedChemExpress: HY-113494 | Stigmastanol | 913.2074 |
| MedChemExpress: HY-W017370 | Carveol | 757.9921 | MedChemExpress: HY-Y0304 | Dibutyl phthalate | 1035.24 |
| MedChemExpress: HY-N0606 | Ginsenoside Rh3 | 860.9585 | MedChemExpress: HY-N4103 | Fucosterol | 973.5706 |
| MedChemExpress: HY-113147A | L-Palmitoylcarnitine (chloride) | 801.5612 | MedChemExpress: HY-109506 | DPPC | 959.6761 |
| MedChemExpress: HY-B2123 | Lactose | 912.5223 | MedChemExpress: HY-113279 | 7-Dehydrocholesterol | 820.8412 |
| MedChemExpress: HY-101407 | Nicotinamide N-oxide | 920.4201 | MedChemExpress: HY-B1384 | Retinyl palmitate | 860.1081 |
| MedChemExpress: HY-N0623 | L-Tryptophan | 1239.076 | MedChemExpress: HY-113162 | Bovinic acid | 957.9803 |
| MedChemExpress: HY-W011303 | Phytosphingosine | 986.6872 | MedChemExpress: HY-N1459 | Campesterol | 912.1206 |
| MedChemExpress: HY-P1701 | Morphiceptin | 1251.045 | MedChemExpress: HY-N0177 | Diosgenin | 1107.594 |
| MedChemExpress: HY-N6996 | Methyl Eugenol | 684.1071 | MedChemExpress: HY-Y0189 | Methyl Salicylate | 864.5301 |
| MedChemExpress: HY-W004286 | Methyl laurate | 915.378 | MedChemExpress: HY-W032022 | 1-Hexanol | 1051.532 |
| MedChemExpress: HY-N0610A | Cinnamic acid | 937.8232 | MedChemExpress: HY-113224 | Desmosterol | 1192.638 |
| MedChemExpress: HY-B0151 | Pregnenolone | 933.0261 | MedChemExpress: HY-100196 | Pyrroloquinoline quinone | 875.608 |
| MedChemExpress: HY-113418 | Beta-Cortol | 1187.574 | MedChemExpress: HY-20685 | Palmitoylethanolamide | 929.4609 |
| MedChemExpress: HY-W017770 | S-Adenosyl-L-methionine (disulfate tosylate) | 726.0141 | MedChemExpress: HY-Y0569C | Potassium Gluconate | 888.9701 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-W017522 | Adipic acid | 1106.278 | MedChemExpress: HY-113217 | Cholesteryl oleate | 988.5488 |
| MedChemExpress: HY-N0324 | Cholic acid | 886.7213 | MedChemExpress: HY-121447 | Heneicosanoic acid | 1102.093 |
| MedChemExpress: HY-N0368 | Linalool | 1079.674 | MedChemExpress: HY-B1247 | Protoporphyrin IX | 1028.57 |
| MedChemExpress: HY-129623 | Ethyl nonanoate | 1164.339 | MedChemExpress: HY-112624 | Dextran | 949.1554 |
| MedChemExpress: HY-N0622 | Morusin | 883.3222 | MedChemExpress: HY-101415 | Coenzyme Q9 | 1106.833 |
| MedChemExpress: HY-B0355 | Ginkgolide A | 772.6433 | MedChemExpress: HY-113365 | Cholestenone | 787.5717 |
| MedChemExpress: HY-N0076 | Bilobalide | 1114.018 | MedChemExpress: HY-W016784 | Indole-3-acetamide | 788.953 |
| MedChemExpress: HY-N8016 | Nonanal | 941.7523 | MedChemExpress: HY-113294 | 3-Hydroxykynurenine | 1303.264 |
| MedChemExpress: HY-N0146 | Quercetin (dihydrate) | 1081.937 | MedChemExpress: HY-W012708 | 3-Amino-4-methylpentanoic acid | 1007.275 |
| MedChemExpress: HY-N0132 | Synephrine | 1134.338 | MedChemExpress: HY-A0070 | Liothyronine (sodium) | 679.7045 |
| MedChemExpress: HY-113138 | 3-Methyluridine | 1048.324 | MedChemExpress: HY-W018555 | D-Cysteine | 631.2532 |
| MedChemExpress: HY-N0773 | Isovitexin | 851.2752 | MedChemExpress: HY-W010736 | 1,2-Dipalmitoyl-sn-glycerol | 825.1995 |
| MedChemExpress: HY-N2195 | Nootkatone | 734.6904 | MedChemExpress: HY-N0068 | Solasodine | 1073.206 |
| MedChemExpress: HY-113377A | L-Glyceric acid (sodium) | 822.8712 | MedChemExpress: HY-13595 | Chrysophanol | 721.7513 |
| MedChemExpress: HY-N0016 | Glycitein | 869.1073 | MedChemExpress: HY-N0473 | L-Tyrosine | 1007.723 |
| MedChemExpress: HY-B1268 | Docusate (Sodium) | 1007.639 | MedChemExpress: HY-N2338 | Cholesterol myristate | 751.9361 |
| MedChemExpress: HY-W014787 | Decanedioic acid | 1153.062 | MedChemExpress: HY-113486 | Lathosterol | 1017.106 |
| MedChemExpress: HY-113435 | 8-Dehydrocholesterol | 707.3733 | MedChemExpress: HY-N0410 | Daucosterol | 990.8025 |
| MedChemExpress: HY-19657 | Oxypurinol | 1114.542 | MedChemExpress: HY-W013049 | Docosanoic acid | 1007.895 |
| MedChemExpress: HY-W002011 | Quinoline-2-carboxylic acid | 994.8984 | MedChemExpress: HY-B2130 | Uric acid | 923.7282 |
| MedChemExpress: HY-N7511 | O-Nornuciferine | 773.2053 | MedChemExpress: HY-N0790 | Lupeol | 752.6333 |
| MedChemExpress: HY-N2276 | Nodakenetin | 882.2828 | MedChemExpress: HY-N2574 | Gitogenin | 1155.179 |
| MedChemExpress: HY-B2136 | Tannic acid | 1076.036 | MedChemExpress: HY-N0073 | Sarsasapogenin | 952.9686 |
| MedChemExpress: HY-N0045 | Ginsenoside Rg1 | 1026.433 | MedChemExpress: HY-N0286 | Isoimperatorin | 919.4728 |
| MedChemExpress: HY-N1388 | Tussilagone | 870.5099 | MedChemExpress: HY-B0183 | Ellagic acid | 878.4604 |
| MedChemExpress: HY-N6648 | Cirsimaritin | 1060.157 | MedChemExpress: HY-N6677 | β-Apo-8'-carotenal | 851.8107 |
| MedChemExpress: HY-W048838 | Acetyl-L-lysine | 820.531 | MedChemExpress: HY-111647 | N2-Methylguanosine | 1090.144 |
| MedChemExpress: HY-B0215 | Acetylcysteine | 763.6539 | MedChemExpress: HY-N2365 | N-Benzylpalmitamide | 825.0433 |
| MedChemExpress: HY-W010615 | 2-Methylthiophene | 999.7036 | MedChemExpress: HY-N7624 | Methyl oleanonate | 912.7431 |
| MedChemExpress: HY-N1486 | Ursonic acid | 960.3937 | MedChemExpress: HY-Y1309 | 1-Naphthol | 738.6152 |
| MedChemExpress: HY-10201A | Sorafenib (Tosylate) | 986.7553 | MedChemExpress: HY-N1109 | Uvaol | 940.0027 |
| MedChemExpress: HY-N0292 | Oleuropein | 1046.316 | MedChemExpress: HY-W013078 | (2R)-3-(((2-Aminoethoxy)(hydroxy)phosphoryl)oxy)propane-1,2-diyl ditetradecanoate | 805.4396 |
| MedChemExpress: HY-16561 | Resveratrol | 1168.882 | MedChemExpress: HY-N0083 | Betulin | 1030.78 |
| MedChemExpress: HY-124151 | Adenosine-2'-monophosphate | 642.3973 | MedChemExpress: HY-N2176 | S-(+)-Marmesin | 984.7966 |
| MedChemExpress: HY-N0102 | Isoliquiritigenin | 1317.553 | MedChemExpress: HY-W089845 | Heneicosane | 867.307 |
| MedChemExpress: HY-N0825 | Nodakenin | 1007.32 | MedChemExpress: HY-107819 | 5α-Cholestan-3β-ol | 1041.979 |

TABLE 6-continued

Screened Compounds from the Food-Sourced Compound Library for lipase inhibition activity on stored human milk samples.
Food-Sourced Compound Library

| Library Code | Compound | Lipase (RFU) | Library Code | Compound | Lipase (RFU) |
|---|---|---|---|---|---|
| MedChemExpress: HY-W026772 | Fluorene | 1185.437 | MedChemExpress: HY-100196A | Pyrroloquinoline quinone (disodium salt) | 861.8531 |
| MedChemExpress: HY-B0315 | Vitamin B12 | 777.8387 | MedChemExpress: HY-14608 | L-Glutamic acid | 1096.087 |
| MedChemExpress: HY-B0131 | Prostaglandin E1 | 787.5664 | MedChemExpress: HY-W009749 | L-Cystathionine | 1266.889 |
| MedChemExpress: HY-129529 | 6-Hydroxyluteolin 7-glucoside | 1135.118 | MedChemExpress: HY-B1511 | Cyclic AMP | 1012.108 |
| MedChemExpress: HY-N2149 | Tomatidine | 1057.071 | MedChemExpress: HY-N0181 | Ergosterol | 678.6297 |
| MedChemExpress: HY-121471 | Chrysoeriol | 949.6425 | MedChemExpress: HY-101414 | L-DABA | 650.1144 |
| MedChemExpress: HY-135772 | 12-Ketodeoxycholic acid | 778.2255 | MedChemExpress: HY-N0171A | Beta-Sitosterol (purity >98%) | 1085.047 |
| MedChemExpress: HY-N2513 | β-Boswellic acid | 813.2666 | MedChemExpress: HY-N0171 | Beta-Sitosterol (purity >80%) | 1068.311 |
| MedChemExpress: HY-N0450 | Sinapine (thiocyanate) | 1052.349 | MedChemExpress: HY-N2339 | Cholesteryl behenate | 935.1979 |
| MedChemExpress: HY-W008097 | 3,3-Dimethylglutaric acid | 885.3754 | MedChemExpress: HY-N0355 | (+)-Catechin hydrate | 928.2252 |
| MedChemExpress: HY-B0586 | Methylcobalamin | 1187.639 | MedChemExpress: HY-100597 | Saponins | 822.0088 |
| MedChemExpress: HY-N2335 | Coumestrol | 869.5976 | MedChemExpress: HY-N7075 | Inulin | 805.6516 |
| MedChemExpress: HY-N0602 | Ginsenoside Rg2 | 1144.609 | MedChemExpress: HY-113485 | Melanin | 1158.061 |
| MedChemExpress: HY-113166 | Dodecanoylcarnitine | 868.7983 | MedChemExpress: HY-111830 | Lignin | 849.2641 |
| MedChemExpress: HY-W010201 | Citronellol | 760.9768 | MedChemExpress: HY-B1131 | Taurocholic acid (sodium salt hydrate) | 1010.119 |
| MedChemExpress: HY-101403 | N-(5-Aminopentyl)acetamide | 912.4909 | MedChemExpress: HY-114336 | Enocyanin | 1022.842 |
| MedChemExpress: HY-N2623 | Alloimperatorin | 601.2746 | MedChemExpress: HY-B1390B | Saccharin (sodium hydrate) | 906.3655 |
| MedChemExpress: HY-N1933 | Allocryptopine | 960.1838 | MedChemExpress: HY-107846 | Xylan | 1273.332 |
| MedChemExpress: HY-126854 | N-Acetyllactosamine | 846.7809 | MedChemExpress: HY-B2118 | Pancreatin | 1205.321 |
| MedChemExpress: HY-N0436 | Engeletin | 975.6839 | MedChemExpress: HY-N0814A | Phytic acid (dodecasodium hydrate) | 920.5233 |
| MedChemExpress: HY-N0010 | Geniposidic acid | 1012.071 | MedChemExpress: HY-W010735 | ATP (disodium salt hydrate) | 750.5023 |
| MedChemExpress: HY-B0141A | Alpha-Estradiol | 903.9156 | MedChemExpress: HY-B0633A | Hyaluronic acid | 1101.829 |
| MedChemExpress: HY-W037619 | Pteridine-2,4(1H,3H)-dione | 812.9137 | MedChemExpress: HY-101916 | Heparan Sulfate | 1097.057 |
| MedChemExpress: HY-W012946 | 2-Furoic acid | 1203.786 | MedChemExpress: HY-B2162 | Chondroitin (sulfate) | 714.418 |
| | | | MedChemExpress: HY-113511 | Glycogen, Mussel | 852.4002 |

Example 3. Validation of Single Compounds from Screen and Known Compounds to Determine Lipase Inhibition Activity, Glycerol Content and Antioxidant Maintenance Candidate compounds were selected from the screen and different sources of the compounds were further tested (Table 7). The compounds in Table 7 were added to fresh human milk and the samples were stored for 1 week at −20° C. The samples were thawed at room temperate and measured for lipolysis as described in Example 2 with select compounds tested for glycerol as described in Example 1. Additionally, select compounds were tested for total Antioxidant capacity using the Total Antioxidant Capacity: Total Antioxidant Capacity Assay Kit (Abcam; catalog #: ab65329) in accordance with the manufacturer's instructions and presented as a relative ratio compared to fresh human milk. Table 7 presents the results of lipase, glycerol, and total antioxidant capacity were tested on the single compounds. Lipase was considered inhibited with a RFU <400, glycerol was considered inhibited with an RLU <150,000, and total antioxidant capacity considered maintained with a ratio >0.75. Results presented in Table 7 represent a dose of 500 µg/mL for vitamin C, E and the carbonate/bicarbonates. All other compounds are at 20 mg/mL. Additionally, all compounds were tested for lipase and antioxidant capacity at multiple dilutions. Vitamins C, E, and the carbonate/bicarbonates were tested at 20 mg/mL, 10 mg/mL, 5 mg/mL, 2.5 mg/mL, 1.25 mg/ml, 0.625 mg/mL, and 0.313 mg/mL. All other compounds were tested at 500 µg/mL, 250 µg/mL, 125 µg/mL, 62.5 µg/mL, 31.25 µg/mL, 15.6 µg/mL, and 7.8 µg/mL. Exemplary results for lipase interaction are presented in FIG. 3A for xanthan gum, SureGel (infant thickener), laminarin, fucoidan, chondroitin sulfate, sunflower lectin, pectin (apple), pectin (low methoxyl), vitamin C, and vitamin E alone. Exemplary results for antioxidant capacity are presented in FIG. 3B for stored pectin. All compounds tested at 10 mg/ml followed by 2-fold serial dilutions. Vitamin C was tested at 350 µg/mL followed by 2-fold serial dilutions and vitamin E was tested at 15 µg/mL followed by 2-fold serial dilutions (FIG. 3)

Results: Surprisingly and unexpectedly, several compounds known to preserve and improve dairy milk products and the like, such as surfactants or emulsifiers that would reduce the interfacial tension between the oil/water phases and impede contact between lipases and fats, did not inhibit lipase or glycerol activity as expected. Carbonate/bicarbonates can act as buffering agents to counteract acidification, a treatment that is known to slow souring of cow's milk, and are often included in home-delivered milk products. Surprisingly, these compounds administered alone had no effect on lipase or glycerol on human milk samples. GelMix Infant thickener is a 3-ingredient infant product which include tapioca maltodextrin, carob gum, and calcium carbonate. The product acts by thickening liquids and had no effect on lipolysis in the human milk samples tested. Ultrasperse M, a cold water swelling (CWS) modified food starch derived from waxy maize used in cold temperature storage to refrigerate frozen foods and provide food stability, was tested. This product did not stabilize the human milk samples tested (i.e., did not inhibit lipase). Inulin is a plant-derived fiber with some emulsifying properties yet did not inhibit or slow human milk lipolysis as expected. Lastly, lecithin is a widely used food-safe surfactant and emulsifier added to dairy products and current infant formulas. Lecithin did not inhibit lipolysis alone, whereas, several different sources of pectin and pectin subunits unexpectedly inhibited lipase and/or glycerol production yet had no effect on total antioxidant capacity. Further, vitamin C and vitamin E had no effect on inhibiting lipase, yet maintained the milk's total antioxidant capacity. Lastly, surfactant such as Tween 20™ and Tween 80™ reduced lipase and glycerol production (Table 7 and FIG. 3).

TABLE 7

Lipase, Glycerol, and total Antioxidant capacity of candidate compounds.

| Compounds | Source | Use/Category | Lipase (RFU) | Glycerol (RLU) | Total Antioxidant Capacity |
|---|---|---|---|---|---|
| Tween20 | Velona | GRAS/food approved | 389.079 | 94118 | |
| Tween80 | Velona | GRAS/food approved | 447.139 | 113807 | |
| Lambda carageenan | Modernist Pantry | Approved for infant formula in US but not EU | 432.920 | 140894 | |
| Triton X-100 | Sigma | | 370.282 | 145670 | |
| Soy lecithin | Modernist Pantry | Approved for infant formula in US and EU | 791.623 | | |
| Sunflower lecithin | NOW | Approved for infant formula in US and EU | 728.592 | | |
| Mono and Diglyceride Flakes | Modernist Pantry | Approved for infant formula in US and EU | 261.504 | | |
| Inulin | Micro Ingredients Store | GRAS/food approved | 1006.043 | | |
| Tara gum | Modernist Pantry | Approved for infant formula in US and EU | 841.631 | | |
| Xanthan gum | Anthony's | Approved for infant formula in US and EU | 873.106 | | |
| Curdlan | EastChem | GRAS/food approved | 876.416 | | |
| Ultrasperse M - cold water swelling starch | Modernist Pantry | GRAS/food approved | 925.621 | | |
| Gelmix infant thickener for Breast milk | Gelmix | GRAS/food approved | 1040.129 | | |
| Okra powder | RETASTE Food Tech | GRAS/food approved | 1011.987 | | |
| Laminarin | Sigma | GRAS/food approved | 594.197 | | |
| Fucoidan from Macrocystis pyrifera | Sigma | GRAS/food approved | 384.150 | | |
| Pectin - Low/No sugar-required | Ball | Approved for infant formula in US and EU | 370.126 | | |
| Pectin - Original | Ball | Approved for infant formula in US and EU | 822.640 | | |
| Apple pectin | TUOTAI | Approved for infant formula in US and EU | 838.974 | 142165 | |
| Pectin - Low Methoxyl | Modernist Pantry | Approved for infant formula in US and EU | 862.635 | 89753 | |
| Pectin Amidated Low Methoxyl | Modernist Pantry | Approved for infant formula in US and EU | 839.167 | 74172 | |
| Pectin - High Methoxyl, Rapid Set | Modernist Pantry | Approved for infant formula in US and EU | 860.327 | 148954 | |
| β-D-Glucan from barley | Sigma | GRAS/food approved | 995.347 | | |
| β Glucan - 1,3/1,6 | BulkSupplements | GRAS/food approved | 942.984 | | |

TABLE 7-continued

Lipase, Glycerol, and total Antioxidant capacity of candidate compounds.

| Compounds | Source | Use/Category | Lipase (RFU) | Glycerol (RLU) | Total Antioxidant Capacity |
|---|---|---|---|---|---|
| N-Acetylneuraminic acid | Sigma | GRAS/food approved | 339.424 | | |
| Chondroitin Sulfate | BulkSupplements | GRAS/food approved | 348.836 | | |
| Trehalose | BulkSupplements | GRAS/food approved | 1128.012 | | |
| Vitamin C | It's Just! | Approved for infant formula in US and EU | 696.099 | | 2 |
| Vitamin E | BulkSupplements | Approved for infant formula in US and EU | 656.444 | | 2 |
| Phylloquinone | Sigma | Approved for infant formula in US and EU | 1038.691 | | |
| β-Carotene | Sigma | Approved for infant formula in US and EU | 816.493 | | |
| 6-O-Palmitoyl-L-ascorbic acid | Sigma | Approved for infant formula in US and EU | 796.394 | | |
| DL-α-Tocopherol acetate | Sigma | Approved for infant formula in US and EU | 697.673 | | |
| Sodium bicarbonate | Arm & Hammer | | 751.602 | | |
| Calcium carbonate | BulkSupplements | | 646.797 | | |
| Potassium bicarbonate | BulkSupplements | | 726.638 | | |
| Orlistat (known LPL inhibitor) | Sigma | OTC drug | 234.506 | | |
| (−)-Epigallocatechin Gallate | Cayman: 70935 | Antioxidant/Flavonoid | 333.087 | | |
| Tangeritin | Cayman: 10009911 | Antioxidant/Flavonoid | 1254.653 | | |
| Luteolin | Cayman: 10004161 | Antioxidant/Flavonoid | 292.778 | | |
| Rosmarinic Acid | Cayman: 70900 | Antioxidant/Flavonoid | 807.614 | | |
| Theaflavin-3-gallate | Cayman: 31510 | Antioxidant/Flavonoid | 960.743 | | |
| Ginkgetin | Cayman: 25103 | Antioxidant/Flavonoid | 267.381 | | |
| γ-Tocotrienol | Cayman: 10008494 | Vitamin E-type molecule | 665.753 | | |
| Quercetin | Cayman: 19866 | Antioxidant/Flavonoid | 803.814 | | |
| Lemon juice extract | Micro Ingredients Store | Antioxidant/Food/Pectin | 322.076 | 74962 | |
| N-acetylneuraminic acid | Sigma | | 395.436 | 90612 | |
| Apple peel powder | Organic Traditions | Pectin/Pectin subunit | 878.860 | 1092087 | |
| Apple powder | BulkSupplements | Pectin/Pectin subunit | 693.443 | 948252 | |
| Trigalacturonic acid | Sigma: T7407-25MG | Pectin/Pectin subunit | 352.972 | 61363 | |
| Digalacturonic acid | Sigma: D4288-25MG | Pectin/Pectin subunit | 264.075 | 61741 | |
| D-(+)-Galacturonic acid monohydrate | Sigma: 48280-5G-F | Pectin/Pectin subunit | 324.895 | 71322 | |
| Polygalacturonic acid | Sigma: 81325-50G | Pectin/Pectin subunit | 398.125 | 120477 | |
| Poly-D-galacturonic acid methyl ester (citrus) | Sigma: P9135-100G | Pectin/Pectin subunit | 320.660 | 122743 | |
| Poly-D-galacturonic acid methyl ester (apple) | Sigma: 93854-100G | Pectin/Pectin subunit | 611.342 | 643757 | |

Example 4. Synergistic Activity of Select Compounds Tested

Compounds that demonstrated activity on either lipase, glycerol, and/or antioxidant capacity were further tested for synergistic properties. The compounds tested are shown in Table 8 under the testing conditions as described in Example 3. Additionally, lysozyme activity was tested using the EnzChek™ Lysozyme Assay Kit (Thermo Fisher; catalog #: E22013) and Protease activity was tested using the EnzChek™ Protease Assay Kit (Thermo Fisher; catalog #E6638) according to the manufacturer's instructions. The results of Lysozyme and Protease activity are presented as a relative ratio compared to fresh human milks. Table 7 presents the results of lipase, glycerol, total antioxidant capacity, lysozyme activity and protease activity where tested. Lipase was considered inhibited with a RFU<400, glycerol production was considered inhibited with an RLU<150,000, total antioxidant capacity was considered maintained with a ratio >0.75, Lysozyme activity was considered maintained with a ratio of >0.75, and Protease activity considered maintained with a ratio of >0.75. All compounds were tested at 500 µg/mL, 250 µg/mL, 125

Additionally, FIG. 3A demonstrates the synergistic effect of the combination of pectin, vitamin C, and vitamin E on lipase activity when compared to vitamin C and E alone or in combination without pectin. Pectin also improves lipase inhibition with sunflower lectin, vitamin C and vitamin E compared to sunflower lectin, vitamin C and vitamin E in the absence of pectin (FIG. 3A).

Accordingly, these results demonstrate that the compositions of the present technology are useful for preserving human milk.

TABLE 8

Lipase, Glycerol, total Antioxidant capacity, Lysozyme Activity, and Protease Activity of candidate compounds.

| Compounds | Source | Lipase (RFU) | Glycerol (RLU) | Total Antioxidant Capacity | Lysozyme Activity | Protease Activity |
|---|---|---|---|---|---|---|
| Xanthan gum + Curdlan | Anthony's + EastChem | 667.923 | | | | |
| Sunflower lecithin + Inulin | NOW + Micro Ingredients Store | 633.000 | | | | |
| Ultrasperse M + Sunflower lecithin + Inulin | Modernist Pantry + NOW + Micro Ingredients Store | 725.911 | | | | |
| Pectin – No sugar-required + Sunflower lecithin | Ball + NOW | 394.897 | 701649 | 0.45 | 0.82 | 0.88 |
| Apple pectin + Sunflower lecithin | TUOTAI + NOW | 268.849 | 8598 | 0.57 | 0.76 | 0.83 |
| Vitamin C + Vitamin E | It's Just! + BulkSupplements | 828.548 | 9089 | 2 | 1.01 | 1.2 |
| Apple pectin + Sunflower lecithin + Vitamin C + Vitamin E | TUOTAI + NOW + It's Just! + BulkSupplements | 351.692 | 60579 | 2 | 1.01 | 0.91 |
| Apple pectin + Vitamin C + Vitamin E | TUOTAI + It's Just! + BulkSupplements | 327.842 | 74217 | 2 | 0.77 | 0.85 |

µg/mL, 62.5 µg/mL, 31.25 µg/mL, 15.6 µg/mL, and 7.8 g/mL, with vitamin C and vitamin E tested at 20 mg/mL, 10 mg/mL, 5 mg/mL, 2.5 mg/mL. 1.25 mg/mL, 0.625 mg/mL, and 0.313 mg/mL. Additionally, for vitamin C, and vitamin E in combination, pectin low methoxyl+vitamin C+vitamin E, sunflower lecithin+vitamin C+vitamin E, and sunflower lecithin+vitamin C+vitamin E+pectin low methoxyl was tested. (FIG. 3A) All compounds were tested at 10 mg/mL followed by 2-fold serial dilutions. Vitamin C was tested at 350 µg/mL followed by 2-fold serial dilutions and vitamin E was tested at 15 µg/mL followed by 2-fold serial dilutions (FIG. 3A).

Results: Table 8 demonstrates combination testing of exemplary compounds at 500 µg/mL for all compounds tested except for vitamin C and vitamin E which demonstrates results of 20 mg/mL. Surprisingly, the previously identified commercial compounds, such as lecithin, inulin, and ultrasparse M did not have synergistic effects with any of the compounds tested in combination, another unexpected finding, nor did these known compounds enhance the activity of the newly identified compounds. Additionally, pectin, vitamin C, and vitamin E unexpectedly demonstrate synergistic properties. Specifically, vitamin C and vitamin E alone or in combination did not have an inhibitory effect in lipase yet maintained antioxidant capacity (Table 7 and Table 8), whereas pectin alone (Table 7) had no effect on antioxidant maintenance but did inhibited lipase. Together, the three compounds demonstrate synergistic effect inhibiting lipase and maintaining total antioxidant capacity (Table 8).

Example 5. Testing Difference Types and Sources of Pectin and Galacturonic Acids Different types and sources of pectin were tested for lipase inhibition as described in Example 2. The compounds tested were apple pectin (sigma), apple pectin (TUOTAI), citrus pectin, lemon juice powder, apple peel powder, pectin (low methoxyl), galacturonic acid, di-galacturonic acid, tri-galacturonic acid, and apple pectin (TUOTAI)+vitamin C+vitamin E. The compounds were added to fresh human milk and the samples were stored for 1 week at −20° C. Concentrations tested for all pectins and galacturonic acids were at 10 mg/mL followed by seven 2-fold dilutions, for vitamin C 350 µg/mL followed by seven 2-fold dilutions and for vitamin E 150 µg/mL followed by seven 2-fold dilutions. Results demonstrate the most effective compound at inhibiting lipase activity was apple pectin (TUOTAI)+vitamin C+vitamin E, with different pectins varying in activity (FIG. 4).

Accordingly, these results demonstrate that different sources of pectin have different effects on inhibiting lipase activity and preserving human milk.

Example 6. Validation of Pectin, Vitamin C, and Vitamin E Formulation on Multiple Donors Formulations of apple pectin (TUOTAI)+vitamin C+vitamin E were mixed with freshly-expressed human milk from 14 different donors prior to being stored and frozen at −20° C. Samples were stored for 1 week and measured for fat breakdown and lipase inhibition as described in Example 2. The samples were treated with no formulation and then dose increases of 0.06%, 0.13%, 0.25%, and 1% pectin, 22 µg/mL, 44 µg/mL, 88 µg/mL, 176 µg/mL, and 352 µg/mL of vitamin C, and 11 µg/mL, 22 µg/mL, 44 µg/mL, 88 µg/mL, and 176 µg/mL of vitamin E, were added, respectively. Each sample from different donors had a dose dependent decrease of lipase activity during storage (FIG. 5).

Accordingly, these results demonstrate that the compositions of the present technology preserve the nutritional value, integrity, and overall structure of milk in numerous human milk samples from different donors.

Example 7. Effect of Pectin or Gum on Lipase Activity, Glycerol Content and Antioxidant Maintenance Candidate gums and pectins were selected that are commonly used as thickeners in infant foods (Table 9). The compounds in Table 9 were added to fresh human milk and the samples were stored for 1 week at −20° C. The samples were thawed at room temperature and measured for lipolysis as described in Example 2, tested for glycerol as described in Example 1, and tested for total antioxidant capacity as described in Example 3. Table 9 and FIG. 6 presents the effects of each compound on lipase, glycerol, and total antioxidant capacity on human milk. Lipase was considered inhibited with a RFU<400, glycerol was considered inhibited with an RLU<150,000, and total antioxidant capacity considered maintained with a ratio >0.75. Results presented in Table 9 and FIG. 6A-6C represent a dose of 0.5% w/v (5 mg) per 1 mL milk.

Results The tested gums are used as frequently as pectins as a source of thickeners in infant food. While antioxidant activity was unchanged between the tested gums and pectins (Table 9 and FIG. 6C), surprisingly, the tested pectins inhibited lipolysis and glycerol production whereas the tested gums displayed no effect (Table 9 and FIG. 6A-6B).

Accordingly, these results demonstrate that while both pectins and gums are used commonly in infant foods (i.e., infant formula) as thickeners, pectins have unexpected properties, such as inhibiting lipolysis and glycerol production in human milk, as compared to other commonly used thickeners.

TABLE 9

Lipase, Glycerol, total Antioxidant capacity of candidate gums and pectins

| Compounds | Source | Lipase (RFU) | Glycerol (RLU) | Total Antioxidant Capacity |
|---|---|---|---|---|
| Gum | | | | |
| Locust bean gum | Modernist Pantry | 1054.203 | 435487 | 0.55 |
| Guar gum | Modernist Pantry | 1075.199 | 744165 | 0.59 |
| Perfected guar gum | Modernist Pantry | 1061.697 | 838585 | 0.72 |
| Gum arabic | XPRS Nutra | 744.000 | 329275 | 0.64 |
| Pectin | | | | |
| GENU ® BETA pectin | CP-Kelco | 298.2859907 | 122962 | 0.68 |
| GENU ® Pectin LM-106-AS-YA | CP-Kelco | 351.39951 | 125410 | 0.6 |
| GENU ® Pectin Type YM-100-L | CP-Kelco | 358.399838 | 123836 | 0.72 |
| Pacific RSND Pectin | Pacific Pectin | 353.9000396 | 121772 | 0.64 |
| Pacific LM-104 Pectin | Pacific Pectin | 347.9991053 | 117819 | 0.54 |
| Pacific LM-12 Pectin | Pacific Pectin | 288.6006849 | 110331 | 0.71 |

Example 8. Validation of Pectin, Vitamin C, and Vitamin E Formulation on Unpasteurized Human Milk Compared with Pasteurized Human Milk 1 mL of unpasteurized human milk (raw human milk control; "RAW") and 1 mL of human milk pasteurized by either batch pasteurization ("BP"), high temperature short time pasteurization ("HTST"), ultra high temperature pasteurization ("UHT"), or ultra-pasteurization ("UP") was treated with a formulation of 5 mg of Pacific LM-104 Pectin+0.1014 mg of vitamin C+0.00406 IU (2.7 µg) of vitamin E or left untreated. Each sample was stored and frozen after treatment or non-treatment at −20° C. for 1 week.

The batch pasteurization was performed according to the FDA Grade "A" Pasteurized Milk Ordinance (2011) where 1 mL of raw human milk was transferred to a microcentrifuge tube and heated in a water bath to 63° C. for 30 minutes. The tube was removed and immediately cooled in an ice bath. The high temperature short time pasteurization was performed according to the FDA Grade "A" Pasteurized Milk Ordinance (2011) where 1 mL of raw human milk was transferred to a microcentrifuge tube and heated in a water bath to 72° C. for 15 seconds. The tube was removed and immediately cooled in an ice bath. The ultra high temperature pasteurization was performed as described in Lewis M. J., et al. (2012). 1 mL of raw human milk was transferred to a microcentrifuge tube and heated in a water bath to 138° C. for 2 seconds. The tube was removed and immediately cooled in an ice bath. The ultra-pasteurization was performed according to the FDA Grade "A" Pasteurized Milk Ordinance (2011) where 1 mL of raw human milk was transferred to a microcentrifuge tube, heated in a water bath to 90° C. for 1 second. The tube was removed and immediately cooled in an ice bath.

All samples were thawed and measured for lipolysis as described in Example 2, tested for glycerol as described in Example 1, and tested for total antioxidant capacity as described in Example 3. Table 10 and FIG. 7 presents the effects of untreated compared to treatment with the formulation on lipase, glycerol, and total antioxidant capacity on human milk that is pasteurized compared to unpasteurized.

Lipase was considered inhibited with a RFU<400, glycerol was considered inhibited with an RLU<150,000, and total antioxidant capacity considered maintained with a ratio >0.75.

Results Total antioxidant capacity remained unchanged between treated and untreated samples (Table 10). Lipase and glycerol were significantly decreased in untreated pasteurized samples compared to untreated unpasteurized (RAW) samples (FIG. 7A and FIG. 7D). However, lipase and glycerol levels were equally decreased in unpasteurized (RAW) and pasteurized treated samples (FIG. 7B and FIG. 7E). The lipase levels in unpasteurized (RAW) treated samples were 6-fold lower compared to RAW untreated samples (FIG. 7C) and the glycerol levels in unpasteurized (RAW) treated samples were approximately 41-fold lower compared to RAW untreated samples. (FIG. 7F).

Accordingly, these results demonstrate that the tested formulation is specifically effective on unpasteurized human milk relative to milk that has already been pasteurized. This formulation provides an option to increase the shelf life of human milk without pasteurization.

TABLE 10

Lipase levels, glycerol levels, and total Antioxidant capacity of untreated and treated human milk samples that are unpasteurized and pasteurized.

| Pasteurization Status | Lipase (RFU) | Glycerol (RLU) | Total Antioxidant Capacity |
|---|---|---|---|
| Untreated | | | |
| RAW | 2159.400 | 479035 | 1 |
| BP | 226.200 | 10568 | 1 |
| HTST | 273.540 | 8185 | 1 |
| UHT | 342.300 | 9224 | 1 |
| UP | 410.200 | 1642 | 1 |
| Treated (Formulation) | | | |
| RAW | 349.719 | 11618 | 2 |
| BP | 230.155 | 8992 | 2 |
| HTST | 298.793 | 10132 | 2 |
| UHT | 345.774 | 9923 | 2 |
| UP | 443.652 | 1802 | 2 |
| Differential Fold Change (Treated vs. Untreated) | | | |
| RAW | 6.175 | 41.232 | 0.5 |
| BP | 0.983 | 1.175 | 0.5 |
| HTST | 0.915 | 0.808 | 0.5 |
| UHT | 0.990 | 0.930 | 0.5 |
| UP | 0.925 | 0.911 | 0.5 |

Example 9. Validation of Pectin, Vitamin C, and Vitamin E Formulation on Unpasteurized Human Milk Compared with Unpasteurized Cow Milk 1 mL of unpasteurized human milk and 1 mL of unpasteurized fresh cow milk (Mom's Organic Market) were treated with a formulation of 5 mg of Pacific LM-12 Pectin+0.1014 mg of vitamin C+0.00406 IU (2.7 µg) of vitamin E or left untreated. Each sample was stored and frozen after treatment or non-treatment at −20° C. for 1 week.

All samples were thawed and measured for lipolysis as described in Example 2, tested for glycerol as described in Example 1, and tested for total antioxidant capacity as described in Example 3. Table 11 and FIG. 8 present the effects of untreated compared to treatment with the formulation on lipase, glycerol, and total antioxidant capacity on unpasteurized human milk compared to unpasteurized cow milk. Lipase was considered inhibited with a RFU<400, glycerol was considered inhibited with an RLU<150,000, and total antioxidant capacity considered maintained with a ratio >0.75.

Results Total antioxidant capacity remained unchanged between treated and untreated samples (Table 11). Lipase (FIG. 8A-FIG. 8B) and glycerol (FIG. 8D-FIG. 8E) levels were significantly decreased in treated unpasteurized human milk compared to untreated unpasteurized human milk. Conversely, lipase (FIG. 8A-FIG. 8B) and glycerol levels (FIG. 8D-FIG. 8E) surprisingly and unexpectedly remained unchanged in unpasteurized cow milk irrespective of the treatment. In unpasteurized human milk, the lipase levels were approximately 12-fold lower in the treated versus untreated samples (FIG. 8C) and glycerol was approximately 6-fold lower in treated versus untreated samples (FIG. 8F).

Accordingly, these surprising and unexpected findings demonstrate that pectins with vitamin C and vitamin E can function as inhibitors of lipase and glycerol production in human milk but not in other milk products such as cow milk. As such, this formulation provides an unexpected option for extending the freshness and nutritional value, as well as shelf-life, of human milk by preserving lipids and preventing fat breakdown, which is unique to human milk as compared to other milk products that also have a need for preservation.

TABLE 11

Lipase levels, Glycerol levels, and total Antioxidant capacity of untreated and treated unpasteurized human milk and cow milk samples.

| Sample | Lipase (RFU) | Glycerol (RLU) | Total Antioxidant Capacity |
|---|---|---|---|
| Untreated | | | |
| Cow | 1774.150 | 48641 | 1 |
| Human | 3460.100 | 526952 | 1 |
| Treated (Formulation) | | | |
| Cow | 1824.655 | 51622 | 2 |
| Human | 298.263 | 84605 | 2 |
| Differential Fold Change (Treated vs. Untreated) | | | |
| Cow | 0.972 | 0.942 | 0.5 |
| Human | 11.601 | 6.228 | 0.5 |

Example 10. Additive Effect Among Pectin, Vitamin C, and Vitamin E on Lipolysis and Antioxidant Capacity To assess the additivity among the formulation components, 5 ounces of unpasteurized human milk from 3 different donors was left treated with either 0.5% w/v (0.735 g) of Pacific LM-12 Pectin, 15 mg of vitamin C+0.6 IU (0.402 mg) of vitamin E, or Pacific LM-12 Pectin 0.5% w/v (0.735 g) of Pacific LM-12 pectin+15 mg of vitamin C+0.6 IU (0.402 mg) of vitamin E. Each treated sample was stored and frozen after treatment at −20° C. for 1 week.

All samples were thawed and measured for lipolysis as described in Example 2 and tested for total antioxidant capacity, in addition to a fresh milk sample from each donor, as described in Example 3.

Results Table 12 and FIG. 9 presents the findings that pectin alone did not maintain antioxidant capacity, with similar levels observed in frozen untreated samples. Samples treated with pectin require the addition of vitamin C and vitamin E for antioxidant capacity to be similar to levels from fresh human milk samples or samples treated with vitamin C and vitamin E alone. Conversely, while vitamin C and vitamin E in the absence of pectin maintained antioxidant activity, lipolysis activity was not inhibited. Pectin treatment alone decreased lipase levels, with the addition of vitamin C and vitamin E providing an additive effect and inhibiting lipolysis further than with pectin alone. (Table 12 and FIG. 9).

Accordingly, these findings demonstrate that pectin requires the additive effect of vitamin C and vitamin E in maintaining antioxidant capacity in human milk samples whereas pectin alone is sufficient in inhibiting lipolysis.

TABLE 12

Antioxidant capacity and Lipase levels of human milk samples treated with pectin alone, vitamin C + vitamin E, or pectin + vitamin C + vitamin E.

|  | Fresh milk | Untreated (Frozen) | Pectin | Vitamin C + Vitamin E | Pectin + Vitamin C + Vitamin E |
|---|---|---|---|---|---|
| Total Antioxidant Capacity | | | | | |
| Mother/Subject 1 | 0.517 | 0.273 | 0.204 | 0.762 | 0.406 |
| Mother/Subject 2 | 0.615 | 0.274 | 0.264 | 0.543 | 0.649 |
| Mother/Subject 3 | 0.518 | 0.374 | 0.364 | 0.663 | 0.5043 |
| Lipolysis | | | | | |
| Mother/Subject 1 | N/A | 3685 | 209 | 3153 | 225 |
| Mother/Subject 2 | N/A | 3242 | 525 | 2897 | 200.69 |
| Mother/Subject 3 | N/A | 3757 | 280 | 2473 | 168.28 |

Example 11. Assessment of Rancid Volatiles in Human Milk Treated with Pectin+Vitamin C+Vitamin E Headspace analyses was performed on 13 different human milk samples and 1 cow milk samples each untreated and treated with 0.5% w/v (0.735 g) Pacific LM-12 Pectin+15 mg vitamin C+0.6 IU (0.402 mg) vitamin E per 5 ounces of milk sample. 100 μL of each sample was placed in 20-mL headspace vials and fortified with 10 μL of 6 ppm of aqueous solution of acetophenone-(phenyl-d5). Headspace collection was achieved by solid-phase microextraction (SPME) for 10 min at a temperature of 40° C. using a DVB/Carbon/PDMS arrow. Chromatographic analyses were performed using a Thermo Scientific ISQ single quadrapole gas chromatograph-mass spectrometer equipped with a 30 m×0.25 mm Stabilwax-DA capillary column. The run of 28 samples was conducted over three consecutive days (i.e. chromatographic runs) using approximately nine samples per run to reduce the time samples spent in the autosampler prior to analysis. In addition to an internal standard (fortified cow milk), each run also included quality control samples consisting of empty vials (blanks). Chromatographic data was processed for peak alignment and determination of peak responses for all observed volatiles (including the internal standard). Tentative peak identifications were made for all reported volatiles based on matches with a NIST mass spectral database.

Results Table 13 and FIG. 10 presents the findings that the combination of pectin, vitamin C and vitamin E reduces the production of volatiles in the human milk samples when compared to untreated samples. The reduction in volatiles such as Pivalic acid, Pelargonic acid, Capric acid, and Lauric acid represents reduced rancidity, improved flavor, and improved smell, in treated human milk samples.

TABLE 13

Fold change of rancid volatiles in human milk treated with pectin + vitamin C + vitamin E compared to untreated human milk

|  | Pivalic Acid | Pelargonic Acid | Capric Acid | Lauric Acid |
|---|---|---|---|---|
| Mother 1 | 1.440735 | 2.09 | 387.3134 | 3070 |
| Mother 2 | 0.580001 | 399 | 102.0748 | 360 |
| Mother 3 | 153.3675 | 1.83 | 161.3039 | 209 |
| Mother 4 | 452.49 | 2.75 | 10.22753 | 6.87 |
| Mother 5 | 0.744089 | 2.7 | 3.12 | 1.89 |
| Mother 6 | 6.917925 | 0.808 | 4.18 | 10.969 |
| Mother 7 | 1.833634 | 1.32 | 21.19 | 301.41 |
| Mother 8 | 201.3889 | 1.83 | 8.97 | 1.82 |
| Mother 9 | 2.05 | 1.94 | 1.64 | 33.29 |
| Mother 10 | 24.754 | 1.11 | 22.7 | 1.57 |
| Mother 11 | 91.2 | 1.99 | 4.56 | 2.67 |
| Mother 12 | 1.09 | 1.1 | 2.75 | 21.94 |
| Mother 13 | 0.862 | 1.11 | 1.54 | 21.53 |

Example 12. Formulation 1: For Preserving Human Milk

The formulation was prepared using the following materials: 0.5% w/v (5 mg) Pacific LM-12 Pectin; +0.1014 mg vitamin C; and 0.00406 IU of vitamin E (2.7 μg of natural vitamin E or 1.8 μg of synthetic vitamin E for 1 mL of human milk. The formulation is added to 1 mL of human milk. Alternatively, a binder can be added to the formulation.

Example 13. Formulation 2: For Preserving Human Milk

The formulation was prepared using the following materials: 0.5% w/v (0.735 g) Pacific LM-12 Pectin; +15 mg vitamin C; and 0.6 IU of vitamin E (0.402 mg of natural vitamin E or 0.27 mg of synthetic vitamin E) for 5 ounces (approximately 150 mL) of human milk. The formulation is added to 5 ounces mL of human milk. Alternatively, a binder (40 mg) can be added to the formulation.

Formulation 2 was pressed using a LFA VICE Handheld Tablet press prepared on four different thicknesses (FIG. 11).

Example 14. Formulation 3: For Preserving Human Milk

The formulation was prepared using the following materials: 0.9% w/v (9 g) Pacific LM-12 Pectin; +101.4 mg vitamin C; and 4 IU of vitamin E (2.68 mg of natural vitamin E or 1.8 mg of synthetic vitamin E) for 1000 mL of human milk. The formulation is added to 1000 mL of human milk. Alternatively, a binder (270.5 mg) can be added to the formulation.

These examples are provided for illustrative purposes only and not to limit the scope of the claims provided herein.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof, inclusive of the endpoints. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method for preserving human milk, the method comprising:
   (a) contacting human milk with a composition comprising:
      (i) pectin;
      (ii) vitamin C; and
      (iii) vitamin E; and
   (b) storing the human milk,
   wherein the preserving comprises decreasing lipase activity in the human milk.

2. The method of claim 1, wherein the composition comprises between about 0.034 mg/mL to about 9 mg/mL pectin.

3. The method of claim 1, wherein the composition comprises between about 0.676 µg/mL to about 101 µg/mL vitamin C.

4. The method of claim 1, wherein the composition comprises: between about 0.0182 µg/mL to about 2.68 µg/mL vitamin E, wherein the vitamin E is natural vitamin E; or between about 0.0122 µg/mL to about 1.8 µg/mL vitamin E, wherein the vitamin E is synthetic vitamin E.

5. The method of claim 1, wherein the composition further comprises a whey protein.

6. The method of claim 1, wherein the composition further comprises phytic acid, ethylenediaminetetraacetic acid (EDTA) salt, or a combination thereof.

7. The method of claim 1, wherein the composition further comprises a thiocyanate.

8. The method of claim 1, wherein the composition further comprises an ice-binding protein.

9. The method of claim 1, wherein the storing is at a temperature of between about −20° C. to about 30° C.

10. The method of claim 1, wherein the composition is in a premeasured amount in a storage container and the human milk is added to the storage container and the contacting is in the storage container.

11. The method of claim 10, wherein the storage container is sealed after the human milk is added to the storage container.

12. The method of claim 11, wherein the volume of the human milk is between about 4 fluid ounces and about 6 fluid ounces.

13. The method of claim 1, wherein the preserving further comprises maintaining antioxidation capacity of the human milk, preventing rancidity of the human milk, extending shelf life of the human milk, maintaining the nutritional properties of human milk, or a combination thereof.

* * * * *